CORDLESS KEY CONTROL TESTBOARD FOR TELEPHONE SYSTEMS

Filed Sept. 17, 1947 21 Sheets-Sheet 1

INVENTOR.
FRANK KESSLER
BY
Smith, Olsen & Baird
Attys.

May 1, 1951 F. KESSLER 2,550,819

CORDLESS KEY CONTROL TESTBOARD FOR TELEPHONE SYSTEMS

Filed Sept. 17, 1947 21 Sheets-Sheet 2

INVENTOR.
FRANK KESSLER

BY
Smith, Olsen & Baird
Attys.

May 1, 1951 F. KESSLER 2,550,819

CORDLESS KEY CONTROL TESTBOARD FOR TELEPHONE SYSTEMS

Filed Sept. 17, 1947 21 Sheets-Sheet 3

INVENTOR.
FRANK KESSLER
BY
Smith, Olsen & Baird
Attys.

May 1, 1951 F. KESSLER 2,550,819

CORDLESS KEY CONTROL TESTBOARD FOR TELEPHONE SYSTEMS

Filed Sept. 17, 1947 21 Sheets-Sheet 4

INVENTOR.
FRANK KESSLER
BY
Smith, Olsen & Baird
Attys.

May 1, 1951 F. KESSLER 2,550,819

CORDLESS KEY CONTROL TESTBOARD FOR TELEPHONE SYSTEMS

Filed Sept. 17, 1947 21 Sheets-Sheet 5

INVENTOR.
FRANK KESSLER
BY
Smith, Olsen & Baird
Attys

May 1, 1951 F. KESSLER 2,550,819

CORDLESS KEY CONTROL TESTBOARD FOR TELEPHONE SYSTEMS

Filed Sept. 17, 1947 21 Sheets-Sheet 6

INVENTOR.
FRANK KESSLER
BY
Smith, Olsen & Baird
Attys.

INVENTOR.
FRANK KESSLER
BY
Smith, Olsen & Baird
Attys.

May 1, 1951 F. KESSLER 2,550,819

CORDLESS KEY CONTROL TESTBOARD FOR TELEPHONE SYSTEMS

Filed Sept. 17, 1947 21 Sheets-Sheet 8

INVENTOR.
FRANK KESSLER

BY
Smith, Olsen & Baird

Attys

CORDLESS KEY CONTROL TESTBOARD FOR TELEPHONE SYSTEMS

Filed Sept. 17, 1947 21 Sheets-Sheet 9

INVENTOR.
FRANK KESSLER

BY
*Smith, Olsen & Baird*
Attys.

May 1, 1951 F. KESSLER 2,550,819

CORDLESS KEY CONTROL TESTBOARD FOR TELEPHONE SYSTEMS

Filed Sept. 17, 1947 21 Sheets-Sheet 10

INVENTOR.
FRANK KESSLER

BY
Smith, Olsen & Baird

Attys

May 1, 1951 F. KESSLER 2,550,819

CORDLESS KEY CONTROL TESTBOARD FOR TELEPHONE SYSTEMS

Filed Sept. 17, 1947 21 Sheets-Sheet 11

INVENTOR.
FRANK KESSLER

BY

Smith, Olsen & Baird

Attys.

May 1, 1951 F. KESSLER 2,550,819

CORDLESS KEY CONTROL TESTBOARD FOR TELEPHONE SYSTEMS

Filed Sept. 17, 1947 21 Sheets-Sheet 12

INVENTOR.
FRANK KESSLER
BY
Smith, Olsen & Baird
Attys.

INVENTOR.
FRANK KESSLER
BY
Smith, Olsen & Baird
Attys.

May 1, 1951 F. KESSLER 2,550,819

CORDLESS KEY CONTROL TESTBOARD FOR TELEPHONE SYSTEMS

Filed Sept. 17, 1947 21 Sheets-Sheet 14

INVENTOR.
FRANK KESSLER
BY
Smith, Olsen & Baird
Attys.

CORDLESS KEY CONTROL TESTBOARD FOR TELEPHONE SYSTEMS

Filed Sept. 17, 1947 21 Sheets-Sheet 15

INVENTOR.
FRANK KESSLER
BY
Smith, Olsen & Baird
Attys.

CORDLESS KEY CONTROL TESTBOARD FOR TELEPHONE SYSTEMS

Filed Sept. 17, 1947 21 Sheets-Sheet 16

*INVENTOR.*
FRANK KESSLER
*BY*
Smith, Olsen & Baird
Attys.

May 1, 1951 F. KESSLER 2,550,819

CORDLESS KEY CONTROL TESTBOARD FOR TELEPHONE SYSTEMS

Filed Sept. 17, 1947 21 Sheets-Sheet 17

*INVENTOR.*
FRANK KESSLER

*BY*
Smith, Olsen & Baird

Attys.

May 1, 1951 F. KESSLER 2,550,819

CORDLESS KEY CONTROL TESTBOARD FOR TELEPHONE SYSTEMS

Filed Sept. 17, 1947 21 Sheets-Sheet 18

*INVENTOR.*
FRANK KESSLER

*BY*
Smith, Olsen & Baird

Attys.

CORDLESS KEY CONTROL TESTBOARD FOR TELEPHONE SYSTEMS

Filed Sept. 17, 1947 21 Sheets-Sheet 19

INVENTOR.
FRANK KESSLER
BY
Smith, Olsen & Baird
Attys

CORDLESS KEY CONTROL TESTBOARD FOR TELEPHONE SYSTEMS

INVENTOR.
FRANK KESSLER
BY
Smith, Olsen & Baird
Attys

May 1, 1951 F. KESSLER 2,550,819

CORDLESS KEY CONTROL TESTBOARD FOR TELEPHONE SYSTEMS

Filed Sept. 17, 1947 21 Sheets-Sheet 21

INVENTOR.
FRANK KESSLER
BY
Smith, Olsen & Baird
Attys.

Patented May 1, 1951

2,550,819

UNITED STATES PATENT OFFICE 2,550,819

CORDLESS KEY CONTROL TESTBOARD FOR TELEPHONE SYSTEMS

Frank Kessler, Rochester, N. Y., assignor to Automatic Electric Laboratories, Inc., Chicago, Ill., a corporation of Delaware Application September 17, 1947, Serial No. 774,495

11 Claims. (Cl. 179—175)

The present invention relates to test boards for telephone systems and more particularly to such test boards of the cordless key-controlled type.

In a conventional test board, a test circuit is provided that is selectively connected to the different lines and trunks utilizing cords and plugs. Also a great number of keys and other manually manipulatable elements are provided which must be operated in various combinations in order to adapt the test circuit for the different tests.

While test boards of the type mentioned are reasonably satisfactory in operation, they require a considerable number of manual operations to bring about the connection of a line or trunk to be tested to the test circuit. Moreover, these test boards must be operated by a skilled test operator as the combinations of key operations required to set up the different tests in the test circuit are quite complex, and extreme care must be exercised to prevent the connection to the test circuit of elements employed in other tests that would block a given test or impair the accuracy of the readings obtained during the given test.

Accordingly, it is a general object of the present invention to provide a test board of the cordless key-controlled type; whereby all lines and trunks requiring testing may be connected to the associated test circuit by the operation of corresponding keys, and then the different tests may be performed upon the connected line or trunk merely by operating individual keys corresponding to the different tests required; wherein the operation of any particular key to set the test circuit up for a given test locks out the other keys which are individually operative to bring about corresponding other tests.

Another object of the invention is to provide improved trunk circuits for setting up connections to and from the test board that may be selectively controlled by key operations performed at the test board.

A further object of the invention is to provide in a test board, improved power facilities and improved circuit control facilities permitting talking or monitoring on a test connection, as well as testing thereon, without interference.

A still further object of the invention is to provide a test board comprising facilities for performing a great number of tests and individual test keys selectively operative to cause the test circuit to perform the respective tests and to lock out the other test keys in order positively to prevent interference with a given test being performed.

Further features of the invention pertain to the particular arrangement of the circuit element of the system, whereby the above-outlined and additional operating features thereof are attained.

*Sect. 1.—The general arrangement of the telephone system*

Figures 1, 22:
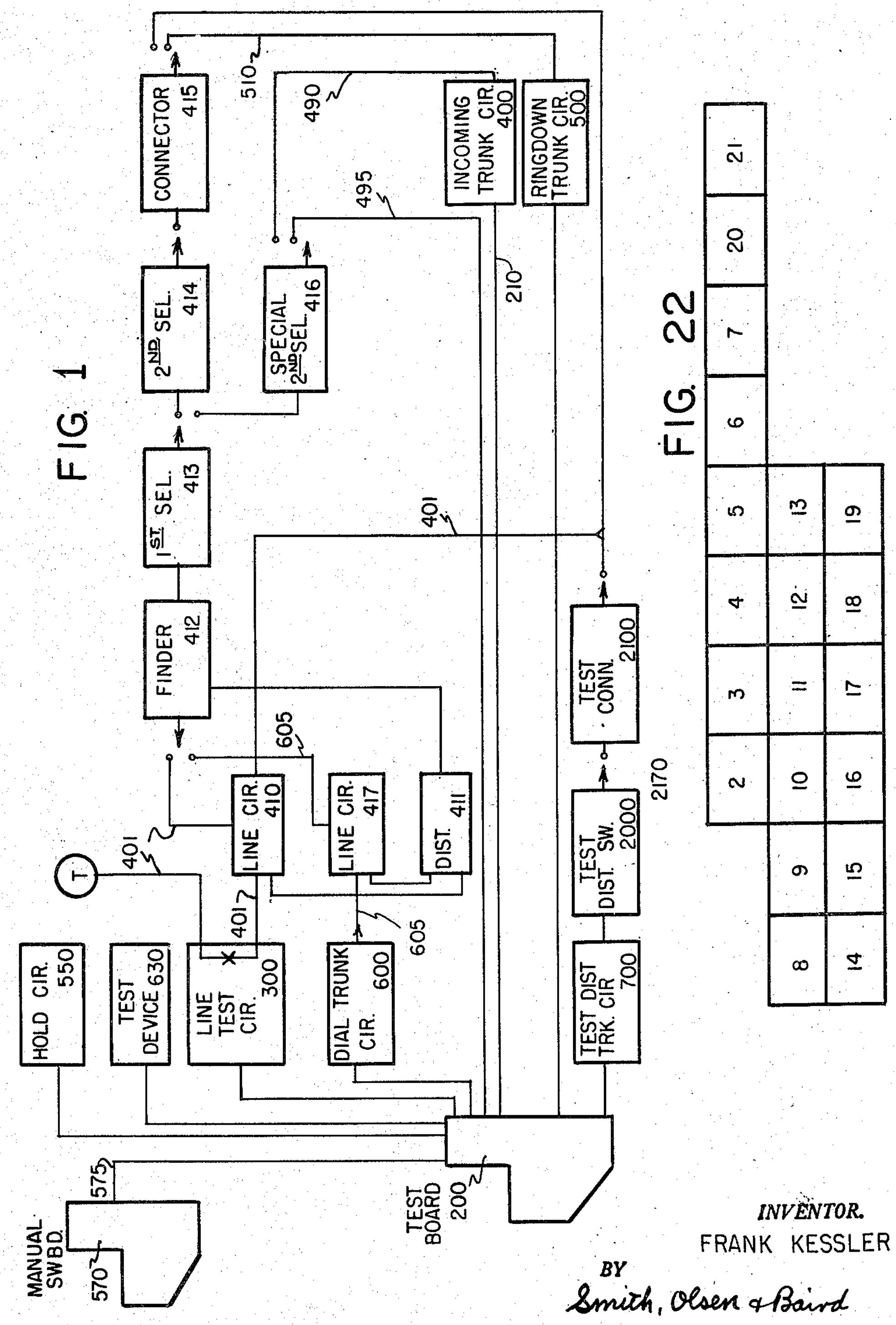
Figure 2:
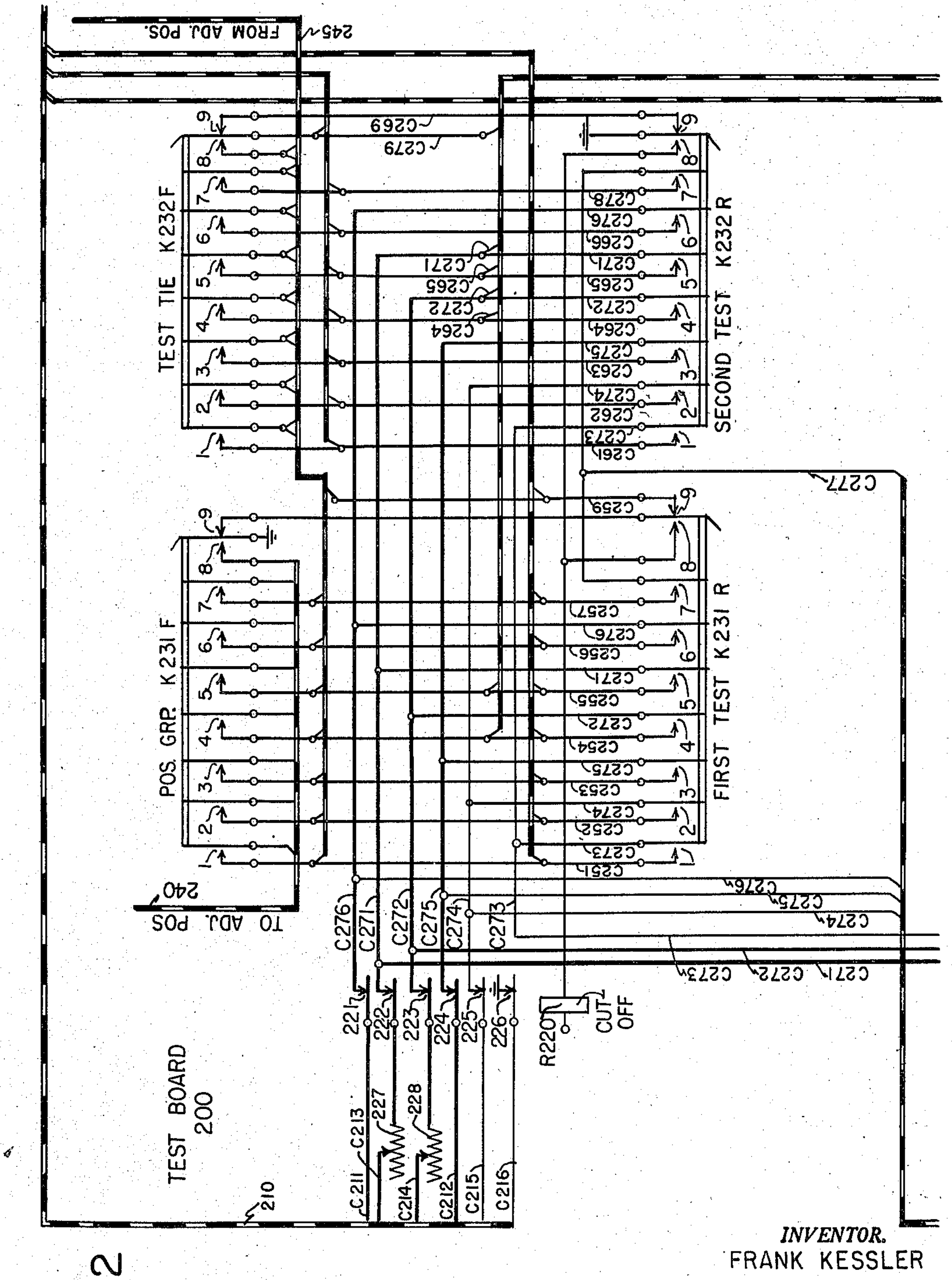

The invention, both as to its organization and method of operation, together with further objects and advantages thereof, will best be understood by reference to the following specification taken in connection with the accompanying drawings in which Figure 1 is a schematic diagram of the central office of a telephone system embodying the present invention and illustrating the general arrangement of the apparatus incorporated therein; Figs. 2 to 21, inclusive, taken together, illustrate the details of certain of the apparatus incorporated in the telephone system, which apparatus has embodied therein the features of the invention as briefly outlined above; and Fig. 22 is a block diagram illustrating the mode of combining Figs. 2 to 21, inclusive, to form a unified circuit diagram.

Figure 3:
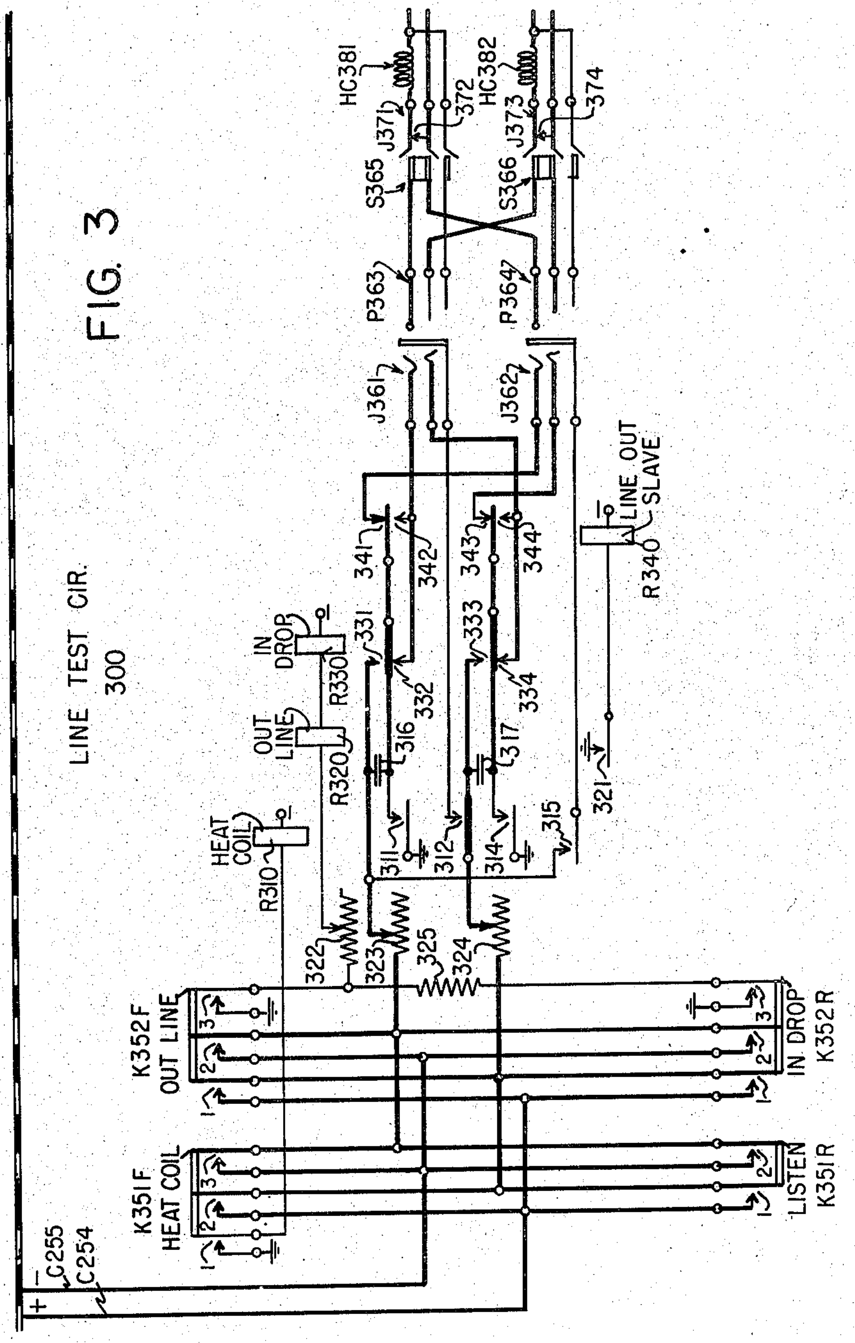
Figure 4:
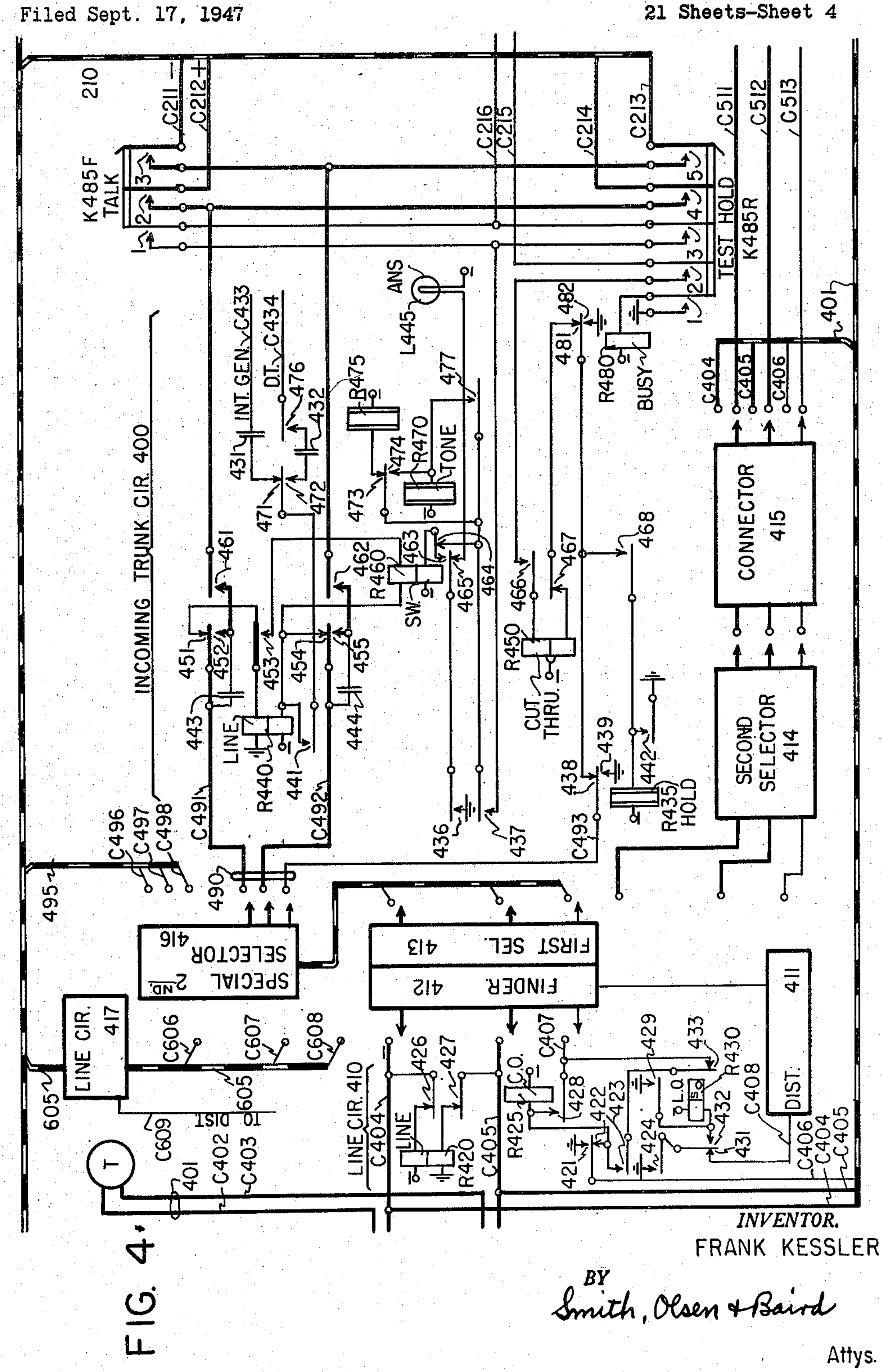
Figure 5:
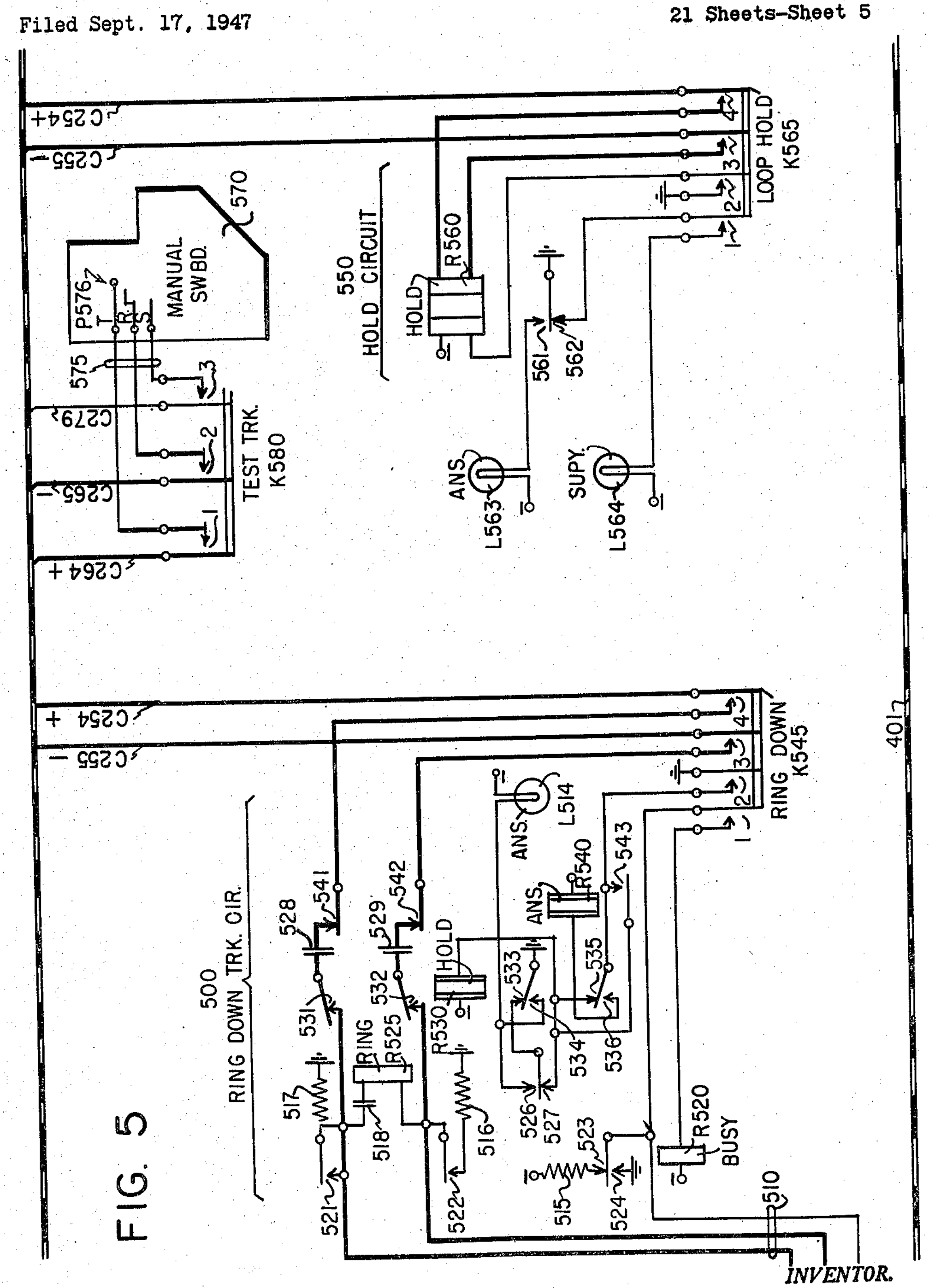
Figure 6:
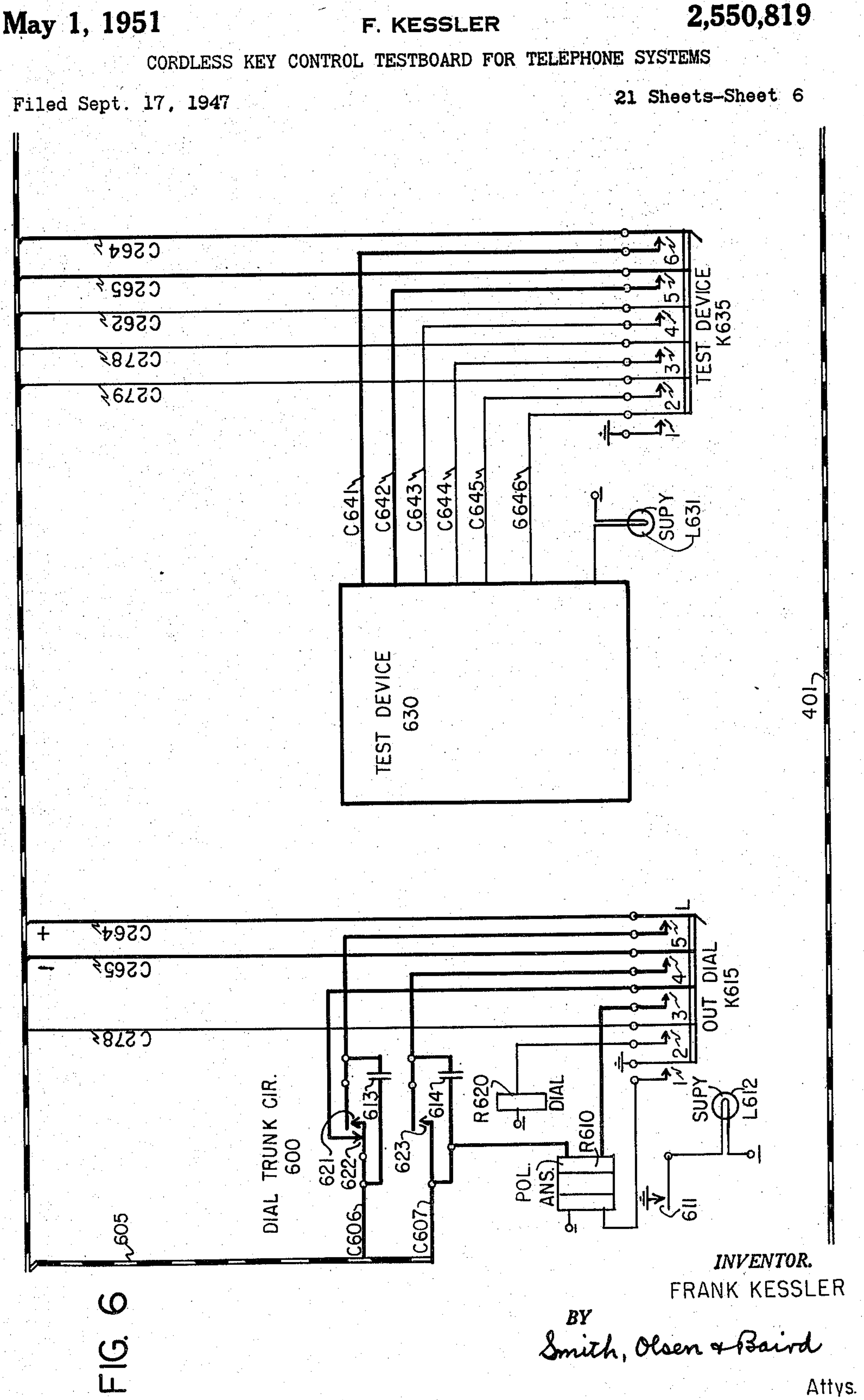
Figure 7:
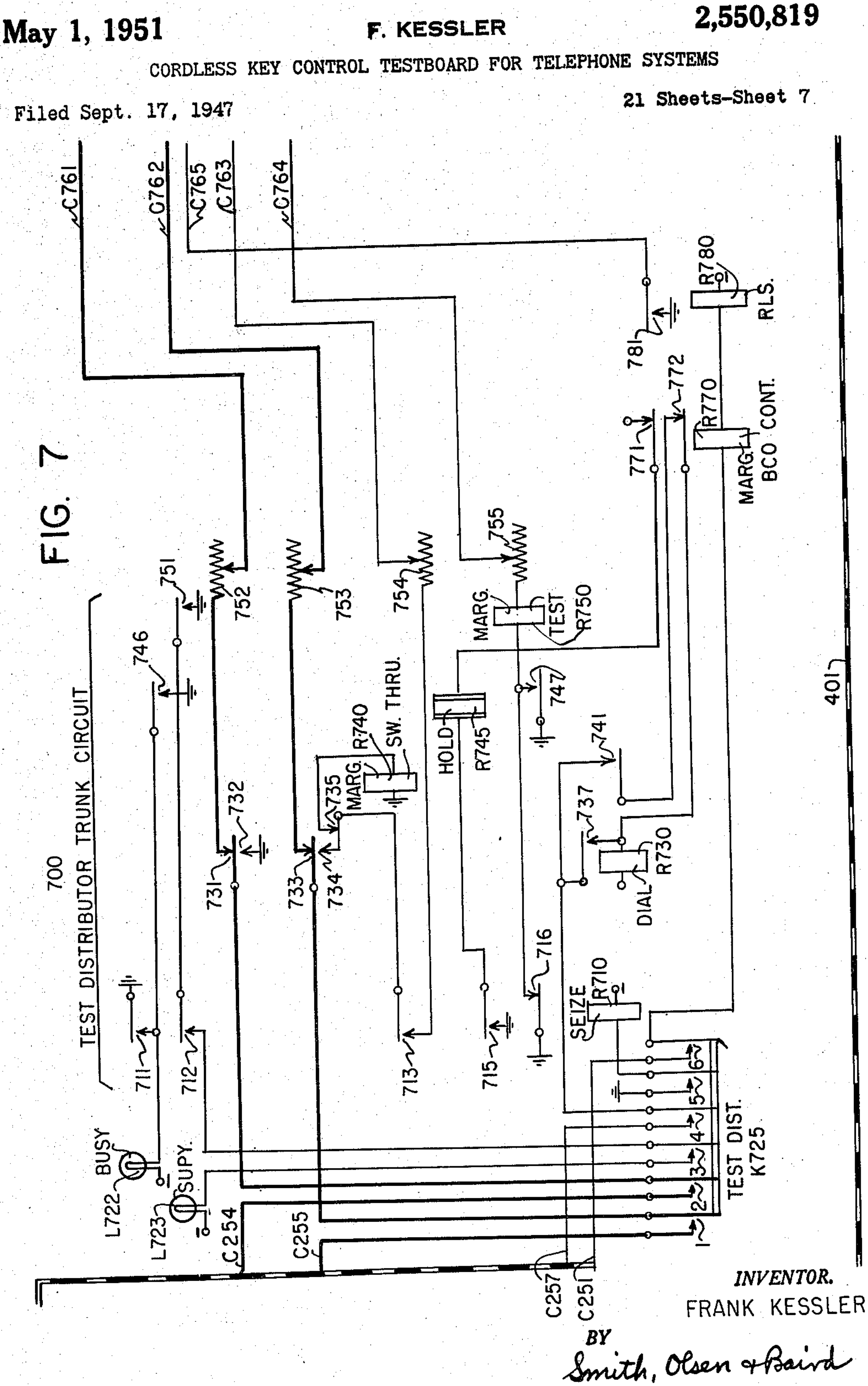
Figure 8:
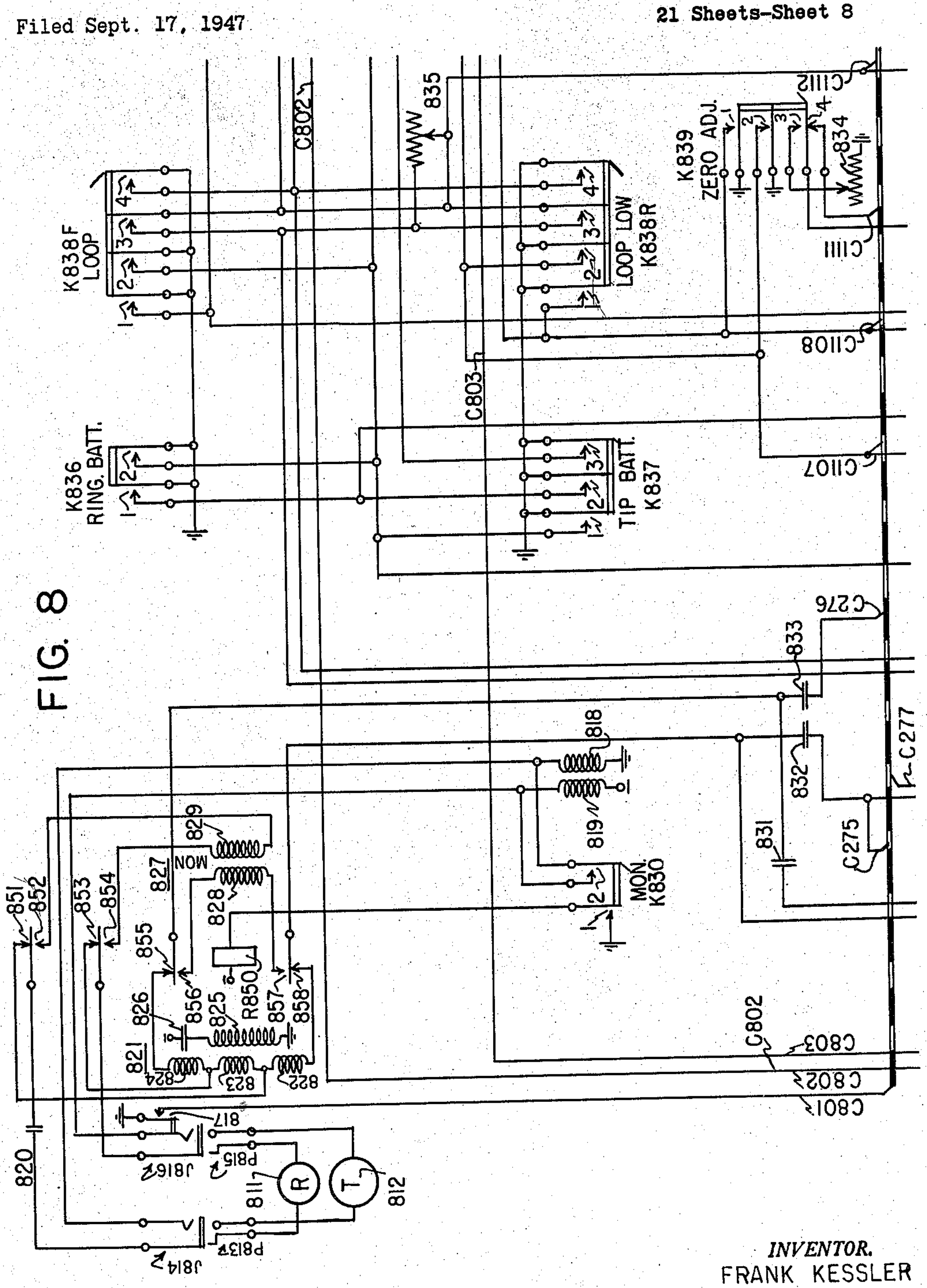
Figure 9:
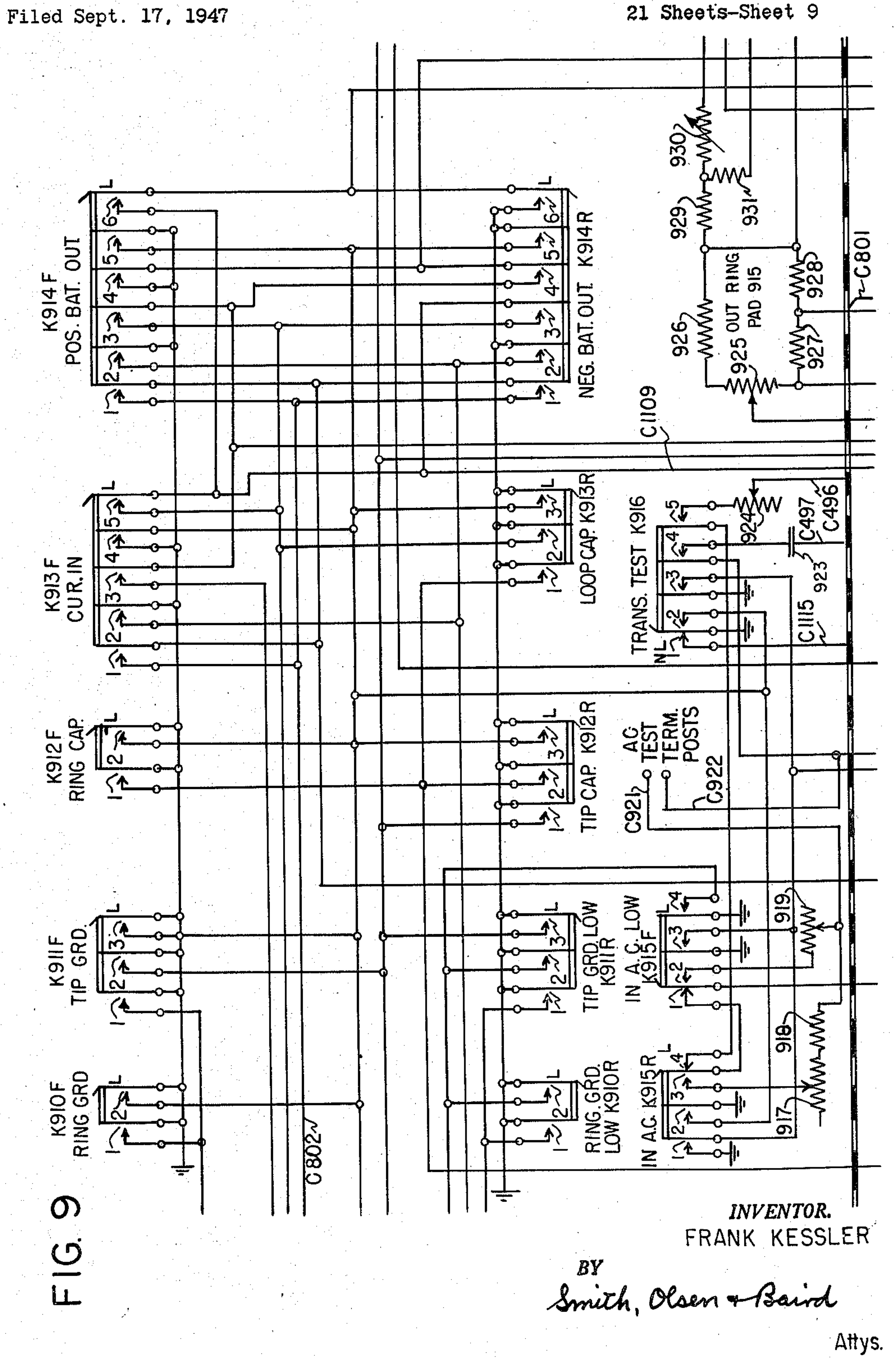
Figure 10:
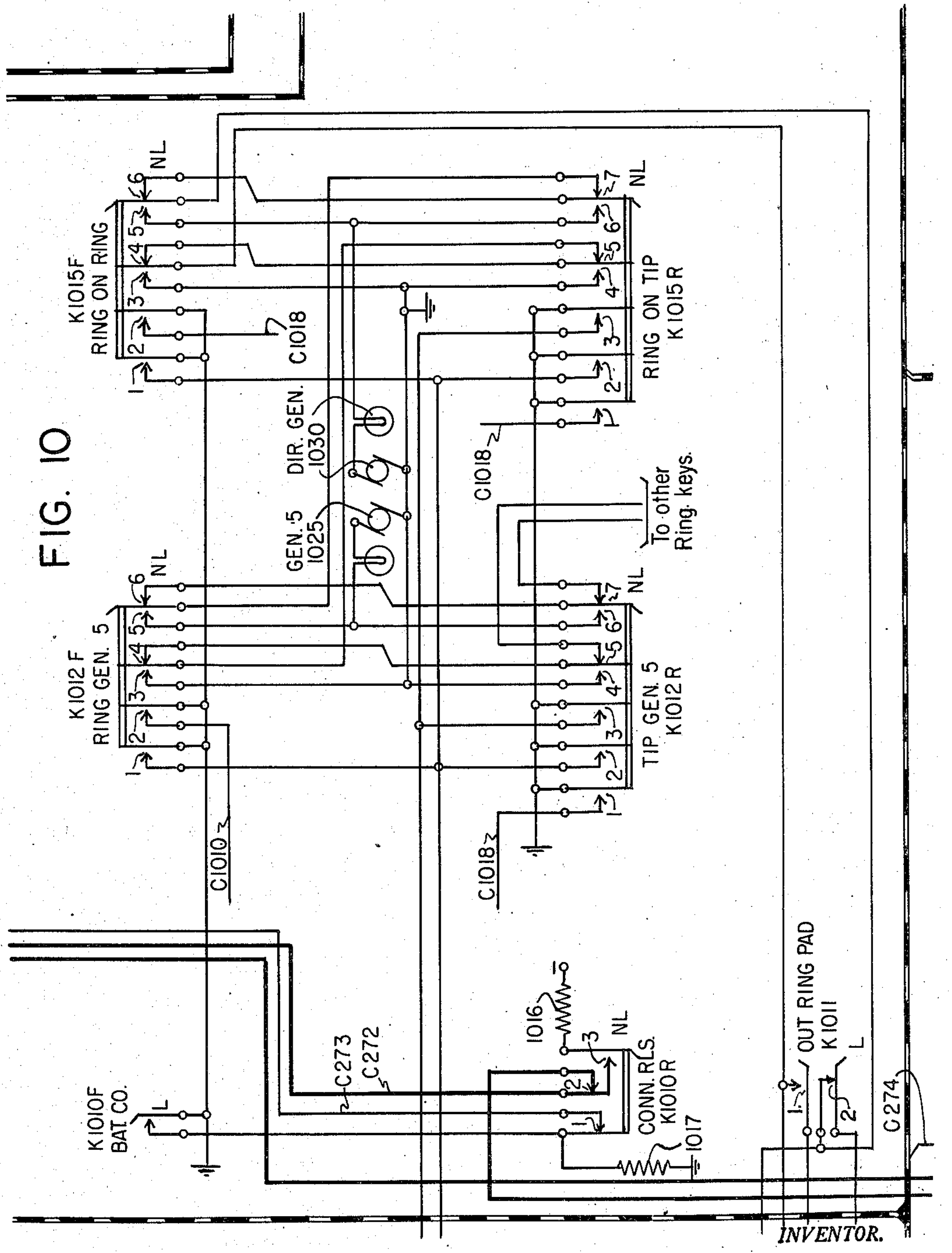
Figure 20:
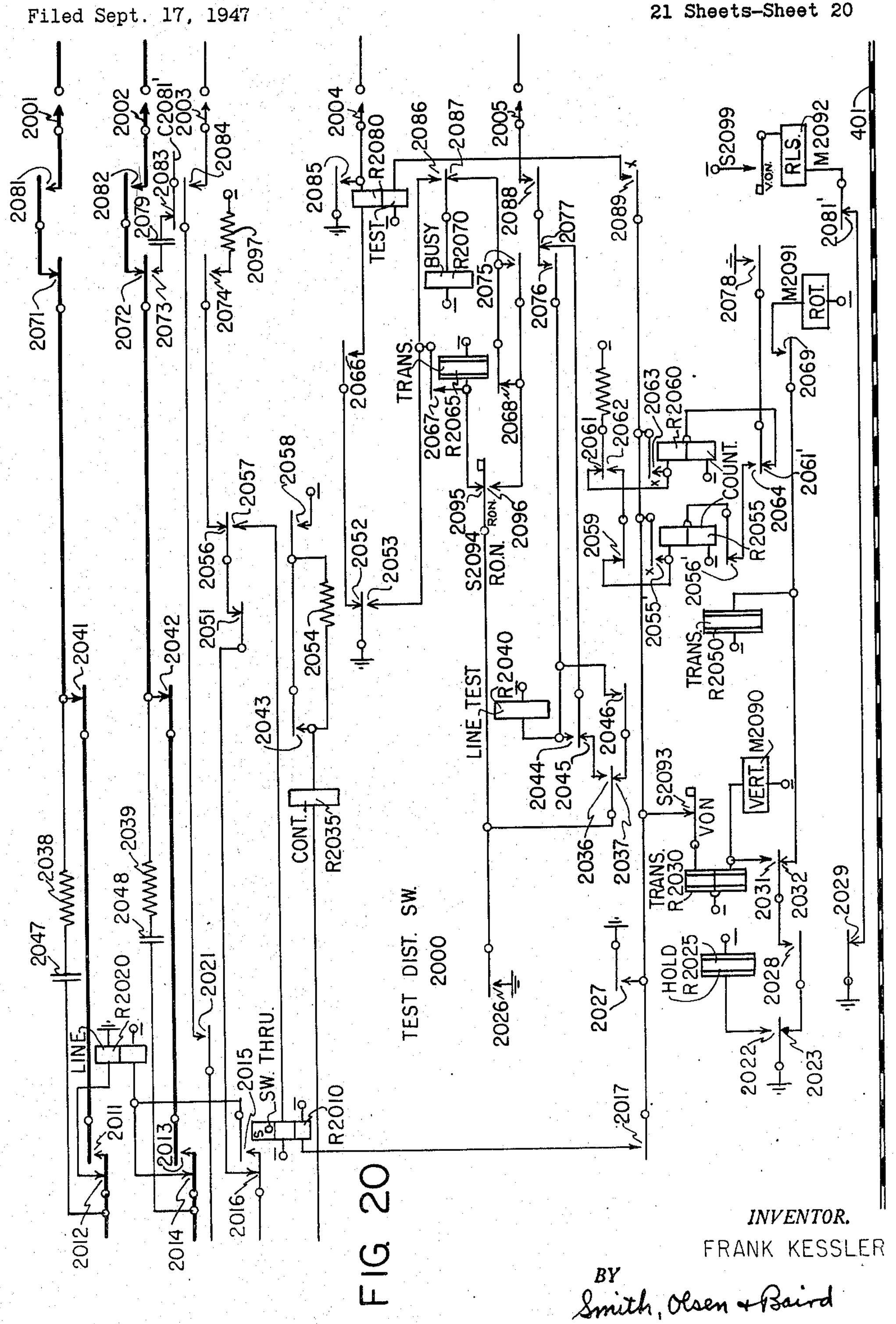
Figure 21:
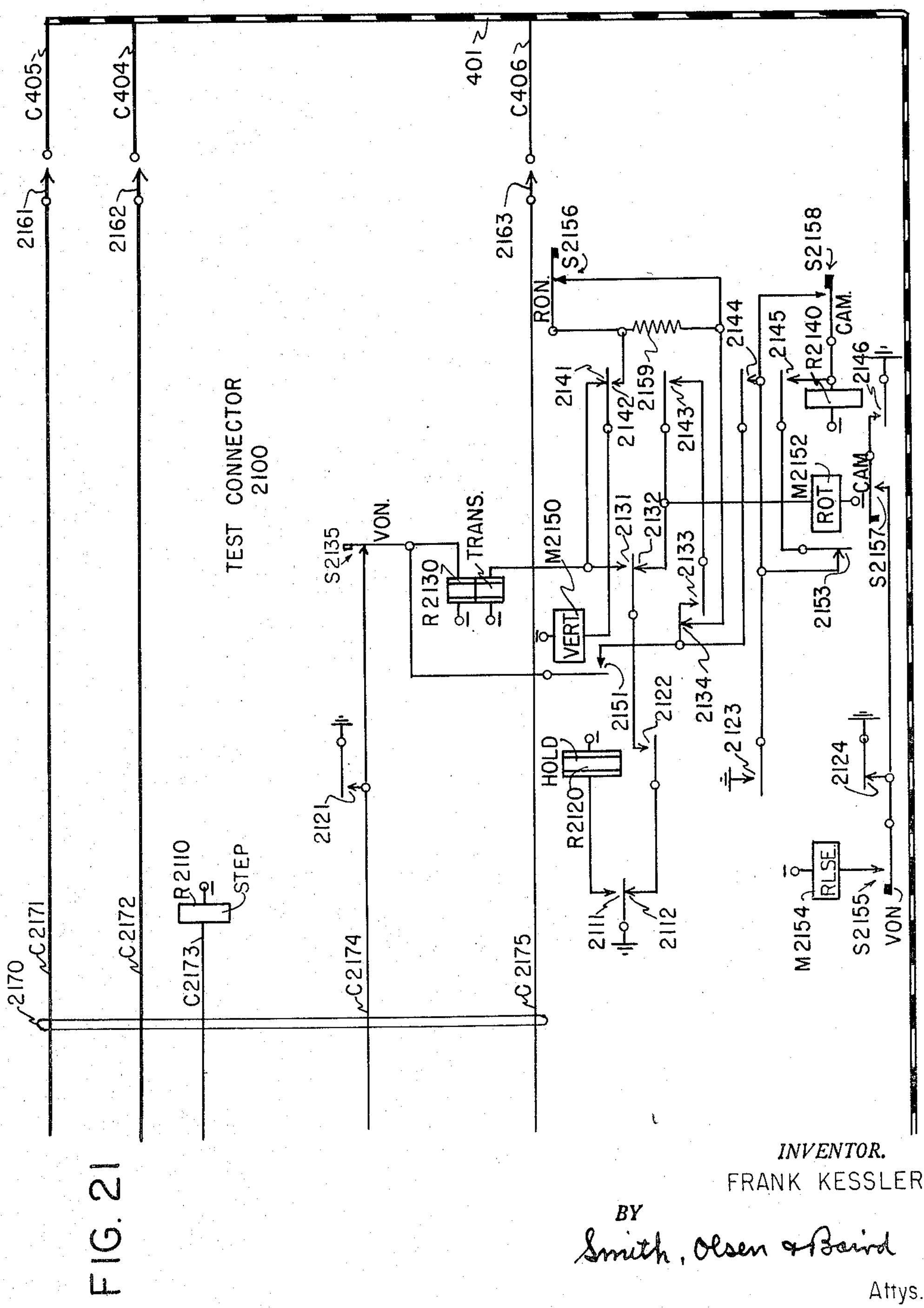

More particularly, Figs. 2, and 8 to 19, inclusive, illustrate the details of the apparatus incorporated in the test board; Fig. 3 illustrates the details of a line test circuit; Fig. 4 illustrates the details of a line circuit, as well as the details of an incoming trunk circuit; Fig. 5 illustrates the details of a ring-down trunk circuit, as well as the details of a hold circuit; Fig. 6 illustrates the details of a dial trunk circuit; Fig. 7 illustrates the details of a test distributor trunk circuit; Fig. 20 illustrates the details of a test distributor switch; and Fig. 21 illustrates the details of a test connector; all incorporated in the central office of the telephone system.

Referring now more particularly to Fig. 1, the central office of the telephone system there illustrated is of the 10,000 line type serving substantially that number of subscriber lines, including the subscriber line 401 extending to the subscriber substation T. Also the central office comprises a test board 200 and automatic switching apparatus including 100 groups of finder-first selector links, a suitable number of groups of second selectors accessible to the various groups of first selectors, a group of special second selectors accessible to the various groups of first selectors, and 100 groups of connectors accessible to the various groups of second selectors. The first group of finder-first selector links includes the finder 412 and the connected first selector 413; the finder 412 having access to the first group of 100 lines, including the subscriber line 401 extending to the subscriber substation T; and the first group of finder-first selector links being provided with an associated distributor 411. The first selector 413 has access to the group of second selectors, including the second selector 414, and to the group of special second selectors, including the special second selector 416. The second selector 414 has access to the first group of connectors, including the connector 415; while the connector 415 has access to the first group of 100 lines, including the subscriber line 401 extending to the subscriber substation T.

Each subscriber line 401, etc., terminates on a main distributor frame and includes an outgoing line section and an incoming line circuit section; which sections may be selectively seized by way of a line test circuit 300 that may be connected thereto; which line test circuit 300 is accessible from the test board 200. Also the test board 200 has access to a dial trunk circuit 600 connected by a trunk 605 to a line circuit 417 individual thereto; which trunk 605 is also accessible to the finder 412. Furthermore, the subscriber line 401 is provided with a line circuit 410 individual thereto. Finally the line circuits 410, etc., and the line circuit 417 are commonly associated with the distributor 411; which distributor 411 is associated with the first group of finder-first selector links.

Further, the central office comprises a manual switchboard 570 that may be connected to the test board 200 by a test trunk 575; as well as a test distributor circuit 700 accessible to the test board 200. The test distributor trunk circuit 700 is provided with a test distributor switch 2000 which, in turn, has access to 100 test connectors, including the first test connector 2100. The first test connector 2100, in turn, has access to the first group of 100 lines, including the subscriber line 401 extending to the subscriber substation T. Also the central office comprises an incoming trunk 495 extending to the test board 200 and accessible to the group of special second selectors, including the special second selector 416, as well as an inspector trunk 210, extending to the test board 200 and terminating in an incoming trunk circuit 400; which incoming trunk circuit 400 is accessible via a trunk 490 to the group of special second selectors, including the special second selector 416. Further, the central office comprises a ring-down trunk circuit 500 connected directly to the test board 200 and accessible via a trunk 510 to the connectors 415, etc., in the various groups. Finally, the test board 200 is provided with a holding circuit 550 directly connected thereto; and certain auxiliary test devices 630, etc., directly connected thereto.

*Sect. 2.—The apparatus incorporated in the telephone system*

In the central office, the finders 412, etc., the first selectors 413, etc., the second selectors 414, etc., the special second selectors 416, etc., and the connectors 415, etc., are of the conventional Strowger types; while the distributor 411 may be of any suitable type. Also the manual switchboard 570 is of any suitable type; and as illustrated in Fig. 5, is provided with a plug P576 terminating the test trunk 575 extending to the test board 200; the test trunk 575 terminating in a test trunk key K580 disposed at the test board 200.

Preferably, the line circuits 410, 417, etc., are identical; the line circuit 410 comprises, as illustrated in Fig. 4, a relay group including a line relay R420, a cut-off relay R425 and a lock-out relay R430. Also in the subscriber line 401 extending to the subscriber substation T from the line circuit 410, there are included two jacks J371 and J373 and two heat coils HC381 and HC382 respectively disposed in the line conductors C402 and C403 of the subscriber line 401; which elements are disposed at the main distributor frame.

The line test circuit 300, as illustrated in Fig. 3, terminates on an out-line key K352F, an in-drop key K352R, a heat coil key K351F and a listen key K351R, disposed at the test board 200; and comprises a relay group including a heat coil relay R310, an out-line relay R320, an in-drop relay R330 and an out-line slave relay R340. Also the line test circuit 300 comprises an out-jack J361 adapted to receive a plug P363, and an in-jack J362 adapted to receive a plug P364; which plugs P363 and P364 are connected to two shoes S365 and S366; which shoes S365 and S366 are adapted to be received respectively in the jacks J371 and J373 arranged in the line conductors C402 and C403, respectively, of the subscriber line 401 extending to the subscriber substation T.

The incoming trunk circuit 400, as illustrated in Fig. 4, terminates on a talk key K485F and a test hold key K485R disposed at the test board 200; and comprises a relay group including a hold relay R435, a line relay R440, a cut-through relay R450, a switch relay R460, two tone relays R470 and R475 and a busy relay R480. Also the incoming trunk circuit 400 is provided with an answer lamp L445 disposed at the test board 200.

The ring-down trunk circuit 500, as illustrated in Fig. 5, terminates on a ring-down key K545 disposed at the test board 200; and comprises a relay group including a busy relay R520, a ring relay R525, a hold relay R530 and an answer relay R540. Also the ring-down trunk circuit 500 is provided with an answer lamp L514 disposed at the test board 200.

The hold circuit 550, as illustrated in Fig. 5, terminates on a loop hold key K565 disposed at the test board 200; and comprises a hold relay R560. Also the hold circuit 550 is provided with an answer lamp L563 and a supervisory lamp L564 disposed at the test board 200.

The dial trunk circuit 600, as illustrated in Fig. 6, terminates on an out-dial key K615 disposed at the test board 200; and comprises a relay group including an answer relay R610 and a dial relay R620. Also the dial trunk circuit 600 is provided with a supervisory lamp L612 disposed at the test board 200.

The test device 630, as illustrated in Fig. 6, terminates on a test device key K635 disposed at the test board 200 and may comprise a Wheatstone bridge or other similar testing apparatus or the like. Also the test device 630 is provided with a supervisory lamp L631 disposed at the test board 200.

The test distributor circuit 700, as illustrated in Fig. 7, terminates on a test distributor key K725 disposed at the test board 200; and comprises a relay group including a seize relay R710, a dial relay R730, a switch through relay R740, a hold relay R745, a test relay R750, a B. C. O. control relay R770, and a release relay R780. Also the test distributor trunk circuit 700 comprises a busy lamp L722 and a supervisory lamp L723 disposed at the test board 200.

The test distributor switch 2000, as illustrated in Fig. 20, is directly connected to the test distributor circuit 700; and comprises a relay group including a switch through relay R2010, a line relay R2020, a hold relay R2025, a transfer relay R2030, a control relay A2035, a line test relay R2040, a transfer relay R2050, two counting relays R2055 and R2060, a transfer relay R2065, a busy relay R2070 and a test relay R2080. Also the test distributor switch 2000 comprises a Strowger mechanism provided with five wipers, a vertical magnet M2090 for driving the wiper carriage step by step in the vertical direction, a rotary magnet M2091 for driving the wiper carriage step by step in the rotary direction, and a release magnet M2092 for releasing the wiper carriage and for causing it to be returned to its normal rotary and vertical position. Also two sets of switch springs S2093 and S2099 are associated with the Strowger mechanism and operated when the wiper carriage is driven one step in the vertical direction away from its normal vertical position; and a set of switch springs S2094 is associated with the Strowger mechanism and operated when the wiper carriage is driven one step in the rotary direction away from its normal rotary position.

Preferably, each of the test connectors is identical to the test connector 2100, which comprises, as shown in Fig. 21, a relay group including a step relay R2110, a hold relay R2120, a transfer relay R2130, and a control relay R2140. Also the test connector 2100 comprises a Strowger mechanism including three wipers, a vertical magnet M2150 for driving the wiper carriage step by step in the vertical direction, a rotary magnet M2152 for driving the wiper carriage step by step in the rotary direction, and a release magnet M2154 for releasing the wiper carriage and for causing it to be returned to its normal rotary and vertical positions. Also two sets of switch springs S2135 and S2155 are associated with the Strowger mechanism and operated when the wiper carriage is moved one step in the vertical direction away from its normal vertical position; a set of switch springs S2156 is associated with the Strowger mechanism and operated when the wiper carriage is moved one step in the rotary direction away from its normal rotary position; and two sets of switch springs S2157 and S2158 are associated with the Strowger mechanism and operated when the wiper carriage is rotated eleven steps in the rotary direction away from its normal rotary position.

The test board 200 is preferably of the multi-position type, the first position of which is illustrated in Figs. 2, and 8 to 19, inclusive, and comprises a set of common and special test keys including a position group key K231F, a first test key K231R, a test tie key K232F, a second test key K232R, a monitor key K830, a ring battery key K836, a tip battery key K837, a loop key K838F, a loop low key K838R, a zero adjustment key K839, a ring ground key K910F, a ring ground low key K910R, a tip ground key K911F, a tip ground low key K911R, an in-A. C. key K915R, an in-A. C. low key K915F, a ring capacity key K912F, a tip capacity key K912R, a current-in key K913F, a loop capacity key K913R, a transmission test key K916, a positive battery-out key K914F, a negative battery-out key K914R, a battery cut-off key K1010F, a connector release key K1010R, an out-ring pad key K1011, a plurality of generator ring keys (generator No. 5 ring key K1012F being illustrated), a plurality of generator tip keys (generator No. 5 tip key K1012R being illustrated), a ring on ring key K1015F, a ring on tip key K1015R, an impulse check key K1110F, an impulse check talk key K1110R, a howler key K1115, a speed calibration key K1146, a repeated make key K1147, a direct make key K1148, a meter reverse key K1414, a talk battery key K1411, a test reverse key K1510, and an impulse storage key K1615.

It will be understood that certain of the keys above set forth are paired front and rear; whereby a common operating key handle is provided for each pair, preventing simultaneous operation of the keys as a pair; which condition is indicated by the notations K838F and K838R, for example. Thus the two keys mentioned immediately above, as well as the other paired keys, as indicated by the notations F and R, may not be operated simultaneously. Furthermore, the monitor key K830 and the out-ring pad key K1011 are paired so that these two keys may not be operated simultaneously; and the test reverse key K1510 and the talk battery key K1411 are paired so that these two keys may not be operated simultaneously. The remainder of the keys are of the single throw variety and are operated in appropriate combinations to perform the various tests in conjunction with the various pieces of apparatus as explained more fully hereinafter.

Also the test board 200 comprises a transmitter 812 and a receiver 811 terminating on two plugs P813 and P815 which are adapted to be inserted respectively into the jacks J814 and J816 extending to the circuit thereat; a talk repeater 821; a monitor repeater 827; and an out-ring pad 915. Further the test board 200 has associated therewith a direct generator 1030 and five individual frequency generators, generator No. 5 being indicated at 1025. Also the test board 200 comprises a meter of the ballastic galvanometer type 1412, provided with a high scale and a low scale and a linear scale, an impulse transmitter of the dial type 1428, a source of 115 volts A. C. supply, a 48 volts test battery 1525, an associated power rectifier of the copper oxide type 1524, a test rectifier of the copper oxide type 1515, a vacuum tube of the 6J5 type 1612, a low scale lamp L1415, a dial battery lamp L1417, a test battery lamp L1516, an answer lamp L1111, a busy lamp L1210, ten units lamps UL1301 to UL1310, inclusive, and ten tens lamps TL1801 to TL1810, inclusive.

Further the test board 200 comprises a relay group including a cut-off relay R220, a monitor relay R850, two pulse relays R1130 and R1135, a speed relay R1140, a repeated make relay R1150, two make relays R1160 and R1170, a pulse count relay R1180, a control relay R1190, a line relay R1100, a dial relay R1220, a hold relay R1230, two control relays R1240 and R1245, a dial relay R1250, a speed relay R1260, a control relay R1270, a pulse relay R1280, a control relay R1290, two control relays R1360 and R1370, ten units relays UR1310 to UR1300, inclusive, an ammeter relay R1430, a meter reverse relay R1435, a loop hold relay R1440, a loop test relay R1445, a start relay R1450, a dial relay R1460, a foreign battery relay R1470, a high relay R1480, a low relay R1490, two capacity relays R1530 and R1540, a direct current relay R1550, an A. C. current relay R1560, a ring relay R1570, a reverse relay R1580, a power check relay R1590, a power relay R1595, an impulse storage relay R1640, an impulse length relay R1650, a storage relay R1660, a buzzer relay R1720, a line relay R1730, three cycle relays R1740, R1745, and R1750, a pulse relay R1760, a start relay R1770, two control relays R1860 and R1870, ten tens relays TR1810 to TR1800, inclusive, two cycle relays R1920 and R1930, three tone cut-off relays R1940, R1950 and R1960, three control relays R1970, R1980 and R1985 and a lock-out relay R1990.

A better understanding of the connection and arrangement of the apparatus incorporated in the central office of the telephone system will be facilitated from a consideration of the extension of the various test connections and the performance of the various tests in conjunction therewith appearing hereinafter.

*Sect. 3.—Local calls in the central office*

First assuming that a call is initiated at the subscriber substation T in the central office, when this is effected, a circuit, including the line conductors C402 and C403 of the subscriber line 401, the heat coils HC381 and HC382, the contacts 372 and 374 of the jacks J371 and J373 at the main distributor frame, the conductors C404 and C405 and the contacts 426 and 427, is completed for energizing in series the upper and lower windings of the line relay R420 in the line circuit 410 individual to the calling subscriber line 401; whereupon the latter relay operates. Upon operating the line relay R420 completes, at the contacts 421, a path for applying ground potential to the control conductor C406 of the subscriber line 401 in order to mark the subscriber line 401 as busy to the connectors 415, etc., and to the test connector 2100 having access thereto; completes, at the contacts 423, a path, including the contacts 433, for applying battery potential by way of the winding of the cut-off relay R425 to the control conductor C407 of the subscriber line 401; and completes, at the contacts 424, a path, including the contacts 431, for applying ground potential to the start conductor C408 extending to the distributor 411 individual to the group of finder-first selector links associated with the first 100 line group, including the subscriber line 401 extending to the calling subscriber substation T.

The distributor 411 operates to assign an idle one of the finder-first selector links in the first group, such, for example, as the link comprising the finder 412 and the first selector 413; whereupon the finder 412 operates to find the calling subscriber line 401. When the finder 412 finds the calling subscriber line 401, ground potential therein is applied to the control conductor C407 thereof, completing a circuit substantially identical to that previously traced for energizing the winding of the cut-off relay R425; whereupon the latter relay operates to complete, at the contacts 428, a substantially identical holding circuit therefor. Also upon operating, the cut-off relay R425 completes, at the contacts 429, a circuit for operating the lock-out relay R430; and interrupts, at the contacts 426 and 427, the previously traced circuit for maintaining operated the line relay R420 in order to clear the calling subscriber line 401 of attachments. Upon restoring the line relay R420 interrupts, at the contacts 421, the previously mentioned direct path for applying ground potential to the control conductor C406 of the subscriber line 401; and completes, at the contacts 422, a direct connection, including the contacts 428, between the control conductor C406 and the grounded control conductor C407. Also the line relay R420 interrupts, at the contacts 424, the path for applying ground potential to the start conductor C408 extending to the distributor 411; whereby the distributor 411 is released. At this time the finder 412 is directly connected to the line conductors C404 and C405 of the calling subscriber line 401, and consequently to the line conductors C402 and 403 thereof; and dial tone current in the first selector 413 is returned over the subscriber line 401 to the calling subscriber substation T.

The subscriber at the calling subscriber substation T dials the first digit of the directory number of the called subscriber substation, thereby to effect operation of the first selector 413 to select the corresponding group of second selectors, such, for example, as the group including the second selector 414, and then to select an idle second selector therein. Specifically, the first selector 413 may select the particular second selector 414; whereupon the subscriber at the calling subscriber substation T dials the second digit of the directory number of the called subscriber substation. The second selector 414 responds thereto to select the corresponding group of connectors and then to select an idle connector therein. For example, the second selector 414 may be controlled to select the group of connectors, including the connector 415, and then an idle connector therein, such, for example, as the particular connector 415. The subscriber at the calling subscriber substation T then dials the third and fourth digits of the directory number of the called subscriber substation in order to control operation of the connector 415; whereby the subscriber line extending to the called subscriber substation is selected and tested by the connector 415. The subsequent operation of the connector 415 depends upon the idle or busy condition of the called subscriber substation; and the subsequent operation and ultimate release of the apparatus one in accordance with conventional practice.

*Sect. 4.—Ordinary calls from a subscriber substation in the central office to the test board*

In order to extend an ordinary call from a subscriber substation in the central office, such, for example, as the subscriber substation T, to the test board 200, the call is first initiated in the manner previously explained and the four digit directory number assigned to the test board 200 is dialed at the calling subscriber substation. In response to these operations, the finder 412 may find the subscriber line 401 extending to the calling subscriber substation; the first selector 413 may select the second selector 414; the second selector 414 may select the connector 415; and the connector 415 may select the trunk 510 extending to the ring-down trunk circuit 500. The trunk 510 is marked as idle to the connector 415 by the application of battery potential to the control conductor C513 thereof, via the contacts 523 and the resistor 515. When the trunk 510 is thus selected by the connector 415, ringing current in the connector 415 is projected over the line conductors C511 and C512 thereof, completing a circuit, including the condenser 518 for energizing the winding of the ring relay R525; whereupon the latter relay operates. In the ring-down trunk circuit 500, a circuit, including the contacts 533 and 527, is normally completed for maintaining operated the hold relay R530. Upon operating the ring relay R525 interrupts, at the contacts 527, the circuit for maintaining operated the hold relay R530; and completes, at the contacts 526, a circuit, including the contacts 533, for illuminating the answer lamp L514. Shortly thereafter, the hold relay R530, being of the slow to release type, restores to complete, at the contacts 534, a direct alternative circuit for illuminating the answer lamp L514.

The illumination of the answer lamp L514 at the test board 200 indicates to the operator thereat that a call is waiting to be answered upon the ring-down trunk circuit 500; whereupon the operator mentioned operates the individually associated ring-down key K545. When the ring-down key K545 is thus operated, there is completed, at the first contacts thereof, a path for applying battery potential by way of the winding of the busy relay R520 to the control conductor C513 of the trunk 510; whereby ground potential in the connector 415 and applied to the control conductor C513 of the trunk 510 completes a substantially identical circuit for operating the busy relay R520. Upon operating the busy relay R520 completes, at the contacts 524, a direct path for applying ground potential to the control conductor C513 of the trunk 510 and a multiple holding circuit, including the first contacts of the ring-down key K545, for energizing the winding thereof. The application of direct ground potential to the control conductor C513 of the trunk 510 marks the trunk 510 as busy to the other connectors 514, etc., having access thereto. Also the busy relay R520 interrupts, at the contacts 523, the previously traced original path for applying battery potential by way of the resistor 515 to the control conductor C513 of the trunk 510; and completes, at the contacts 521 and 522, paths for applying ground potential by way of the resistors 517 and 516 to the line conductors C511 and C512 of the trunk 510; thereby to cause the connector 415 to switch through and interrupt the projection of ringing current over the line conductors C511 and C512 of the trunk 510 to the ring-down trunk circuit 500 in order to cause the ring relay R525 to restore.

Also when the ring-down key K545 is thus operated, there is completed, at the second contacts thereof, a circuit, including the contacts 536, for operating the answer relay R540. Upon operating the answer relay R540 completes, at the contacts 543, a substantially identical multiple circuit for reoperating the hold relay R530. Upon reoperating the hold relay R530 interrupts, at the contacts 536, the previously traced circuit for maintaining operated the answer relay R540; and completes, at the contacts 535, a substantially identical alternative holding circuit for energizing the winding thereof. Shortly thereafter, the answer relay R540 restores, it being of the slow-to-release type, to interrupt, at the contacts 543, the original circuit for operating the hold relay R530. At this time the hold relay R530 has restored and then reoperated and the answer relay R540 has operated and then restored; whereby a connection, including the contacts 531, 532; the condensers 528, 529; the contacts 541, 542; and the third and fourth contacts of the ring-down key K545 is completed between the line conductors C511 and C512 of the trunk 510 and the line conductors C255 and C254 extending to the test board 200.

In conjunction with operating the ring-down key K545 individual to the ring-down trunk circuit 500, the operator at the test board 200 also operates the first test key K231R; whereby there is completed, at the fourth and fifth contacts thereof, a connection between the line conductors C254 and C255 and the test conductors C272 and C271. The test conductor C271 is extended by way of the contacts 1582, 1576, the second contacts of the test reverse key K1510, the contacts 1454 and 1465, the condenser 831, the contacts 855, the windings 824, 823, and 822 of the talk repeater 821, the contacts 858, the third contacts of the talk battery key K1411, the contacts 1452, the third contacts of the test reverse key K1510, the contacts 1578 and 1584, and the second contacts of the connector release key K1010R to the test conductor C272; whereby an operative connection is completed between the calling subscriber substation T and the talk repeater 821 at the test board 200. At this time it should also be assumed that the plugs P813 and P815 terminating the receiver 811 and the transmitter 812 at the test board 200 are inserted into the respective jacks J814 and J816. When the plugs P813 and P815 are thus inserted, the receiver 811 is connected by way of the condenser 820 and the contacts 851 and 853 across the winding 823 of the talk repeater 821; and the transmitter 812 is connected directly in series with the retard coils 818 and 819 into a circuit between ground and battery potentials. Accordingly, at this time, conversation between the subscriber at the calling subscriber substation T and the operator at the test board 200 may take place.

Also when the plug P815 is inserted into the jack J816, the contacts 817 of the jack J816 are operated closing ground potential upon the conductor C801; whereby a circuit for operating the power relay R1595 is completed; and a multiple circuit, also including the contacts 1591, is completed for illuminating the test battery lamp L1516. The illumination of the test battery lamp L1516 indicates to the operator at the test board 200 that the 48 volts test battery 1525 is at this time connected to the associated test circuit. However, upon operating the power relay R1595 completes, at the contacts 1596, a direct connection between the 115 volts source of A. C. supply and the primary winding of the transformer 1522. Thus, in the event the source of A. C. supply is in order, which is the usual case, the primary winding of the transformer 1522 is energized therefrom; and the winding of the power check relay R1590 is energized in multiple with the primary winding of the transformer 1522 in order to cause the latter relay to operate. Upon operating the power check relay R1590 interrupts, at the contacts 1591, the previously traced circuit for illuminating the test battery lamp L1516, thereby to indicate to the operator at the test board 200 that the associated test circuit is now operatively connected to the power rectifier 1524. More particularly, the secondary winding of the transformer 1522 is directly bridged across the input terminals of the power rectifier 1524; the positive output terminal of the power rectifier 1524 is connected by way of the adjustable resistor 1523 to the conductor C1586; and the negative output terminal of the power rectifier 1524 is connected by way of the resistors 1519 and 1518 and the contacts 1593 to the negative power conductor C1585. Specifically, the power check relay R1590 interrupts, at the contacts 1592, the previously mentioned connection, including the resistor 1517, between the 48 volts test battery 1525 and the negative power conductor C1585; and completes, at the contacts 1593, the above traced connection between the negative output terminal of the power rectifier 1524 and the negative power conductor C1585.

Also when the first test key K231R is thus operated, there is completed, at the eighth contacts thereof, a circuit, including the ninth contacts of the position group key K231F, for operating the cut-off relay R220. Upon operating, the cut-off relay R220 interrupts, at the contacts 221 to 226, inclusive, the connections between the inspector trunk 210 and the test board 200, thereby to render the test board 200 busy to the inspector trunk 210 at this time.

After the operator at the test board 200 converses with the subscriber at the calling subscriber substation, she may proceed to bring about certain tests of the subscriber line 401 and the associated circuits in a manner more fully explained hereinafter. Subsequently, the operator at the test board 200 restores the first test key K231R and the ring-down key K545. When the first test key K231R is restored, there is interrupted, at the eighth contacts thereof, the previously traced circuit for maintaining operated the cut-off relay R220; whereby the latter relay restores in order to reconnect, at the contacts 221, etc., the inspector trunk 210 to the test board 200. Also at the fourth and fifth contacts of the first test key K231R, the test conductors C271 and C272 are disconnected from the line conductors C255 and C254; whereby the test board 200 is disconnected from the ring-down trunk circuit 500. When the ring-down key K545 is restored, there is interrupted, at the third and fourth contacts thereof, the connection between the line conductors C511 and C512 of the trunk 510 and the line conductors C255 and C254 extending to the test board 200. Also there is interrupted at the second contacts of the ring-down key K545, the previously traced holding circuit for maintaining operated the hold relay R530; however, the latter relay does not restore by virtue of the completed original operating circuit therefor. Finally, at the first contacts of the ring-down key K545, there is interrupted, the previously traced holding circuit for maintaining operated the busy relay R520. Upon restoring the busy relay R520 interrupts, at the contacts 521 and 522, the previously traced paths for applying ground potential by way of the resistors 517 and 516 to the line conductors C511 and C512 of the trunk 510. Also the busy relay R520 interrupts, at the contacts 524, the previously mentioned path for applying ground potential to the control conductor C513 of the trunk 510; and recompletes, at the contacts 523, the previously traced original path for applying battery potential by way of the resistor 515 to the control conductor C513. When ground potential is thus removed from the control conductor C513 of the trunk 510 and battery potential is reapplied thereto, the connector 415 is released effecting the release of the second selector 414, the first selector 413, and the finder 412 in a conventional manner.

When the finder 412 is thus released, ground potential therein is removed from the control conductor C407 of the subscriber line 401; whereby the cut-off relay R425 restores in order to interrupt, at the contacts 428, the previously traced connection between the control conductor C407 and the control conductor C406 of the subscriber line 401. Further, the cut-off relay R425 recompletes, at the contacts 426 and 427, the normal connections between the upper and lower windings of the line relay R420 and the line conductors C404 and C405 of the subscriber line 401; whereby the line relay R420 is reoperated in the event the subscriber at the calling subscriber substation T has not replaced the receiver of the telephone instrument thereat upon its associated switchhook at this time. Upon reoperating, the line relay R420 completes, at the contacts 424, a holding circuit, including the contacts 432, for maintaining operated the lock-out relay R430, since the latter relay being of the slow-to-operate type, is also slightly slow to release and does not restore immediately upon the restoration of the cut-off relay R425. The operated line relay R420 retains, at the contacts 421, the application of ground potential upon the control conductor C406 of the subscriber line 401 in order to mark the subscriber line 401 as busy to the connectors 415 etc., and to the test connector 2100 having access thereto. Also the operated lock-out relay R430 retains interrupted, at the contacts 431, the previously traced original path for applying ground potential to the start conductor C408 extending to the distributor 411; thereby to prevent operation of the distributor 411 and the consequent assignment of an idle finder-first selector link at this time. Further, the operated lock-out relay R430 retains interrupted, at the contacts 433, the previously mentioned path for applying battery potential by way of the winding of the cut-off relay R425 to the control conductor C407, thereby positively to prevent an operating finder from finding the subscriber line 401. Accordingly, at this time, the operated line relay R420 and the operated lock-out relay R430 in the line circuit 410 retain the subscriber line 401 locked out of service.

Subsequently, when the subscriber at the calling subscriber substation T replaces the receiver of the telephone instrument thereat upon its associated switchhook, the loop circuit for retaining operated the line relay R420 is interrupted. Upon restoring the line relay R420 interrupts, at the contacts 424, the previously traced holding circuit for maintaining operated the lock-out relay R430; whereupon the latter relay restores shortly thereafter, it being rendered slightly slow-to-release as it is of the slow-to-operate type. Upon restoring, the lock-out relay R430 prepares, at the contacts 431, the connection to the start conductor C408 extending to the distributor 411; and prepares, at the contacts 433, the connection extending to the control conductor C407. Upon restoring, the line relay R420 interrupts, at the contacts 421, the previously mentioned path for applying ground potential to the control conductor C406; and recompletes, at the contacts 422, the previously mentioned path for applying battery potential by way of the winding of the cut-off relay R425 to the control conductor C406. Accordingly, at this time, the restored relays in the line circuit 410 having marked the subscriber line 401 as idle to the connectors 415 etc., and to the test connector 2100 having access thereto. At this time the established connection between the calling subscriber substation T and the called test board 200 is released, and all of the apparatus involved therein is completely released and available for further use.

*Sect. 5.—Inspector calls from a subscriber line in the central office to the test board*

In order to extend an inspector call from a subscriber line in the central office, such, for example, as the subscriber line 401, the inspector seizes the subscriber line 401 in order to bring about operation of the line circuit 410; whereby the distributor 411 is controlled and the finder 412 may seize the subscriber line 401; all in the manner previously explained. The inspector then dials a predetermined first digit in order to cause the first selector to select the group of special second selectors and then an idle special second selector therein. For example, the first selector 413 may select the special second selector 416. The inspector then dials a predetermined second digit in order to cause the special second selector 416 to select the group of incoming trunk circuits, including the incoming trunk circuit 400, and then an idle incoming trunk circuit therein. For example, the special second selector 416 may select the particular trunk 490 extending to the incoming trunk circuit 400, the trunk 490 being marked as idle to the special second selector 416 by the application of battery potential upon the control conductor C493 thereof via a path, including the contacts 438, 481, 467 and the lower winding of the cut-through relay R450. When the special second selector 416 operates to seize the trunk 490, a circuit, including the line conductors C491 and C492 thereof, as well as the contacts 451 and 454, is completed for energizing in series the upper and lower windings of the line relay R440; whereby the latter relay operates. Upon operating the line relay R440 completes, at the contacts 441, a connection including the contacts 454 and 471 and the condenser 431 between the line conductor C492 of the trunk 490 and the interrupted generator conductor C433; whereby ring-back tone current is returned over the connection to the inspector indicating that the test board 200 is being signaled. Also the line relay R440 completes, at the contacts 442, a circuit for operating the hold relay R435. Upon operating the hold relay R435 completes, at the contacts 439, a path for applying ground potential to the control conductor C493 of the trunk 490, thereby to retain operated the special second selector 416 and to mark the trunk 490 as busy to the other special second selectors having access thereto. Further the hold relay R435 completes, at the contacts 436, a circuit, including the contacts 465 for illuminating the answer lamp L445, thereby to indicate to the operator at the test board 200 that a call is waiting to be answered on the inspector trunk 210.

In order to answer the call, the operator at the test board 200 operates the talk key K485F individual to the incoming trunk circuit 400; without operating either the first test key K231R or the second test key K232R. When the talk key K485F is thus operated, there is completed, at the first contacts thereof, a circuit, including the contacts 226, the control conductor C216 of the inspector trunk 210 and the contacts 437 and 464, for energizing the lower winding of the switch relay R460; whereby the latter relay operates to complete, at the contacts 463, a holding circuit, including the contacts 436, for energizing the lower winding thereof. Also the switch relay R460 interrupts, at the contacts 465, the previously traced circuit for illuminating the answer lamp L445; and completes, at the contacts 461 and 462, a connection, including the condensers 443 and 444, as well as the second and third contacts of the talk key K845F, between the line conductors C491 and C492 of the trunk 490 and the line conductors C211 and C212 of the inspector trunk 210.

At this time the line conductors C211 and C212 of the inspector trunk 210 are connected by way of the contacts 221 and 224 to the line conductors C276 and C275; which line conductors C276 and C275 are connected by way of the condensers 833, 832 and the contacts 855, 858 to the extremities of the outer windings 824 and 822 of the talk repeater 821; whereby an operative connection is completed from the calling inspector to the called test board 200 via the subscriber line 401, the finder 412, the first selector 413, the special second selector 416, the trunk 490, the incoming trunk circuit 400, the inspector trunk 210 and the line conductors C275 and C276; whereby the inspector may converse with the operator at the test board 200.

Also upon operating the hold relay R435 completes, at the contacts 437, a multiple circuit, including the contacts 473 for operating the tone relay R475. Upon operating the tone relay R475 completes, at the contacts 477, a substantially identical circuit for operating the tone relay R470. Upon operating the tone relay R470 completes, at the contacts 474, a holding circuit for energizing the winding thereof, including the contacts 437, the first contacts of the talk key K485F, the control conductor C216 of the inspector trunk 210 and the contacts 226. Also the tone relay R470 interrupts, at the contacts 473, the previously traced circuit for maintaining operated the tone relay R475, thereby to cause the latter relay to restore shortly thereafter, it being of the slow-to-release type. Further, upon operating, the tone relay R470 interrupts, at the contacts 471, the previously traced connection between the interrupted generator conductor C433 and the line conductor C492 of the trunk 470; and completes, at the contacts 472, a similar connection, including the condenser 432 and the contacts 476 between the dial tone conductor C434 and the line conductor C492 of the trunk 490. When the tone relay R475 subsequently restores as noted above, it interrupts, at the contacts 476, the connection between the dial tone conductor C434 and the line conductor C492 of the trunk 490. Accordingly, when the operator at the test board 200 answers the call by operating the talk key K485F, the tone relays R470 and R475 are controlled in the manner explained above; whereby ring-back tone current is removed from the line conductor C492 and a splash of dial tone current is returned thereover and then removed therefrom. The return of the splash of dial tone current over the trunk 490 and the previously described connection to the inspector indicates to him that the operator at the test board 200 has answered the call and that conversation may proceed as previously noted.

At this time the operator at the test board 200 may make certain tests on the subscriber line 401 to which the inspector is connected. More particularly, the operator at the test board 200 restores the talk key K485F and operates the test hold key K485R, both individual to the incoming trunk circuit 400. When the test hold key K485R is thus operated, there is completed, at the third contacts thereof, an alternative holding circuit, including the grounded control conductor C216 of the inspector trunk 210 for maintaining operated the tone relay R470; and there is completed, at the first contacts thereof, a circuit for operating the busy relay R480. Upon operating the busy relay R480 completes, at the contacts 482, a holding circuit, including the contacts 468, for maintaining operated the hold relay R435. Also when the test hold key K485R is thus operated, there is prepared, at the second contacts thereof, a circuit, including the contacts 466, the control conductor C215 of the inspector trunk 210, the contacts 225, and the control conductor C274, for energizing the upper winding of the cut-through relay R450; which circuit is completed when the operator at the test board 200 sets up a test as explained more fully hereinafter. More particularly, when the operator at the test board 200 sets up a test, the start relay R1450 is operated to complete, at the contacts 1454', a path for applying ground potential to the control conductor C274; whereby the above traced circuit for energizing the upper winding of the cut-through relay R450 is completed. Upon operating the cut-through relay R450 interrupts, at the contacts 451 and 454, the previously traced loop circuit for energizing in series the upper and lower windings of the line relay R440; completes, at the contacts 453, a holding circuit for energizing in series the upper and lower windings of the line relay R440 and the upper winding of the switch relay R460. Further, the cut-through relay R450 completes, at the contacts 452 and 455, a direct metallic connection, short-circuiting the condensers 443 and 444, between the line conductors C491 and C492 of the trunk 490 and the line conductors C214 and C213 of the inspector trunk 210; the line conductors C491 and C492 being connected by way of the contacts 452, 455 and 461, 462 and the fourth and fifth contacts of the test hold key K485R to the line conductors C214 and C213 of the inspector trunk 210. Finally, the line conductors C213 and C214 of the inspector trunk 210 are connected by way of the resistors 227 and 228 and the contacts 222 and 223 to the test conductors C271 and C272 extending to the test circuit at the test board 200.

Each time the operator at the test board 200 completes the test, the corresponding keys utilized in conjunction therewith, as explained more fully hereinafter, are restored bringing about the restoration of the start relay R1450; whereby ground potential is removed, at the contacts 1454', from the control conductor C274 interrupting the previously traced circuit for energizing the upper winding of the cut-through relay R450; whereupon the latter relay restores. Upon restoring the cut-through relay R450 interrupts, at the contacts 453, the previously traced series holding circuit for energizing the upper and lower windings of the line relay R440 and the upper winding of the switch relay R460; interrupts, at the contacts 452 and 455, the paths for short-circuiting the condensers 443 and 444; and recompletes, at the contacts 451 and 454, the previously traced original circuit for energizing in series the upper and lower windings of the line relay R440. Accordingly, at this time, a substantially identical connection, including the condensers 443 and 444 is completed between the line conductors C491 and C492 of the trunk 490 and the line conductors C214 and C213 of the inspector trunk 210; which line conductors C213 and C214 are operatively connected to the test conductors C271 and C272; which, in turn, are connected to the talk repeater 821 in the test circuit at the test board 200; whereby the inspector may again talk to the operator at the test board 200 while the test hold key K485R occupies its operated position.

Of course, it will be understood that when the talk key K485F is restored as the test hold key K485R is operated, that the line conductors C491 and C492 of the trunk 490 are disconnected at the second and third contacts of the talk key K485F from the line conductors C211 and C212 of the inspector trunk 210.

Subsequently, the inspector disconnects from the subscriber line 401 interrupting the loop circuit for energizing in series the upper and lower windings of the line relay R440 in order to cause the latter relay to restore. When the operator at the test board 200 then restores the test hold key K485R, there is interrupted, at the first contacts thereof, the circuit for maintaining operated the busy relay R480. Upon restoring the busy relay R480 interrupts, at the contacts 482, the holding circuit for maintaining operated the hold relay R435; whereby the latter relay restores shortly thereafter, it being of the slow-to-release type. Upon restoring, the hold relay R435 interrupts, at the contacts 436, the holding circuit for energizing the lower winding of the switch relay R460 in order to cause the latter relay to restore. Further, when the test hold key K485R is restored, there is interrupted, at the third contacts thereof, the holding circuit for maintaining operated the tone relay R470; whereby the latter relay restores shortly thereafter, it being of the slow-to-release type. Also upon restoring, the hold relay R435 interrupts, at the contacts 439, the previously mentioned path for aplying ground potential to the control conductor C493 of the trunk 490; and recompletes, at the contacts 438, the previously traced path for applying battery potential by way of the lower winding of the cut-thru relay relay R450 to the control conductor C493. When ground potential is thus removed from the control conductor C493 of the trunk 490, the special second selector 416, the first selector 413 and the finder 412 are released, they being operated. Also the application of battery potential to the control conductor C493 marks the trunk 490 as idle to the special second selectors 416, etc., having access thereto. At this time, the established connection between the calling inspector and the called test board 200 via the subscriber line 401 is released, and all of the apparatus involved therein is completely released and available for further use.

*Sect. 6.—Direct calls by a test man from a subscriber substation in the central office to the testing apparatus associated with the test board*

A test man at a subscriber substation, such, for example, as the subscriber substation T, may initiate a call on the associated subscriber line 401 and then control the switching apparatus in order to extend a connection via the trunk 495 to the switching apparatus associated with the test board 200; and then control the switching apparatus to perform certain tests in conjunction with the substation apparatus at the calling subscriber substation T; all without the aid of the operator at the test board 200. When the test man initiates the call at the calling subscriber substation T, the finder 412 may find the calling subscriber line 401, and the first selector 413 may be controlled to select the special second selector 416. The special second selector 416 may then be controlled to select the trunk 495 extending to the testing apparatus associated with the test board 200. The trunk 495 is normally marked as idle by the application of battery potential upon the control conductor C498 thereof by way of the contacts 1233 and the resistor 1213. When the special second selector 416 seizes the trunk 495, a loop circuit is completed via the line conductors C496 and C497 thereof, directly to the upper and lower windings of the line relay R1100 in order to cause the latter relay to operate. Upon operating the line relay R1100 completes, at the contacts 1102, a circuit for operating the pulse relay R1280; and upon operating, the pulse relay R1280 completes, at the contacts 1283, a circuit for operating the hold relay R1230. Upon operating the hold relay R1230 interrupts, at the contacts 1233, the previously traced path for applying battery potential by way of the resistor 1213 to the control conductor C498; and completes, at the contacts 1232, a direct path for applying ground potential to the control conductor C498, thereby to retain operated the special second selector 416 and to mark the trunk 495 as busy to the other special second selectors having access thereto. Also the hold relay R1230 completes, at the contacts 1235, a circuit for illuminating the busy lamp L1210, thereby to indicate to the operator at the test board 200 that the testing apparatus associated therewith has been seized directly by a test man from a calling subscriber substation in the central office and is now busy. The test man at the calling subscriber substation T may now dial certain digits over the subscriber line 401 in order to control the line relay R1100; whereby the testing apparatus associated with the test board 200 is governed to perform certain tests as explained more fully hereinafter; all without the aid of the operator at the test board 200.

Subsequently, the test man at the calling subscriber substation may disconnect effecting the restoration of the line relay R1100 and the consequent restoration of the pulse relay R1280; whereby the hold relay R1230 restores shortly thereafter, it being of the slow-to-release type. Upon restoring, the hold relay R1230 interrupts, at the contacts 1235, the previously mentioned circuit for illuminating the busy lamp L1210, thereby to indicate to the operator at the test board 200 that the testing apparatus associated therewith has been released by the test man at the calling subscriber substation in the central office. Further, the hold relay R1230 interrupts, at the contacts 1232, the previously mentioned path for applying ground potential to the control conductor C498; and recompletes, at the contacts 1233, the previously traced path for applying battery potential by way of the resistor 1213 to the control conductor C498. When ground potential is thus removed from the control conductor C498 of the trunk 495, the special second selector 416, the first selector 413 and the finder 412 are released; and when battery potential is returned upon the control conductor C498 of the trunk 495, the trunk 495 is marked as idle to the special second selectors 416, etc., having access thereto. At this time the established connection between the calling subscriber substation T set up by the test man to the testing apparatus associated with the test board 200 is released, and all of the apparatus involved in this established connection is completely released and available for further use.

*Sect. 7.—Calls from the manual switchboard to the test board*

When the operator at the manual switchboard 570 has connected to a circuit which requires testing by the operator at the test board 200, the operator at the manual switchboard 570 converses with the operator at the test board 200 over an order wire, no shown; whereupon the operator at the test board 200 assigns a test trunk, such, for example, as the test trunk 575 to the operator at the manual switchboard 570; and then the operators at the manual switchboard 570 and at the test board 200 release the order wire, not shown. The operator at the manual switchboard 570 inserts the plug P576 terminating the test trunk 575 into the jack terminating the circuit requiring testing; and the operator at the test board 200 operates the test trunk key K580, individual to the test trunk 575, in conjunction with the second test key K232R. When the test trunk key K580 is thus operated, the tip and the ring of the plug P576 are connected at the first and second contacts thereof to the line conductors C264 and C265; and the line conductors C264 and C265 are connected at the fourth and fifth contacts of the second test key K232R to the test conductors C272 and C271 in the test circuit at the test board 200; whereby the operator at the test board 200 may test the circuit terminating upon the jack into which the operator at the manual switchboard 570 has inserted the plug P576 terminating the assigned test trunk 575. After the operator at the test board 200 has finished her testing of the circuit mentioned, she restores the second test key K232R, thereby to recomplete, at the ninth contacts thereof, a path for applying ground potential by way of the ninth contacts of the test tie key K232F to the control conductor C279; which application of ground potential to the control conductor C279 effects the application of ground potential by way of the third contacts of the operated test trunk key K580 to the control conductor of the test trunk 575. This application of ground potential to the control conductor of the test trunk 575 and consequently to the sleeve of the plug P576 renders to the operator at the manual switchboard 570 disconnect supervision; whereupon the operator at the manual switchboard 570 withdraws the plug P576 from the jack terminating the circuit requiring testing. Shortly after restoring the second test key K232R, the operator at the test board 200 restores the test trunk key K580 in order to interrupt the connection to the test trunk 575. At this time the established connection between the manual switchboard 570 and the test board 200 is released.

*Sect. 8.—Ordinary calls from the test board to a subscriber substation in the central office*

Assuming that an ordinary call is to be extended from the test board 200 to the subscriber substation T in the central office, the operator at the test board 200 may utilize the dial trunk circuit 600 by operating the out-dial key K615 individual thereto in conjunction with the second test key K232R. When the out-dial key K615 is thus operated, there is completed, at the first contacts thereof, a circuit for energizing the left-hand winding of the answer relay R610; thereby to pole the latter relay to operate when the right-hand winding thereof is substantially energized in a predetermined direction. Also when the out-dial key K615 is thus operated in conjunction with the second test key K232R, battery potential is applied by way of the winding of the dial relay R620, the second contacts of the out-dial key K615, the conductor C278 and the seventh contacts of the second test key K232R to the dial conductor C277. Further the line conductors C606 and C607 of the trunk 605 extending to the line circuit 417 are connected by way of the condensers 613 and 614, the fifth and fourth contacts of the out-dial key K615, the line conductors C264 and C265, and the fifth and fourth contacts of the second test key K232R to the test conductor C272 and C271 in the test circuit at the test board 200. Also when the out-dial key K615 is thus operated, there is completed, at the third contacts thereof, a circuit, including the contacts 622, for bridging the right-hand winding of the answer relay R610 across the line conductors C606 and C607 of the trunk 605; whereby the right-hand winding of the answer relay R610 is energized, being poled not to operate. However, the line circuit 417 operates placing ground upon the associated start conductor C609 in order to effect operation of the distributor 411. Again it may be assumed that the distributor 411 assigns the link comprising the finder 412 and the first selector 413 and that the finder 412 finds the trunk 605 extending to the line circuit 417; whereupon dial tone current in the finder 412 is returned over the trunk 605 and consequently over the connection, including the condensers 613 and 614, the line conductors C264 and C265 and the test conductors C271 and C272 to the talk repeater 821 at the test board 200 in order to indicate to the operator thereat that she may proceed to dial the first digit.

The operator at the test board 200 then operates the finger wheel of the dial 1428 in accordance with the first digit of the directory number of the called subscriber substation T; whereby the second and third contacts thereof are closed when the finger wheel is rotated away from its normal position, grounding the dial conductor C277 and completing a circuit for operating the dial relay R1460. The application of ground potential to the dial conductor C277 completes the previously traced circuit for operating the dial relay R620 in the dial trunk circuit 600; whereupon the latter relay interrupts, at the contacts 622, the previously traced circuit for bridging the right-hand winding of the answer relay R610 across the line conductors C606 and C607 of the trunk 605; and completes, at the contacts 621 and 623, direct connections, short-circuiting the condensers 613 and 614, between the line conductors C606 and C607 of the trunk 605 and the line conductors C264 and C265; the connection mentioned, including the fifth and fourth contacts of the out-dial key K615. Upon operating the dial relay R1460 completes, at the contacts 1464, an impulsing path, including the first or impulsing contacts of the dial 1428 across the test conductors C271 and C272. At this time the test conductor C271 is connected by way of the contacts 1582 and 1576, the second contacts of the test reverse key K1510, the contacts 1454, the first contacts of the dial 1428, the contacts 1464 and 1452, the third contacts of the test reverse key K1510, the contacts 1578 and 1584 and the second contacts of the connector release key K1010R to the test conductor C272. Accordingly, the loop circuit extending to the first selector 413 includes the bridge at the first contacts of the dial 1428 across the test conductors C271 and C272. Hence, when the finger wheel of the dial 1428 is released, the first or impulsing contacts thereof are controlled in accordance with the present digit; whereby the impulses thereof are transmitted over the connection above traced to the first selector 413 in order to control operation thereof. For example, the first selector 413 may select the second selector 414 in the manner previously explained. At the conclusion of the first digit of the directory number of the called subscriber substation T dialed at the test board 200, the finger wheel of the dial 1428 is returned to its normal position interrupting, at the second and third contacts thereof the circuit for maintaining operated the dial relay R1460 and the path for applying ground potential to the dial conductor C277. When ground potential is removed from the dial conductor C277, the previously traced circuit for maintaining operated the dial relay R620 in the dial trunk circuit 600 is interrupted; whereby the latter relay restores, interrupting, at the contacts 621 and 623, the metallic connections between the line conductors C606 and C607 of the trunk 605 and the line conductors C264 and C265; whereby the connections therebetween, including the condensers 613 and 614 are recompleted. Also the dial relay R620 again bridges, at the contacts 622, the right-hand winding of the answer relay R610 across the line conductors C606 and C607 of the trunk 605, thereby to retain operated the first selector 413. Shortly after the circuit for maintaining operated the dial relay R1460 is interrupted, the latter relay restores, as it is of the slow-to-release type, interrupting, at the contacts 1464, the impulsing bridge between the first contacts of the dial 1428 and the test conductors C271 and C272.

In a similar manner, the operator at the test board 200 dials the second, third and fourth digits of the directory number of the called subscriber substation T. The second selector 414 responds to the second digit and may select the connector 415. The connector 415 responds to the third and fourth digits, selecting the subscriber line 401 extending to the called subscriber substation T. The subsequent operation of the connector 415 depends upon the idle or busy condition of the called sbscriber substation T at this time. First assuming that the called subscriber substation T is busy, busy tone current is returned over the connection from the connector 415 to the test board 200 in order to indicate the condition mentioned to the operator thereat. On the other hand, in the event the called subscriber substation T is idle, the connector 415 operates to return ring-back tone current over the connection to the test board 200 and to project ringing current over the subscriber line 401 to the called subscriber substation T. Subsequently, when the subscriber at the called subscriber substation T answers the call, the connector 415 operates to interrupt the projection of ringing current over the subscriber line 401 and to interrupt the return of ring-back tone current over the connection to the test board 200. Also the connector 415 operates to reverse the polarity over the connection, including the trunk 605; whereby the right-hand winding of the answer relay R610 is poled to operate. Upon operating the answer relay R610 completes, at the contacts 611, a circuit for illuminating the supervisory lamp L612, thereby to indicate to the operator at the test board 200, that the call has been answered at the called subscriber substation T. At this time the operator at the test board 200 may converse with the subscriber at the called subscriber substation T.

When the subscriber at the called subscriber substation T later disconnects, the connector 415 reverses the polarity over the connection including the trunk 605 in order to pole the right-hand winding of the answer relay R610 to restore. Upon restoring the answer relay R610 interrupts, at the contacts 611, the circuit for illuminating the supervisory lamp L612 in order to render a disconnect signal to the operator at the test board 200. The operator at the test board 200 may then release the connection by restoring the out-dial key K615 and the second test key K231R in order to interrupt, at the third contacts of the out-dial key K615, the connection for bridging the right-hand winding of the answer relay R610 across the line conductors C606 and C607 of the trunk 605; whereupon the connector 415, the second selector 414, the first selector 413 and the finder 412 are released; the line circuit 417 operating in order to remove ground potential from the control conductor C608 of the trunk 605 to effect the release of the switches noted above. Also when the out-dial key K615 is restored, there is interrupted, at the first contacts thereof, the previously mentioned circuit for energizing the left-hand winding of the answer relay R610. At this time, the established connection between the calling test board 200 and the called subscriber substation T is released, and all of the apparatus involved therein is completely released and available for further use.

*Sect. 9.—Calls from the test board via the line test circuit to a subscriber line in the central office*

Now assuming that the shoes S365 and S366 have been inserted into the jacks J371 and J373 at the main distributor frame terminating the subscriber line 401 and that the plugs P363 and P364 have been inserted into the jacks J361 and J362 terminating the test line circuit 300, the subscriber line extending to the subscriber substation T in the central office remains in service. More particularly, the line conductor C402 of the subscriber line 401 is connected by way of the heat coil HC381, the tip of the jack J371, the tip of the shoe S365, the tip of the plug P363, the tip of the jack J361, the contacts 332 and 341, the tip of the jack J362, the tip of the plug P364, the ring of the shoe S365 and the ring of the jack J371 to the line conductor C404; and the line conductor C403 of the subscriber line 401 is connected by way of the heat coil HC382, the tip of the jack J373, the tip of the shoe S366, the ring of the plug P363, the ring of the jack J361, the contacts 334 and 343, the ring of the jack J362, the ring of the plug P364, the ring of the shoe S366 and the ring of the jack J373 to the line conductors C405; and the line conductors C404 and C405 are connected by way of the contacts 426 and 427 to the upper and lower windings of the line relay R420 in the line circuit 410 individual to the subscriber line 401. Specifically, when the shoes S365 and S366 are inserted into the associated jacks J371 and J373, the contacts 372 and 374 of the respective jacks are opened and the circuit connections in the line test circuit 300 substituted therefor as described above. Accordingly, the subscriber line 401 remains in service and calls may be initiated at and extended from and to the subscriber substation T.

Now assuming that the operator at the test board 200 desires to test the subscriber line 401 and that the connections above described have been made, she merely operates the listen key K351R individual to the line test circuit 300 in conjunction with the first test key K231R. At this time, the junction between the tips of the jacks J361 and J362, at the contacts 332, is connected by way of the condenser 316, the resistor 323 and the second contacts of the listen key K351R to the line conductor C255; and the junction of the rings of the jacks J361 and J362, at the contacts 334, is connected by way of the condenser 317, the resistor 324 and the first contacts of the listen key K351R to the line conductor C254; the line conductors C254 and C255 are connected by way of the fourth and fifth contacts of the first test key K231R to the test conductors C272 and C271 extending to the test circuit at the test board 200; whereby the operator at the test board 200 may listen upon the subscriber line 401 without initiating a call thereon.

Now assuming that the operator at the test board 200 listens in on the subscriber line 401 and finds it idle and desires to test the outgoing section thereof comprising the line conductors C402 and C403 extending from the central office to the subscriber substation T, she operates the out-line key K352F and restores the listen key 351R. When the out-line key K352F is thus operated, there is completed, at the third contacts thereof, a circuit, including the resistor 322 for energizing in series the windings of the out-line relay R320 and the in-drop relay R330; whereby the relays mentioned operate, the out-line relay R320 being of the marginal type. Upon operating the outline relay R320 completes, at the contacts 321, a circuit for operating the out-line slave relay R340. Upon operating the indrop relay R330 interrupts, at the contacts 332 and 334, the previous connections, including the condensers 316 and 317; and completes, at the contacts 331 and 333, alternative connections excluding the condensers mentioned. Upon operating, the out-line slave relay R340 interrupts, at the contacts 341 and 343, further points in the previously traced connections; and completes, at the contacts 342 and 344, alternative connections traced hereinafter. At this time the line conductor C254 is connected by way of the first contacts of the out-line key K352F, the resistor 324, the contacts 333 and 344, the ring of the jack J361, the ring of the plug P363, the tip of the shoe S366, the tip of the jack J373 and the heat coil HC382 to the line conductor C403 of the subscriber line 401; and the line conductor C255 is connected by way of the second contacts of the out-line key K352F, the resistor 323, the contacts 331 and 342, the tip of the jack J361, the tip of the plug P363, the tip of the shoe S365, the tip of the jack J371 and the heat coil HC381 to the line conductor C402 of the subscriber line 401. Accordingly, at this time the operator at the test board 200 may perform certain tests on the line conductors C402 and C403 of the subscriber line 401; or she may cause the subscriber line 401 to be rung down in order to set up a communication connection between the calling test board 200 and the called subscriber substation T.

Now assuming that the in-drop section of the subscriber line 401 comprising the line conductors C404 and C405 is to be tested by the operator at the test board 200, the out-line key K352F is restored and the in-drop key K352R is operated. When the out-line key K352F is restored, there is interrupted, at the third contacts thereof the previously traced circuit for maintaining operated the out-line relay R320 and the in-drop relay R330. Upon restoring the outline relay R320 interrupts, at the contacts 321, the circuit for maintaining operated the line-out slave relay R340. When the in-drop key K352R is thus operated, there is completed, at the third contacts thereof, a circuit, including the resistor 325 and the resistor 322 for energizing in series the windings of the out-line relay R320 and the in-drop relay R330; whereby the in-drop relay R330 operates, but the out-line relay R320 does not operate as it is of the marginal type. Upon operating, the in-drop relay R330 interrupts, at the contacts 332 and 334 the previously traced connections; and completes, at the contacts 331 and 333 alternative connections. More particularly, the line conductor C254 is connected by way of the first contacts of the in-drop key K352R, the resistor 324, the contacts 333 and 343, the ring of the jack J362, the ring of the plug P364, the ring of the shoe S366 and the ring of the jack J373 to the line conductor C405 of the subscriber line 401; and the line conductor C255 is connected by way of the second contacts of the in-drop key K352R, the resistor 323, the contacts 331 and 341, the tip of the jack J362, the tip of the plug P364, the ring of the shoe S365 and the ring of the jack J371 to the line conductor C404 of the subscriber line 401. Accordingly, at this time, the operator at the test board 200 may perform certain tests on the line conductors C404 and C405 of the subscriber line 401 and the connected line relay R420 in the individually associated line circuit 410.

More particularly, battery potential and ground potential are respectively connected by way of the upper and lower windings of the line relay R420 to the line conductors C255 and C254; which, in turn, are connected by way of the fifth and fourth contacts of the first test key K231R to the conductors C271 and C272 in the test circuit at the test board 200. At this time the test conductor C271 is connected by way of the contacts 1582 and 1576, the second contacts of the test reverse key K1510, the contacts 1454, the first contacts of the dial 1428, the first contacts of the talk battery key K1411, the left-hand winding of the retard coil 1434, the winding of the loop hold relay R1440 and the contacts 1449′ to ground potential; whereby the winding of the loop hold relay R1440 is energized in series with the upper winding of the line relay R420 causing the loop hold relay R1440 to operate. Upon operating the loop hold relay R1440 completes, at the contacts 1444, a connection from battery potential, including the contacts 1448, the right-hand winding of the retard coil 1344, the contacts 1555, 1476, and 1452, the third contacts of the test reverse key K1510, the contacts 1578 and 1584 and the second contacts of the connector release key K1010R, between the winding of the loop test relay R1445 and the test conductor C272; whereby the lower winding of the line relay R420 is energized in series with the winding of the loop test relay R1445 causing the loop test relay R1445 to operate. Upon operating, the loop test relay R1445 completes, at the contacts 1447, a holding circuit, including the contacts 1443, for energizing the winding thereof; interrupts, at the contacts 1448, the original operating circuit therefor; interrupts, at the contacts 1449′, the previously traced circuit for energizing the winding of the loop hold relay R1440 in series with the upper winding of the line relay R420; and completes, at the contacts 1449, a path for bridging the winding of the loop hold relay R1440 across the left-hand and right-hand windings of the retard coil 1434; whereby the winding of the loop hold relay R1440 is bridged across the upper and lower windings of the line relay R420. Accordingly, the loop hold relay R1440 is retained in its operated position and the line relay R420 operates. Further, the loop test relay R1445 completes, at the contacts 1446, a circuit for illuminating the dial battery lamp L1417 in order to indicate to the operator at the test board 200 that the connection has been extended to the line relay in the line circuit 410 individual to the subscriber line 401.

Upon operating the line relay R420 effects operation of the distributor 411; whereby the finder 412 may find the line conductors C404 and C405 of the subscriber line 401 effecting operation of the cut-off relay R425 and the consequent restoration of the line relay R420; all in the manner described in Sect. 3. At this time the line relay in the first selector 413 is substituted for the line relay R420 in the line circuit 410 in the loop circuit extending back to the winding of the loop hold relay R1440. When the operator at the test board 200 receives dial tone indicating that the finder 412 has found the line conductors C404 and C405 of the subscriber line 401, she may proceed to dial a digit employing the dial 1428; whereby the dial relay R1460 is operated as previously explained. Upon operating the dial relay R1460 completes, at the contacts 1463, a holding circuit, including the contacts 1447, for maintaining operated the loop test relay R1445; and completes, at the contacts 1464, the previously traced path, including the first or impulsing contacts of the dial 1428 across the test conductors C271 and C272; whereby the first or impulsing contacts of the dial 1428 may effect the transmission of the impulses of present digit over the connection to the first selector 413 in order to control operation thereof. Also upon operating the dial relay R1460 interrupts, at the contacts 1465, a normally completed path, short-circuiting the resistor 1418 and the associated series connected condenser 1419; whereby the last two mentioned elements are connected across the first or impulsing contacts of the dial 1428 that are alternately opened and closed. At the conclusion of the digit, the second contacts of the dial 1428 are opened effecting restoration of the dial relay R1460 shortly thereafter in the manner previously explained; whereby the loop hold relay R1440 is retained in its operated position over the loop circuit extending from the second selector 414, etc., selected by the first selector 413, at this time. In a similar manner, the operator at the test board 200 may control the subsequent switches in the switch train in order to extend the connection to a called subscriber substation in the central office.

At the conclusion of the connection, when the operator at the test board 200 restores the in-drop key K352R, the loop circuit extending to the connector 415, for example, from the loop hold relay R1440 is interrupted, bringing about the release of the connector 415, the second selector 414, the first selector 413, and the finder 412 in an obvious manner. Also, the loop hold relay R1440 restores in order to interrupt, at the contacts 1443, the holding circuit for maintaining operated the loop test relay R1445; whereby the latter relay restores shortly thereafter, it being of the slow-to-release type. Upon restoring, the loop test relay R1445 interrupts, at the contacts 1446, the circuit for illuminating the dial battery lamp L1417. Also when the finder 412 is thus released, the cut-off relay R425 restores, reconnecting, at the contacts 426 and 427, the upper and lower windings of the line relay R420 to the line conductors C404 and C405 of the subscriber line 401. At this time the established connection from the calling test board 200 through the in-drop section of the subscriber line 401 and to the called subscriber substation in the central office is released and all of the apparatus involved therein is completely released and available for further use.

Reconsidering the extension of the connection from the calling test board 200 through the line test circuit 300 to the in-drop section of the subscriber line 401 incident to operation of the in-drop key K352R, it will be understood that when the in-drop key K352R is thus operated, the dial battery lamp L1417 will be illuminated shortly thereafter in the event the line relay R420 is in operative condition and battery current is supplied through the upper winding thereof and through the winding of the loop hold relay R1440 in the manner explained above. However, in the event the in-drop section of the subscriber line 401 is locked out of service by the operated line relay R420 and lock-out relay R430 by virtue of the presence of a high resistance ground short-circuit between the line conductors C402 and C403 of the subscriber line, insufficient current will be supplied through the upper winding of the line relay R420 and the winding of the loop hold relay R1440 to effect operation of the loop hold relay R1440. Accordingly, the loop test relay R1445 is not operated to effect illumination of the dial battery lamp L1417. The operator at the test board 200 suspects the difficulty since she knows that the subscriber line 401 is not actually busy as she heard no conversation thereon when the listen key K351R was operated.

In order to attempt the clearance of the in-drop section of the subcriber line 401, the operator at the test board 200 operates the talk battery key K1411 in conjunction with the test reverse key K1510. At this time ground potential is applied by way of the left-hand winding of the retard coil 1433, the second contacts of the talk battery key K1411, the first contacts of the dial 1428, the contacts 1454, the fourth contacts of the test reverse key K1510, the contacts 1578 and 1584, and the second contacts of the connector release key K1010R to the test conductor C272; and battery potential is applied by way of the right-hand winding of the retard coil 1433, the fifth contacts of the talk battery key K1411, the contacts 1452, the first contacts of the test reverse key K1510 and the contacts 1576 and 1582 to the test conductor C271. Accordingly, the normal potentials on the test conductors C271 and C272 are reversed; whereby the upper and lower windings of the line relay R420 are short-circuited through the left-hand and right-hand windings of the retard coil 1433. In the event the short-circuit between the line conductors C402 and C403 of the subscriber line 401 contains considerable resistance, the windings of the line relay R420 are effectively deenergized, causing restoration of the line relay R420 and the resulting restoration of the lock-out relay R430.

The operator at the test board 200 then restores the test reverse key K1510 and the talk battery key K1411; whereby the loop hold relay R1440 and then the loop test relay R1445 operate, the loop test relay R1445 effecting illumination of the dial battery lamp L1417 as previously explained. The operator at the test board 200 then proceeds to operate the first selector of the connected finder-first selector link in the manner previously explained utilizing the dial 1428. Of course, it will be understood that in the event the short-circuit across the line conductors C402 and C403 of the subscriber line 401 is of the low resistance type, it is impossible to bring about the restoration of the line relay R420 except by opening the circuit thereto at the main distributor frame. However, the operator at the test board 200 may determine this circumstance and pass an appropriate order to the repairman in this regard.

Now assuming that the heat coils HC381 and HC382 included in the line conductors C402 and C403 of the subscriber line 401 at the main distributor frame are to be tested, the operator at the test board 200 restores the in-drop key K352R and operates the heat coil key K351F. When the in-drop key K352R is thus restored, there is interrupted, at the third contacts thereof, the previously traced circuit for maintaining operated the in-drop relay R330; and when the heat coil key K351F is thus operated, there is completed, at the first contacts thereof, a circuit for operating the heat coil relay R310. Upon operating, the heat coil relay R310 completes, at the contacts 311, a path, including the contacts 332, the tip of the jack J361, the tip of the plug P363, the tip of the shoe S265, and the tip of the jack J371, for grounding the near terminal of the heat coil HC381; and completes, at the contacts 314, a path, including the contacts 334, the ring of the jack J361, the ring of the plug P363, the tip of the shoe S366 and the tip of the jack J373 for grounding the near terminal of the heat coil HC382. Also the heat coil relay R310 completes, at the contacts 311, a multiple path, including the contacts 341, the tip of the jack J362, the tip of the plug P364, the ring of the shoe S365, and the ring of the jack J371 for applying ground potential to the line conductor C404; and completes, at the contacts 314, a multiple path, including the contacts 343, the ring of the jack J362, the ring of the plug P364, the ring of the shoe S366 and the ring of the jack J373 for applying ground potential to the line conductor C405. Further, the heat coil relay R310 completes, at the contacts 312, a connection between the line conductor C254 and the remote terminal of the heat coil HC381; and completes, at the contacts 315, a connection between the line conductor C255 and the remote terminal of the heat coil HC382. Specifically, the line conductor C254 is connected by way of the second contacts of the heat coil key K351F, the resistor 324, the contacts 312, the sleeve of the jack J361, the sleeve of the plug P363, the sleeve of the shoe S365, and the sleeve of the jack J371 to the remote terminal of the heat coil HC381; and the line conductor C255 is connected by way of the third contacts of the heat coil key K351F, the resistor 323, the contacts 315, the sleeve of the jack J362, the sleeve of the plug P364, the sleeve of the shoe S366, and the sleeve of the jack J373 to the remote terminal of the heat coil HC382. At this time the operator at the test board 200 may selectively test the heat coils HC381 and HC382. Thereafter, the operator at the test board 200 restores the heat coil key K351F in order to interrupt, at the first contacts thereof, the circuit for maintaining operated the heat coil relay R310; whereby the line test circuit 300 is released. At this time the operator at the test board 200 also restores the first test key K231R.

*Sect. 10.—Calls from the test board via the test distributor trunk circuit to a subscriber line in the central office*

Now assuming that a call is to be extended from the test board 200 via the test distributor trunk circuit 700 to a subscriber substation, such, for example, as the subscriber substation T in the central office, the operator at the test board 200 first operates the test distributor key K725 individual to the test distributor trunk circuit 700 in conjunction with the first test key K231R. When the test distributor key K725 is thus operated, there is completed, at the fifth contacts thereof, a circuit for operating the seize relay R710; whereby the latter relay completes, at the contacts 711, a circuit for illuminating the busy lamp L722 in order to indicate the busy condition of the test distributor trunk circuit 700. Also the seize relay R710 completes, at the contacts 715, a circuit, including the contacts 771, for operating the hold relay R745. Upon operating the hold relay R745 completes, at the contacts 746, a multiple circuit for illuminating the busy lamp L722. Also, at the sixth contacts of the test distributor key K725, a circuit is completed for energizing in series the windings of the release relay R780 and the B. C. O. control relay R770; which circuit includes the conductor C251, the first contacts of the first test key K231R, the conductor C273, the first contacts of the connector release key K1010R, and the resistor 1017; whereby the release relay R780 operates, but the B. C. O. control relay R770 does not operate as it is of the marginal type. Upon operating the release relay R780 completes, at the contacts 781, a path for applying ground potential to the control conductor C765 for a purpose more fully explained hereinafter. Also at this time, the line conductors C254 and C255 are connected by way of the second and first contacts of the test distributor key K725, the contacts 731, 733, the resistors 752, 753, the conductors C761, C762, the contacts 2012, 2014, and the upper and lower windings of the line relay R2020 respectively to ground and battery potentials. Further, the line conductors C254 and C255 are connected by way of the fourth and fifth contacts of the first test key K231R to the test conductors C272 and C271. Accordingly, the lower winding of the line relay R2020 is energized in series with the winding of the loop hold relay R1440 causing the latter relay to operate and effect the operation of the loop test relay R1445; whereby the winding of the loop hold relay R1440 is bridged across the test conductors C271 and C272 in the manner explained in Sect. 9. Also upon operating the loop test relay R1445 effects illumination of the dial battery relay R1417 to indicate to the operator at the test board 200 that the test distributor circuit 700 has been seized.

Also the upper and lower windings of the line relay R2020 in the test distributor switch 2000 are energized in series with the winding of the loop hold relay R1440; whereby the line relay R2020 operates to complete, at the contacts 2022, a circuit for operating the hold relay R2025. Upon operating, the hold relay R2025 completes, at the contacts 2027, a circuit including the set of switch springs S2093 for energizing the upper winding of the transfer relay R2030 in order to cause the latter relay to operate; and completes, at the contacts 2026, a circuit, including the contacts 2095 of the set of switch springs S2094, for energizing the winding of the transfer relay R2065 in order to cause the latter relay to operate.

The operator at the test board 200 proceeds to dial the first digit of the directory number of the called subscriber substation T in the central office; whereby the dial relay R1460 is operated and impulses are transmitted from the first contacts of the dial 1428 over the test conductors C271 and C272 in order to cause the line relay R2020 to follow. Each time the line relay R2020 restores and then reoperates, it interrupts and then recompletes, at the contacts 2022, the circuit for maintaining operated the hold relay R2025; whereby the latter relay, being of the slow-to-release type is retained operated during impulsing. Also each time the line relay R2020 restores and then reoperates, it completes and then interrupts, at the contacts 2023, a circuit, including the contacts 2028 and 2031, for energizing in multiple the lower winding of the transfer relay R2030 and the vertical magnet M2090, thereby to retain operated the transfer relay R2030 and to effect operation of the vertical magnet M2090 in order to cause the wiper carriage of the Strowger mechanism to be driven one step in the vertical direction. When the wiper carriage of the Strowger mechanism is driven one step in the vertical direction away from its normal vertical position, the set of switch springs S2093 is operated into disengagement in order to interrupt the circuit for energizing the upper winding of the transfer relay R2030 and the set of switch springs S2099 is operated into engagement to prepare the release magnet M2092.

At the conclusion of the first digit, the dial relay R1460 restores shortly thereafter, and the loop hold relay R1440 is retained operated in series with the operated line relay R2020. The operated line relay R2020 retains operated the hold relay R2025; and shortly thereafter, the transfer relay R2030, being of the slow-to-release type, restores. In a similar manner the operator at the test board 200 dials the second, third and fourth digits of the directory number of the called subscriber substation T utilizing the dial 1428; whereby the line relay R2020 follows the digits mentioned.

During the second digit, each time the line relay R2020 restores and then reoperates, it completes and then interrupts, at the contacts 2023, a circuit, including the contacts 2028 and 2032, for energizing the winding of the transfer relay R2050, and a multiple circuit also including the contacts 2069 for energizing the rotary magnet M2091; whereby the transfer relay R2050 is operated and retained operated during the second digit and the rotary magnet M2091 is operated intermittently in order to drive the wiper carriage of the Strowger mechanism step by step in the rotary direction. Upon operating the transfer relay R2050 completes, at the contacts 2053, a holding circuit, including the contacts 2067, for maintaining operated the transfer relay R2065; and when the wiper carriage of the Strowger mechanism is driven one step in the rotary direction away from its normal rotary position, the set of switch springs S2094 is operated. More particularly, the contacts 2095 of the set of switch springs S2094 are operated into disengagement in order to interrupt the original circuit for maintaining operated the transfer relay R2065; and the contacts 2096 of the set of switch springs S2094 are operated into engagement in order to prepare a circuit traced hereinafter for operating the busy relay R2070.

At the conclusion of the second digit, the line relay R2020 is retained in its operated position, retaining operated the hold relay R2025; and shortly thereafter, the transfer relay R2050 restores, the latter relay being of the slow-to-release type. Upon restoring the transfer relay R2050 interrupts, at the contacts 2053, the previously traced holding circuit for maintaining operated the transfer relay R2065; whereby the latter relay restores shortly thereafter, it being of the slow-to-release type. Also upon restoring the transfer relay R2050 completes, at the contacts 2052, a path, including the contacts 2066, for applying ground potential by way of the upper winding of the test relay R2080 to the test wiper 2004; whereby the idle or busy condition of the trunk 2170 extending to the selected test connector 2100 is tested at this time.

In the event the test connector 2100 selected by the test distributor switch 2000 is busy at this time, ground potential at the contacts 2121 appears upon the control conductor C2174 of the trunk 2170; whereby the upper winding of the test relay R2080 is short-circuited. Accordingly, the test relay R2080 does not operate; and shortly thereafter, when the transfer relay R2065 restores, it completes, at the contacts 2068, a circuit, including the contacts 2026, the contacts 2096 of the set of switch springs S2094 and the contacts 2087, for operating the busy relay R2070. Upon operating the busy relay R2070 completes, at the contacts 2075, a substantially identical multiple holding circuit therefor; and completes, at the contacts 2074, a circuit, including the resistor 2097, the contacts 2056, 2051 and 2016, the conductor C763, the resistor 754 and the contacts 713 and 735, for energizing the winding of the switch through relay R740; however, the latter relay, being of the marginal type, is not operated at this time. Also the busy relay R2070 completes, at the contacts 2073, a connection, including the contacts 2083, the condenser 2079, the resistor 2039, the condenser 2048, the conductor C762, the resistor 753, the contacts 733 and the first contacts of the test distributor key K725, between the line conductor C255 and the busy tone conductor C2081'; whereby busy tone current is returned to the calling test board 200 at the conclusion of the second digit indicating to the operator thereat, that the test connector 2100 having access to the called subscriber substation T is busy at this time.

Now assuming that the test connector 2100 is idle when the trunk 2170 extending thereto is selected by the test distributor switch 2000, battery potential appears upon the control conductor C2174 of the trunk 2170, battery potential being applied thereto by way of the upper winding of the transfer relay R2130 and the set of switch springs S2135. Accordingly, the upper winding of the test relay R2080 in the test distributor 2000 is energized in series with the upper winding of the transfer relay R2130 in the test connector 2100 incident to restoration of the transfer relay R2050 and prior to restoration of the transfer relay R2065. Accordingly, the test relay R2080 operates, completing, at the contacts 2089, a holding circuit, including the contacts 2027, for energizing the lower winding thereof. Also the test relay R2080 interrupts, at the contacts 2087, a further point in the previously traced circuit for operating the busy relay R2070; and prepares, at the contacts 2086, an alternative circuit for operating the busy relay R2070. Further, the test relay R2080 completes, at the contacts 2085, a path for connecting direct ground potential to the test wiper 2004; whereby the upper winding of the transfer relay R2130 in the test connector 2100 is directly energized and operates. Further, the test relay R2080 completes, at the contacts 2084 a circuit including the control conductor C2173 of the trunk 2170, the control wiper 2003, the contacts 2021, the conductor C765 and the contacts 781 for operating the step relay R2110 in the test connector 2100. Upon operating the step relay R2110 completes at the contacts 2111, a circuit for operating the hold relay R2120.

During the third digit, each time the line relay R2020 restores and then reoperates, it interrupts and then recompletes, at the contacts 2021, the circuit for maintaining operated the step relay R2110; whereby the latter relay follows. Also each time the line relay R2020 restores and then reoperates, it completes and then interrupts, at the contacts 2023, the previously traced circuit for operating the transfer relay R2050; whereby the latter relay operates and remains operated during the third digit. Upon operating the transfer relay R2050 completes, at the contacts 2053, the alternative circuit, including the contacts 2086, for operating the busy relay R2070. Upon operating, the busy relay R2070 completes, at the contacts 2078, a circuit, including the contacts 2061' for energizing the lower winding of the counting relay R2060 and a multiple circuit, including the contacts 2061 and the associated resistor for energizing the upper winding of the counting relay R2060; whereby the latter relay operates through its first step, completing, at the contacts 2063, a path, also including the contacts 2027, for short-circuiting the upper winding thereof. At the conclusion of the third digit, the line relay R2020 is retained in its operated position, retaining operated the hold relay R2025; whereby the transfer relay R2050 restores shortly thereafter, effecting restoration of the busy relay R2070. Upon restoring the busy relay R2070 interrupts, at the contacts 2078, the previously mentioned path for short-circuiting the upper winding of the counting relay R2060; whereby the upper and lower windings of the counting relay R2060 are energized in series circuit relation causing the latter relay to operate through its second step.

During the fourth digit, each time the line relay R2020 restores and then reoperates, it interrupts and then recompletes, at the contacts 2021, the circuit for maintaining operated the step relay R2110; whereby the latter relay follows. Also each time the line relay R2020 restores and then reoperates, it completes and then interrupts, at the contacts 2023, the previously traced circuit for operating the transfer relay R2050; whereby the latter relay operates and remains operated during the fourth digit. Upon operating the transfer relay R2050 completes, at the contacts 2053, the alternative circuit, including the contacts 2086, for operating the busy relay R2070. Upon operating the busy relay R2070 completes, at the contacts 2078, a circuit including the contacts 2064 and 2056', for energizing the lower winding of the counting relay R2055 and a multiple circuit, including the contacts 2059 and 2062 and the associated resistor for energizing the upper winding of the counting relay R2055; whereby the latter relay operates through its first step, completing, at the contacts 2055′, a path, also including the contacts 2027, for short-circuiting the upper winding thereof. At the conclusion of the fourth digit the line relay R2020 is retained in its operated position retaining operated the hold relay R2025; whereby the transfer relay R2050 restores shortly thereafter, effecting restoration of the busy relay R2070. Upon restoring the busy relay R2070 interrupts, at the contacts 2078, the previously mentioned path for short-circuiting the upper winding of the counting relay R2055; whereby the upper and lower windings of the counting relay R2055 are energized in series circuit relation causing the latter relay to operate through its second step.

During the third digit, each time the step relay R2110 restores and then reoperates, it interrupts and then recompletes, at the contacts 2111, the circuit for maintaining operated the hold relay R2120; whereby the latter relay, being of the slow-to-release type, is maintained operated during impulsing. Also each time the step relay R2110 restores and then reoperates, it completes and then interrupts, at the contacts 2112, a circuit, including the contacts 2122 and 2131, for energizing the lower winding of the transfer relay R2130 and a multiple circuit, also including the contacts 2141, for energizing the vertical magnet M2150; whereby the transfer relay R2130 is retained in its operated position during the third digit and the vertical magnet M2150 operates intermittently driving the wiper carriage of the Strowger mechanism step by step in the vertical direction. When the wiper carriage of the Strowger mechanism is driven one step in the vertical direction away from its normal vertical position, the sets of switch springs S2135 and S2155 are operated. More particularly, the set of switch springs S2135 is operated into disengagement, thereby to interrupt the previously traced circuit for energizing the upper winding of the transfer relay R2130; and the set of switch springs R2155 is operated into engagement, thereby to prepare a circuit traced hereinafter for operating the release magnet M2154. At the conclusion of the third digit, the step relay R2110 is retained in its operated position retaining operated the hold relay R2120; whereupon the transfer relay R2130, being of the slow-to-release type, restores shortly thereafter. Upon restoring the transfer relay R2130 interrupts, at the contacts 2131, a further point in the previously traced circuit for energizing the lower winding thereof and for operating the vertical magnet M2150; and prepares, at the contacts 2132, a circuit traced hereinafter for operating the rotary magnet M2152.

During the fourth digit, each time the step relay R2110 restores and then reoperates, it completes and then interrupts, at the contacts 2112, a circuit, including the contacts 2122 and 2132, for operating the rotary magnet M2152; whereby the rotary magnet M2152 is operated intermittently, driving the wiper carriage of the Strowger mechanism step by step in the rotary direction. When the wiper carriage of the Strowger mechanism is driven one step in the rotary direction away from its normal rotary position, the set of switch springs S2156 is operated to open the normally completed short-circuit around the resistor 2159 for a purpose more fully explained hereinafter.

At the conclusion of the fourth digit, the step relay R2110 is retained in its operated position retaining operated the hold relay R2120; and the wiper carriage of the Strowger mechanism engages the contacts set in the associated contact bank terminating the subscriber line 401 extending to the called subscriber substation T. In the event the subscriber substation T is busy at this time, ground potential appears upon the control conductor C406 of the subscriber line 401 completing a circuit, including the test wiper 2163, the control conductor C2175 of the trunk 2170, the control wiper 2005, the contacts 2088 and 2076, for operating the line test relay R2040 in the test distributor switch 2000; the busy relay R2070 occupying its operated position prior to restoration of the transfer relay R2050 at the conclusion of the fourth digit as previously explained. Upon operating the line test relay R2040 completes, at the contacts 2046, a holding circuit, including the contacts 2037 and 2026, for energizing the winding thereof. Shortly thereafter, when the transfer relay R2050 restores effecting restoration of the busy relay R2070 there is completed, at the contacts 2077 an alternative holding circuit, including the contacts 2044, 2088, the control wiper 2005, the control conductor C2175, the test wiper 2163 and the grounded control conductor C406 of the subscriber line 401, for maintaining operated the line test relay R2040. Also, incident to restoration of the busy relay R2070, the counting relay R2055 is operated through its second step as previously explained. When the counting relay R2055 operates through its second step, it completes, at the contacts 2058, a circuit, including the contacts 2043, the conductor C764, the resistor 755 and the contacts 747, for energizing in series the winding of the control relay R2035 in the test distributor switch 2000 and the winding of the test relay R750 in the test distributor trunk circuit 700; whereby the relays mentioned operate, the test relay R750 operating at this time by virtue of the short-circuit around the resistor 2054 as the test relay R750 is of the marginal type. Upon operating the control relay R2035 interrupts, at the contacts 2037, the direct holding circuit for maintaining operated the line test relay R2040; whereby the line test relay R2040 is retained in its operated position only by virtue of the completed alternative holding circuit therefor, including the grounded control conductor C406 of the subscriber line 401; which condition maintains only so long as the subscriber line 401 is busy. Upon operating the test relay R750 completes, at the contacts 751, a circuit, including the contacts 712 and the third contacts of the test distributor key K725, for illuminating the supervisory lamp L723, thereby to indicate to the operator at the test board 200, the busy condition of the called subscriber substation T at this time.

The operator at the test board 200 may camp on the busy subscriber line 401 extending to the subscriber substation T; and subsequently, when the subscriber line 401 becomes idle, ground potential is removed therefrom interrupting the alternative holding circuit for maintaining operated the line test relay R2040. Upon restoring the line test relay R2040 completes at the contacts 2045, a path, including the contacts 2026, 2036, 2077, 2088, the control wiper 2005, the control conductor C2175 and the test wiper 2163, for applying ground potential to the control conductor C406 of the subscriber line 401 in order to effect operation of the cut-off relay R425 in the line circuit 410 individual thereto and the consequent marking of the subscriber line 401 as busy to the connectors 415, etc., having access thereto. Also the line test relay R2040 interrupts, at the contacts 2043, the previously mentioned path for short-circuiting the resistor 2054; whereby the resistor 2054 is inserted in the series circuit for energizing the windings of the control relay R2035 and the test relay R750. The control relay R2035 remains in its operated position; however, the test relay R750 restores, as it is of the marginal type. Upon restoring the test relay R750 interrupts, at the contacts 751, the circuit for illuminating the supervisory lamp L723, thereby to indicate to the operator at the test board 200 that the called subscriber substation T has now become idle.

Reconsidering the operation of the test distributor switch 2000 incident to operation of the test connector 2100 to select the subscriber line 401 extending to the called subscriber substation T, it will be appreciated that in the event the subscriber line 401 is idle when it is selected by the test connector 2100 that battery potential initially appears upon the control conductor C406 thereof; whereby the winding of the line test relay R2040 in the test distributor switch 2000 is initially short-circuited and does not operate. Accordingly, shortly following the conclusion of the fourth digit, when the transfer relay R2050 restores, effecting restoration of the busy relay R2070 and the consequent operation of the counting relay R2055 through its second step, the control relay R2035 is operated but the test relay R750 in the test distributor trunk circuit 700 is not operated. Since the test relay R750 is not operated, the supervisory lamp L723 is not illuminated in order to indicate to the operator at the test board 200 that the called subscriber substation T is idle at this time. Further the control relay R2035 completes, at the contacts 2036, the previously traced path for applying ground potential to the control conductor C406 of the subscriber line 401 in order to effect operation of the cut-off relay R425 in the line circuit 410 individual thereto for the purpose previously explained.

Also when the counting relay R2055 operates through its second step, it completes, at the contacts 2057, a circuit, including the contacts 2051, 2016, the conductor C763, the resistor 754, the contacts 713, and 735, for energizing in series the upper winding of the switch through relay R2010 in the test distributor switch 2000 and the switch through relay R740 in the test distributor trunk circuit 700; whereby the switch through relay R2010 operates shortly thereafter, it being of the slow-to-operate type, and the switch through relay R740 operates, it being of the marginal type. Upon operating the switch through relay R2010 completes, at the contacts 2017, a holding circuit, including the contacts 2027, for energizing the lower winding thereof; interrupts, at the contacts 2016, the previously traced circuit for energizing the upper winding thereof in series with the winding of the switch through relay R740; and completes, at the contacts 2015, a circuit, including the conductor C763, the resistor 754, the contacts 713, and 735, for energizing the winding of the switch through relay R740 in series with the lower winding of the line relay R2020, thereby to retain operated the relays mentioned. Further, the switch through relay R2010 interrupts, at the contacts 2012 and 2014, the normal loop circuit for energizing the upper and lower windings of the line relay R2020; and completes, at the contacts 2011 and 2013, metallic connections between the line conductors C254 and C255 and the line conductors C404 and C405 of the subscriber line 401. More particularly, the line conductors C254 and C255 are connected by way of the second and first contacts of the test distributor key K725, the contacts 731, 733, the resistors 752, 753, the conductors C761, C762, the contacts 2011, 2013, and 2041, 2042 and 2071, 2072 and 2081, 2082, the line wipers 2001, 2002, the line conductors C2171 and C2172 of the trunk 2071, and the line wipers 2161, 2162 to the line conductors C405 and C404 of the subscriber line 401. Also upon operating the switch through relay R740 completes, at the contacts 741, a connection, including the contacts 772 and the fourth contacts of the test distributor key K725 between the winding of the dial relay R730 and the dial conductor C257 for a purpose more fully explained hereinafter. At this time a metallic connection is established between the calling test board 200 and the subscriber line 401 extending to the called subscriber substation T and the operator at the test board 200 may perform certain tests in conjunction therewith as explained more fully hereinafter.

After the operator at the test board 200 has tested the subscriber line 401, and she desires to test the next adjacent line, this may be accomplished by dialing the single digit 1 at the dial 1428. In fact, any succeeding line in the same level of the test connector 2100 following the subscriber line 401 may be reached by dialing the complement between the fourth digit of the directory number thereof and the fourth digit of the directory number of the subscriber line 401. For example, assuming that the fourth digit of the directory number of the subscriber line 401 is 4 and that it is desirable to test the ninth line in the same level of the test connector 2100, this may be accomplished by dialing the complementary digit 5 at the dial 1428. When the dial 1428 is operated in accordance with the digit 5, ground potential at the third contacts thereof is applied to the dial conductor C277 which is connected at this time by way of the seventh contacts of the first test key K231R to the dial conductor C257; whereby a circuit substantially identical to that previously traced is completed for operating the dial relay R730 in the test distributor trunk circuit 700. Upon operating the dial relay R730 completes, at the contacts 737, a multiple point in a holding circuit therefor; interrupts, at the contacts 731 and 733, the normal connection between the line conductors C254 and C255 and the conductors C761 and C762; completes, at the contacts 732, a path, including the second contacts of the test distributor key K725 for applying ground potential to the line conductor C254; and completes, at the contacts 734, a path, including the first contacts of the test distributor key K725, the contacts 713, the resistor 754, the conductor C763 and the contacts 2015 for applying battery potential by way of the lower winding of the line relay R2020 to the line conductor C255. Accordingly, the lower winding of the line relay R2020 is energized from ground potential at the contacts 732 to battery potential at the terminal thereof over the loop circuit, including the test conductors C271 and C272 and the first contacts of the dial 1428; whereby the present digit 5 is transmitted to the lower winding of the line relay R2020 causing it to follow. Also upon operating the dial relay R730 interrupts, at the contacts 735, the previously traced original circuit for energizing the winding of the switch through relay R740 in series with the lower winding of the line relay R2020; whereby the switch through relay R740 restores to interrupt, at the contacts 741, the previously traced original circuit for energizing the winding of the dial relay R730. Each time the line relay R2020 restores and then reoperates, it interrupts and then recompletes, at the contacts 2021, the circuit for maintaining operated the step relay R2110; whereby the latter relay follows. Each time the step relay R2110 restores and then reoperates, it completes and then interrupts, at the contacts 2112, the previously traced circuit for operating the rotary magnet M2152, thereby to cause the rotary magnet M2152 to operate and drive the wiper carriage of the Strowger mechanism an additional step in the rotary direction. In the present example, the digit 5 is dialed; whereby the rotary magnet M2152 drives the wiper carriage of the Strowger mechanism from engagement with the fourth contact set in the associated contact banks and into engagement with the ninth contact set in the associated contact banks. At the conclusion of the present digit, when the finger wheel of the dial 1428 is returned to its normal position, the third contacts thereof are opened, interrupting the application of ground potential to the dial conductor C277; whereby the dial relay R730 restores. Upon restoring the dial relay R730 recompletes, at the contacts 731 and 733, the previously traced connection between the line conductors C254 and C255 and the conductors C761 and C762; interrupts, at the contacts 732 and 734, the alternative circuit for energizing the lower winding of the line relay R2020; and recompletes, at the contacts 735, the previously traced original circuit for energizing the winding of the switch through relay R740 in series with the lower winding of the line relay R2020; whereby the switch through relay R740 is reoperated and the line relay R2020 is retained in its operated position. At this time the operator at the test board 200 may test the subscriber line terminated by the ninth contact set in the present level of the test connector 2100 in the manner previously explained.

After the operator has tested the subscriber line terminating upon the ninth contact set in the present level of the test connector 2100 and it is desirable to test the subscriber line terminated by the first contact set in the next adjacent level of the test connector 2100, this may be accomplished by operating the wiper carriage of the Strowger mechanism in the test connector 2100 into its eleventh position; which may be accomplished continuing the present example, by dialing the additional digit 2 since it is assumed that the wiper carriage of the Strowger mechanism engages the ninth contact set in the present level. When the digit 2 is dialed 1428, the dial relay R730 reoperates; whereby the line relay R2020 follows causing the step relay R2110 to follow; whereby the rotary magnet M2152 is operated to drive the wiper carriage of the Strowger mechanism of the test connector into the eleventh position in the present level. When the wiper carriage of the Strowger mechanism of the test connector 2100 is driven into the eleventh position in the present level, the sets of switch springs S2157 and S2158 are operated. More particularly, the set of switch springs S2158 is operated into engagement to complete a circuit, including the contacts 2123 for operating the control relay R2140. Upon operating the control relay R2140 completes, at the contacts 2145, a holding circuit, including the contacts 2153 and 2123, for energizing the winding thereof; completes, at the contacts 2142 and 2144, a circuit, including the contacts 2123 and 2134 and the resistor 2159 for partially operating the vertical magnet M2150. When the vertical magnet M2150 is partially operated, by virtue of the inclusion of the resistor 2159 in the operating circuit therefor, it merely sets the vertical operating pawl into the associated vertical ratchet in order to prevent release of the wiper carriage of the Strowger mechanism in the vertical direction. Also upon operating the control relay R2140 completes, at the contacts 2146, a circuit, including the sets of switch springs S2157 and S2155 for operating the release magnet M2154. Upon operating the release magnet M2154 trips the main release pawl; whereby the wiper carriage of the Strowger mechanism is returned to its normal rotary position, but not to its normal vertical position by virtue of the set vertical operating pawl since the vertical magnet M2150 is partially operated as previously noted. When the wiper carriage of the Strowger mechanism is thus released in the rotary direction and returned to its normal rotary position, the set of switch springs S2157, S2158 and S2156 are operated. More particularly, the set of switch springs S2157 is operated into disengagement, thereby to deenergize the release magnet M2154; the set of switch springs S2158 is operated into disengagement, thereby to interrupt the original operating circuit for the control relay R2140; and the set of switch springs S2156 is operated into engagement to short-circuit the resistor 2159. When the resistor 2159 is thus short-circuited, the vertical magnet M2150 operates fully to drive the wiper carriage of the Strowger mechanism an additional step in the vertical direction into the next adjacent level. Also upon operating fully, the vertical magnet M2150 completes, at the contacts 2151, a circuit, including the contacts 2144 and 2123, for energizing the upper winding of the transfer relay R2130 in order to cause the latter relay to operate. Upon operating the transfer relay R2130 interrupts, at the contacts 2134, the previously traced circuit for operating the vertical magnet M2150; and completes, at the contacts 2133, a circuit, including the contacts 2143, 2144, and 2123, for energizing the rotary magnet M2152; whereby the rotary magnet M2152 operates to drive the wiper carriage of the Strowger mechanism into engagement with the first contact set in the present level. Also upon operating the rotary magnet M2152 interrupts, at the contacts 2153, the holding circuit for maintaining operated the control relay R2140. Upon restoring the control relay R2140 interrupts, at the contacts 2143, the circuit for operating the rotary magnet M2152. Also when the vertical magnet M2150 restores, it interrupts, at the contacts 2151, the circuit for energizing the upper winding of the transfer relay R2130 in order to cause the latter relay to restore shortly thereafter, it being of the slow-to-release type. At this time, the operator at the test board 200 may test the subscriber line terminated by the first contact set in the level above and adjacent to the level in which the subscriber line 401 is terminated as previously explained.

At any time, should the operator at the test board 200 desire to release the test connector 2100, this may be accomplished by momentary operation of the connector release key K1010R; whereby the first contacts thereof are opened, interrupting the application of resistance ground potential upon the conductor C273 and consequently upon the connected conductor C251; whereby the release relay R780 in the test distributor trunk 700 restores. Upon restoring the release relay R780 interrupts, at the contacts 781, the previously traced circuit for maintaining operated the step relay R2110; whereby the latter relay restores. Upon restoring the step relay R2110 interrupts, at the contacts 2111, the circuit for maintaining operated the hold relay R2120; whereby the latter relay restores shortly thereafter, it being of the slow-to-release type. Upon restoring the hold relay R2120 completes, at the contacts 2124, a circuit, including the set of switch springs S2155, for operating the release magnet M2154; whereby the wiper carriage of the Strowger mechanism is released and returned to its normal rotary and vertical positions; whereupon the sets of switch springs S2135, S2155, and S2156 are operated. More particularly, the set of switch springs S2155 is operated into disengagement, thereby to interrupt the circuit for operating the release magnet M2154; the set of switch springs S2135 is operated into engagement, thereby to recomplete the circuit for energizing the upper winding of the transfer relay R2130 in order to cause the latter relay to reoperate; and the set of switch springs S2156 is operated into engagement in order again to short-circuit the resistor 2159.

When the operator at the test board 200 then restores the connector release key K1010R, resistance ground potential is returned upon the conductor C273 and the connected conductor C251 in order to effect reoperation of the release relay R780 and the consequent reoperation of the step relay R2110; whereupon the hold relay R2120 is reoperated. At this time the operator at the test board 200 may dial two additional digits at the dial 1428 in order to effect reoperation of the test connector 2100 to seize a corresponding subscriber line in the central office. However, in this conjunction, it is noted that since the test distributor switch 2000 is already switched through, a metallic connection is immediately completed to the subscriber line selected by the test connector 2100 without testing of the selected subscriber line in the test distributor 2000 in the manner previously explained.

Reconsidering the operation of the test distributor switch 2000 in conjunction with the test connector 2100, when the test connector 2100 operates to select the subscriber line 401 extending to the called subscriber substation T, ground potential at the contacts 2026 of the operated hold relay R2025 is extended by way of the test wiper 2163 to the control conductor C406 of the subscriber line 401 effecting operation of the cut-off relay R425 in the line circuit 410 individual to the subscriber line 401; all in the manner previously explained. Should the operator at the test board 200 desire to test the in-drop section of the subscriber line 401, this may be accomplished by operation of the battery cut-off key K1010F; whereby direct ground potential is applied by way of the first contacts of the connector release key K1010R to the conductor C273 and to the connected conductor C251. The application of direct ground potential upon the conductor C251 effects operation of the B. C. O. control relay R770 as it is of the marginal type; whereupon the latter relay interrupts, at the contacts 771, the circuit for maintaining operated the hold relay R745 in order to cause the latter relay to restore shortly thereafter, it being of the slow-to-release type. Upon restoring, the hold relay R745 interrupts, at the contacts 747, the series circuit for energizing the winding of the test relay R750 and the winding of the control relay R2035 in order to effect the restoration of the control relay R2035. Upon restoring the control relay R2035 interrupts, at the contacts 2036, the previously traced path for applying ground potential to the test wiper 2163 and the control conductor C406 of the subscriber line 401; whereby the cut-off relay R425 in the line circuit 410 restores. Upon restoring the cut-off relay R425 bridges the upper and lower windings of the line relay R420, at the contacts 426 and 427, across the line conductors C404 and C405 of the subscriber line 401; whereupon the line relay R420 operates in conjunction with the loop hold relay R1440 and the loop test relay R1445 in the manner explained in Sect. 9. Upon operating the line relay R420 effects operation of the distributor 411; whereby the finder 412 may find the line conductors C404 and C405 in the manner previously explained. At this time, the first selector 413 is connected to the test conductors C271 and C272; whereby the operator at the test board may operate the dial 1428 to control operation of the first selector 413 after restoring the battery cut-off key K1010F. When the battery cut-off key K1010F is thus restored, direct ground potential is removed from the conductor C273 and the connected conductor C251 and resistance ground potential by way of the resistor 1017 is applied thereto; whereby the B. C. O. control relay R770, being of the marginal type, restores and the release relay R780 is retained in its operated position. Upon restoring the B. C. O. control relay R770 recompletes, at the contacts 771, the previously traced circuit for operating the hold relay R745; and upon operating, the hold relay R745 recompletes, at the contacts 747, the previously traced circuit for energizing the winding of the test relay R750 in series with the winding of the control relay R2035; whereby the control relay R2035 reoperates. Upon reoperating the control relay R2035 recompletes, at the contacts 2036, the previously traced path for applying ground potential to the test wiper 2163 and the control conductor C406 of the subscriber line 401, thereby to complete a multiple circuit for retaining operated the cut-off relay R425 in the line circuit 410; the cut-off relay R425 occupying its operated position at this time since the finder 412 has found the line conductors C404 and C405 of the subscriber line 401. The digits dialed at the dial 1428 by the operator at the test board 200 are transmitted over the connection in order to control operation of the first selector 413 and the succeeding switches in the switch train; whereby the connection may be extended to a called subscriber substation in the central office in the manner explained in Sect. 9.

Further reconsidering the operation of the test distributor switch 2000 in conjunction with the test connector 2100, in the event the subscriber line 401 is tested as busy by the line test relay R2040, when it is selected by the test connector 2100, the supervisory lamp L723 is illuminated as explained above in order to indicate the condition mentioned. At this time, while the operator at the test board 200 is camping on the busy subscriber line 401, and operative connection is completed to the line conductors C404 and C405 thereof via the condensers 2048, 2047, and the resistors 2039, 2038 to the talk repeater 821 in the test circuit. Thus the operator at the test board 200 may ascertain whether the subscriber line 401 is actually busy since a monitoring connection is completed as noted above. In the event the operator at the test board 200 suspects that the line 401 is locked out of service by virtue of the operated line relay R420 and lock out relay R430 in the line circuit 410 individual thereto as a consequence of the appearance of a high resistance short-circuit across the line conductors C404 and C405 thereof, the operator may release the connection and request the repairman to connect the line test circuit 300 thereto at the main distributor frame; whereupon an attempt may be made to release the operated line relay R420 utilizing the line test circuit 300 by operating the talk battery key K1411 in conjunction with the test reverse key K1510; all in the manner described in Sect. 9.

After the operator at the test board 200 has tested all of the lines appearing before the test connector 2100 that are to be tested at this time, the connection is released by restoring the test distributor key K725 in conjunction with the first test key K231R. When the test distributor key K725 is thus restored, there is interrupted, at the fifth contacts thereof, the circuit for maintaining operated the seize relay R710; and there is interrupted, at the sixth contacts thereof, the circuit for maintaining operated the release relay R780. Upon restoring the seize relay R710 interrupts, at the contacts 715, the circuit for maintaining operated the hold relay R745, thereby to cause the latter relay to restore shortly thereafter, it being of the slow-to-release type. Also the seize relay R710 interrupts, at the contacts 713, the circuit for maintaining operated the switch through relay R740 and the line relay R2020. Upon restoring the line relay R2020 interrupts, at the contacts 2022, the circuit for maintaining operated the hold relay R2025, thereby to cause the latter relay to restore shortly thereafter, it being of the slow-to-release type. Upon restoring, the hold relay R2025 interrupts, at the contacts 2027, the holding circuits for maintaining operated the switch through relay R2010, the counting relays R2055 and R2060 and the test relay R2080. Also the hold relay R2025 completes, at the contacts 2029, a circuit, including the contacts 2081' and the set of switch springs S2099 for operating the release magnet M2092; whereby the release magnet M2092 releases the wiper carriage of the Strowger mechanism causing it to be returned to its normal rotary and vertical positions. When the wiper carriage of the Strowger mechanism is thus released, the set of switch springs S2093, S2094 and S2099 are operated into their normal positions, the set of switch springs S2099 being operated into disengagement in order to interrupt the circuit for operating the release magnet M2092. When the test distributor switch 2000 is thus released, the step relay R2110 is restored in order to effect restoration of the hold relay R2120; whereupon the Strowger mechanism in the test connector 2100 is released; all in the manner previously explained.

At this time the established connection between the test board 200 and the called subscriber substation T utilizing the test distributor trunk 700 is released, and all of the apparatus involved therein is completely released and available for further use.

*Sect. 11.—Holding a call*

After the operator at the test board 200 has extended a call to a called subscriber substation, she may hold the call by operating the loop hold key K565 individual to the hold circuit 550. For example, assume that the operator at the test board 200 has operated the first test key K231R in conjunction with the test distributor key K725, and that the test distributor switch 2000 and the test connector 2100 have been operated in order to extend a connection through the in-drop section of a subscriber line selected by the test connector 2100 and thence through the switch train to a called subscriber substation in the central office; all in the manner explained in Sect. 10. In order to hold this call, the operator operates the loop hold key K565 and then restores the first test key K231R. When the first test key K231R is thus restored, the test circuit at the test board 200 is cleared of the connection extending via the test distributor trunk circuit 700 and may be utilized for other purposes. When the loop hold key K565 is thus operated, there is completed, at the third and fourth contacts thereof, a connection for bridging the right-hand winding of the hold relay R560 across the line conductors C254 and C255, which, in turn extend through the test distributor trunk circuit 700 to the connector, such, for example, as the connector 415 that has seized the called subscriber line in the central office. Accordingly, a loop circuit is completed between the right-hand winding of the hold relay R560 and the connector 415; and assuming that the called subscriber substation has answered the call, the right-hand winding of the hold relay R560 is poled to operate; the left-hand winding thereof being energized by way of a circuit, including the second contacts of the loop hold key K565. Upon operating the hold relay R560 completes, at the contacts 561, a circuit for illuminating the answer lamp L563, thereby to indicate to the operator at the test board 200 that the called subscriber in the central office has answered and is holding the connection.

Subsequently, in the event the subscriber at the called subscriber substation disconnects, the connector 415 operates to reverse the polarity over the connection to the right-hand winding of the hold relay R560; whereby the latter relay is poled to restore. Upon restoring the hold relay R560 interrupts, at the contacts 561, the circuit for illuminating the answer lamp L563; and completes, at the contacts 562, a circuit, including the first contacts of the loop hold key K565, for illuminating the supervisory lamp L564, in order to indicate to the operator at the test board 200 that the subscriber at the called subscriber substation in the central office has disconnected. However, the switch train is retained in its operated position by the right-hand winding of the hold relay R560 being bridged across the line conductors C254 and C255. Subsequently, the operator may again enter the connection by operating the first test key K231R; whereupon the loop hold key K565 is restored. When the loop hold key K565 is thus restored, there is interrupted, at the first contacts thereof, the circuit for illuminating the supervisory lamp L564; there is interrupted, at the second contacts thereof, the circuit for energizing the left-hand winding of the hold relay R560; and there is interrupted, at the third and fourth contacts thereof, the connection for bridging the right-hand winding of the hold relay R560 across the line conductors C254 and C255. At this time the connection between the hold circuit 550 and the test distributor trunk circuit 700 is released and the test circuit at the test board 200 is again connected to the test distributor trunk circuit 700 by virtue of the operated position of the first test key K231R.

*Sect. 12.—Connecting auxiliary devices or equipment to the test board*

The auxiliary test device 630, such, for example, as a Wheatstone bridge or the like, may be connected to the test board 200 by operating the test device key K635 individual thereto in conjunction with the second test key K232R. When the keys mentioned are thus operated, the test conductors C271 and C272 are connected by way of the fifth and fourth contacts of the test key K232R to the conductors C265 and C264, which, in turn, are connected by way of the fifth and sixth contacts of the test device key K635 to the line conductors C642 and C641 extending to the test device 630. Also the dial conductor C277 is connected by way of the seventh contacts of the second test key K232R to the conductor C278, which, in turn, is connected by way of the third contacts of the test device key K635 to the dial conductor C644 extending to the test device 630. Also the conductor C274 extending into the test circuit at the test board 200 is connected by way of the second contacts of the second test key K232R to the conductor C262, which, in turn, is connected by way of the fourth contacts of the test device key K635 to the conductor C643 extending to the test device 630. Further, the application of ground potential to the conductor C269 is interrupted, at the ninth contacts of the second test key K232R incident to operation thereof; which conductor C269 is connected by way of the ninth contacts of the test tie key K232F to the conductor C279 which, in turn, is connected by way of the second contacts of the test device key K635 to the conductor C645 extending to the test device 630. Accordingly, ground potential appears upon the conductor C645 when the second test key K232R and the test tie key K232F occupy their restored positions and the test device key K635 occupies its operated position. Finally, at the first contacts of the test device key K635, ground potential is applied incident to operation thereof, to the conductor C646 extending to the test device 630 in order to effect seizure thereof. When the test device 630 has been seized, circuit changes are produced therein in order to effect illumination of the supervisory lamp L631 in order to indicate to the operator at the test board 200 that the test device 630 is in readiness for use.

Further, an external alternating current circuit that is to be tested may be physically connected to the A. C. test terminal posts, disposed immediately below the tip capacity key K912R in Fig. 9, and terminating the conductors C921 and C922; whereby the operator at the test board 200 may test the external alternating current circuit.

Figure 11:
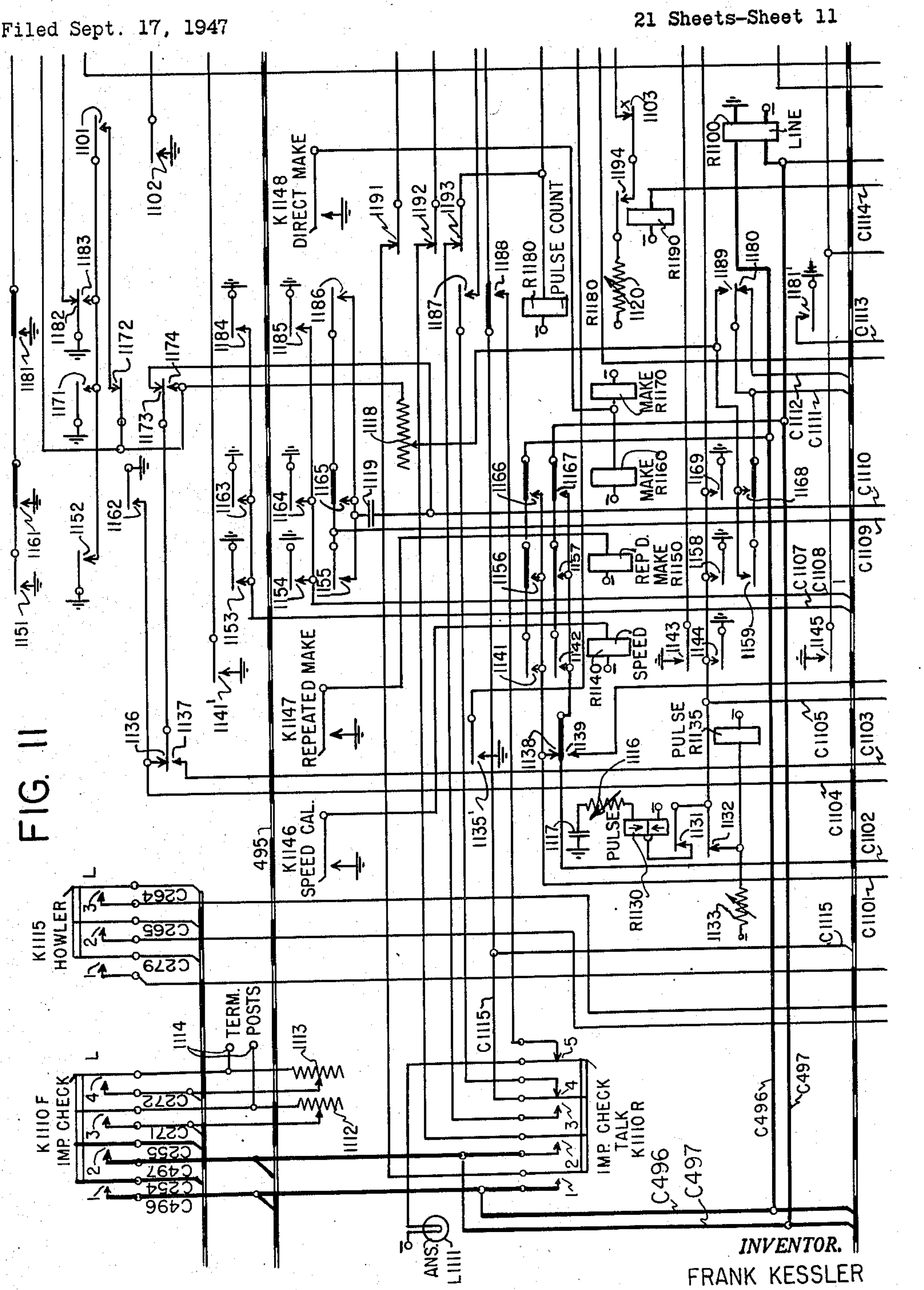
Figure 12:
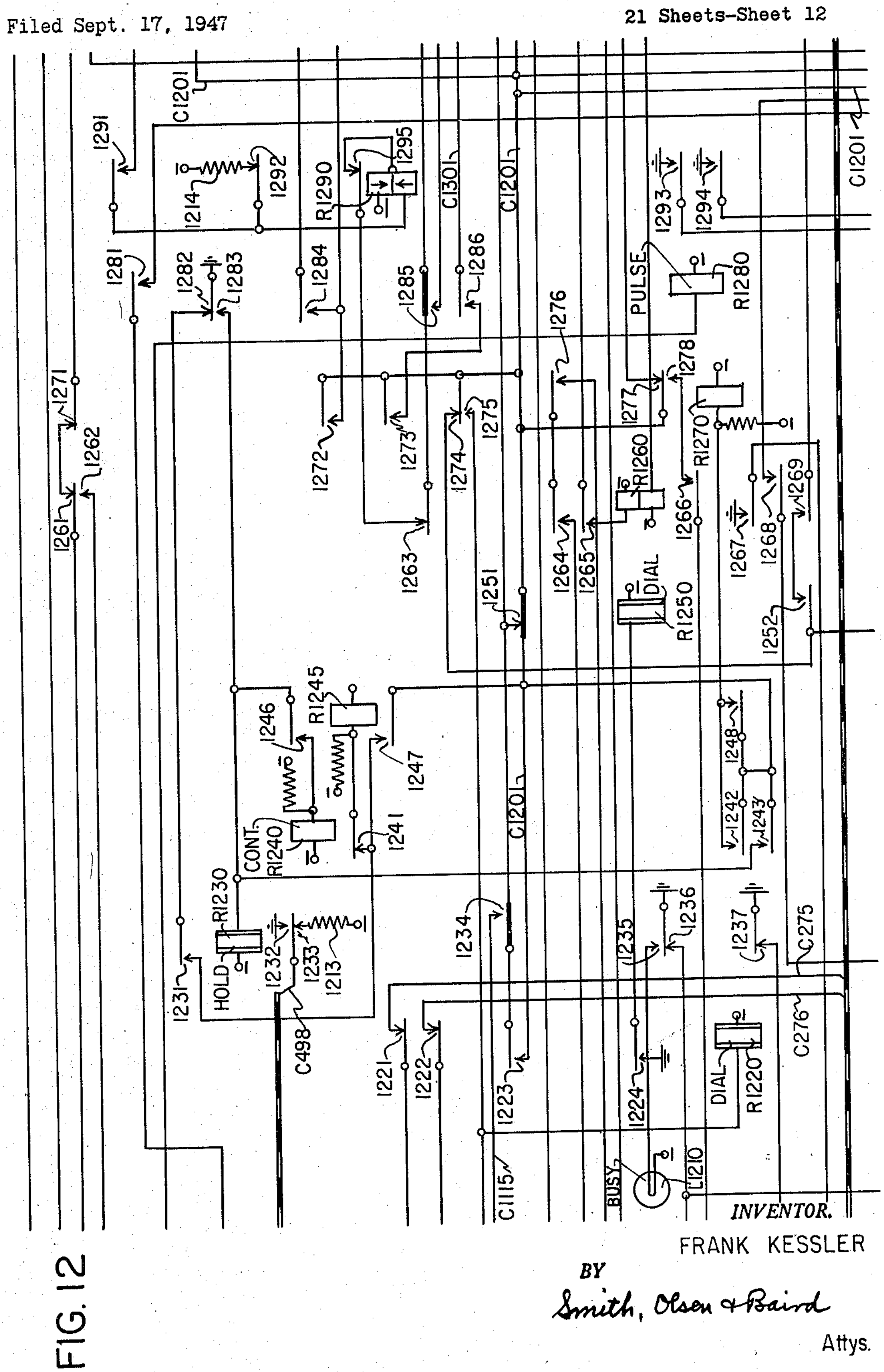
Figure 13:
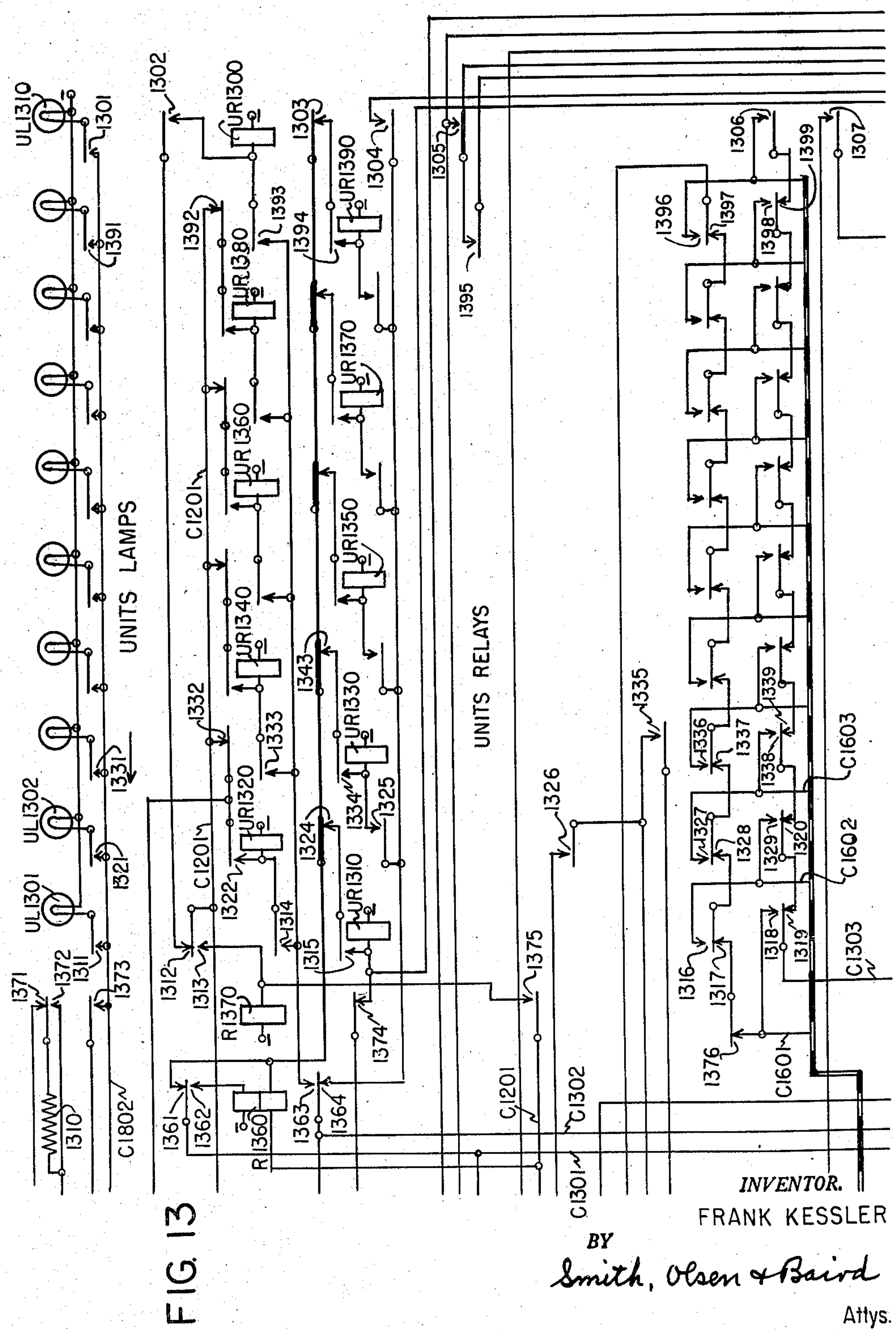
Figure 14:
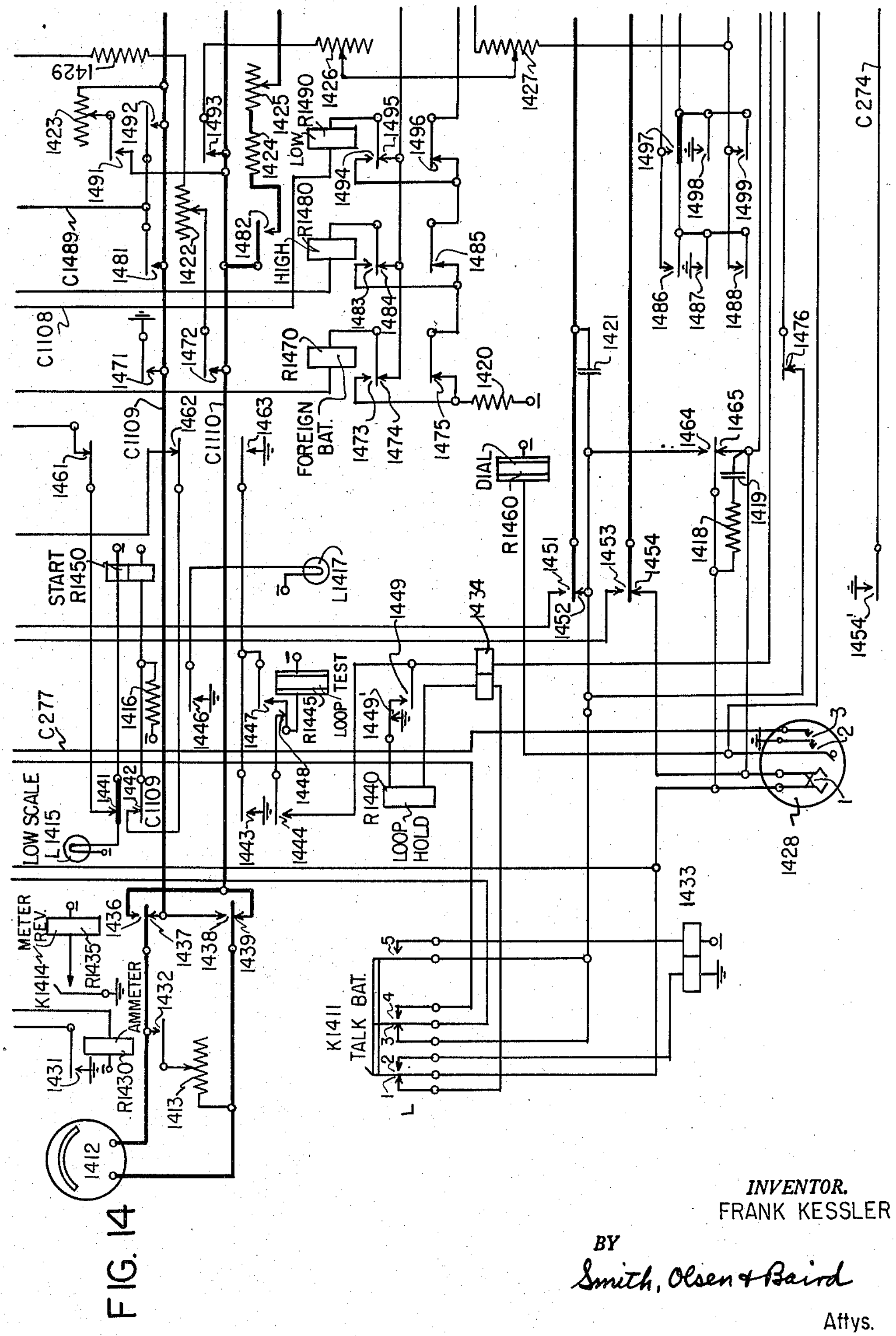
Figure 15:
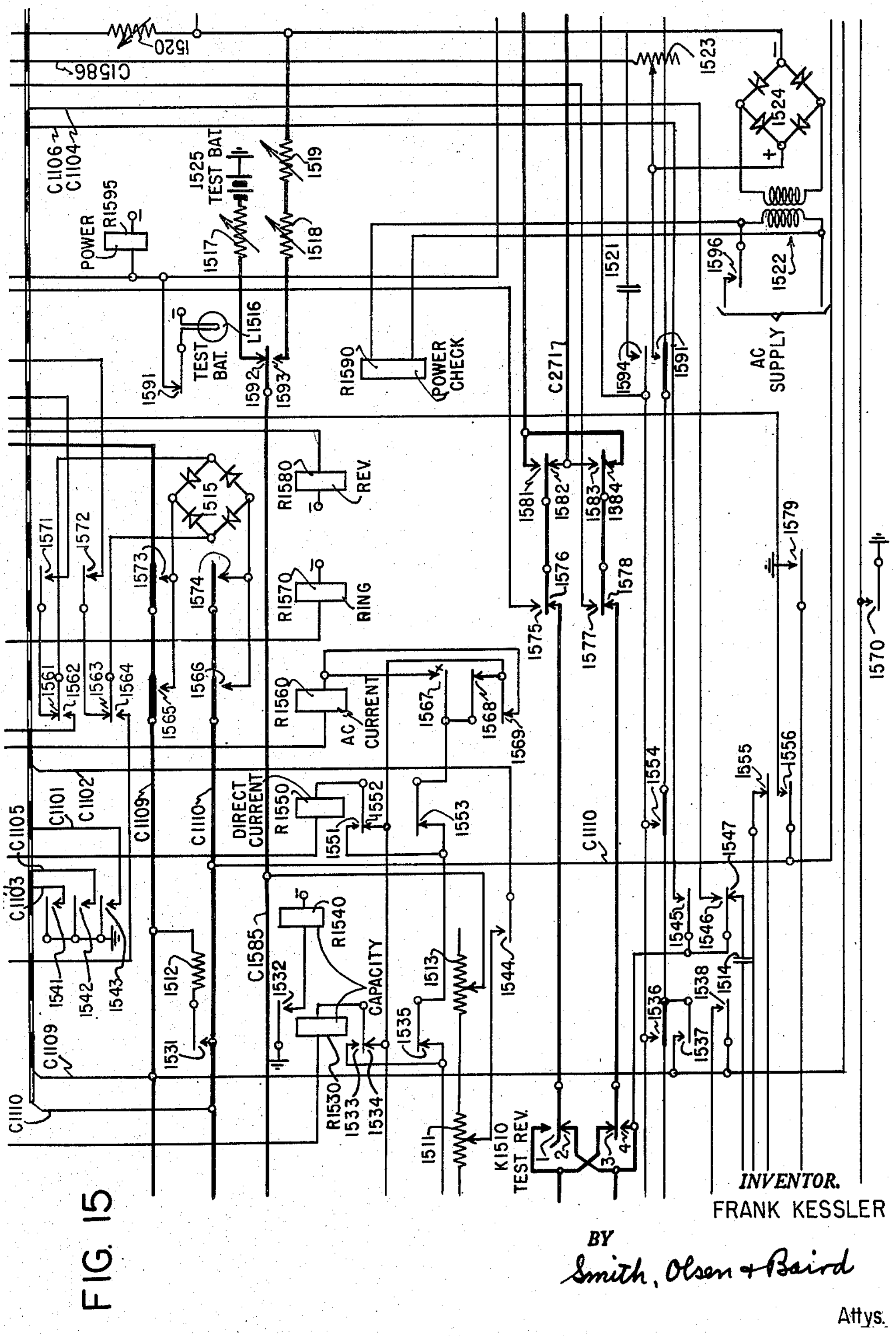
Figure 16:
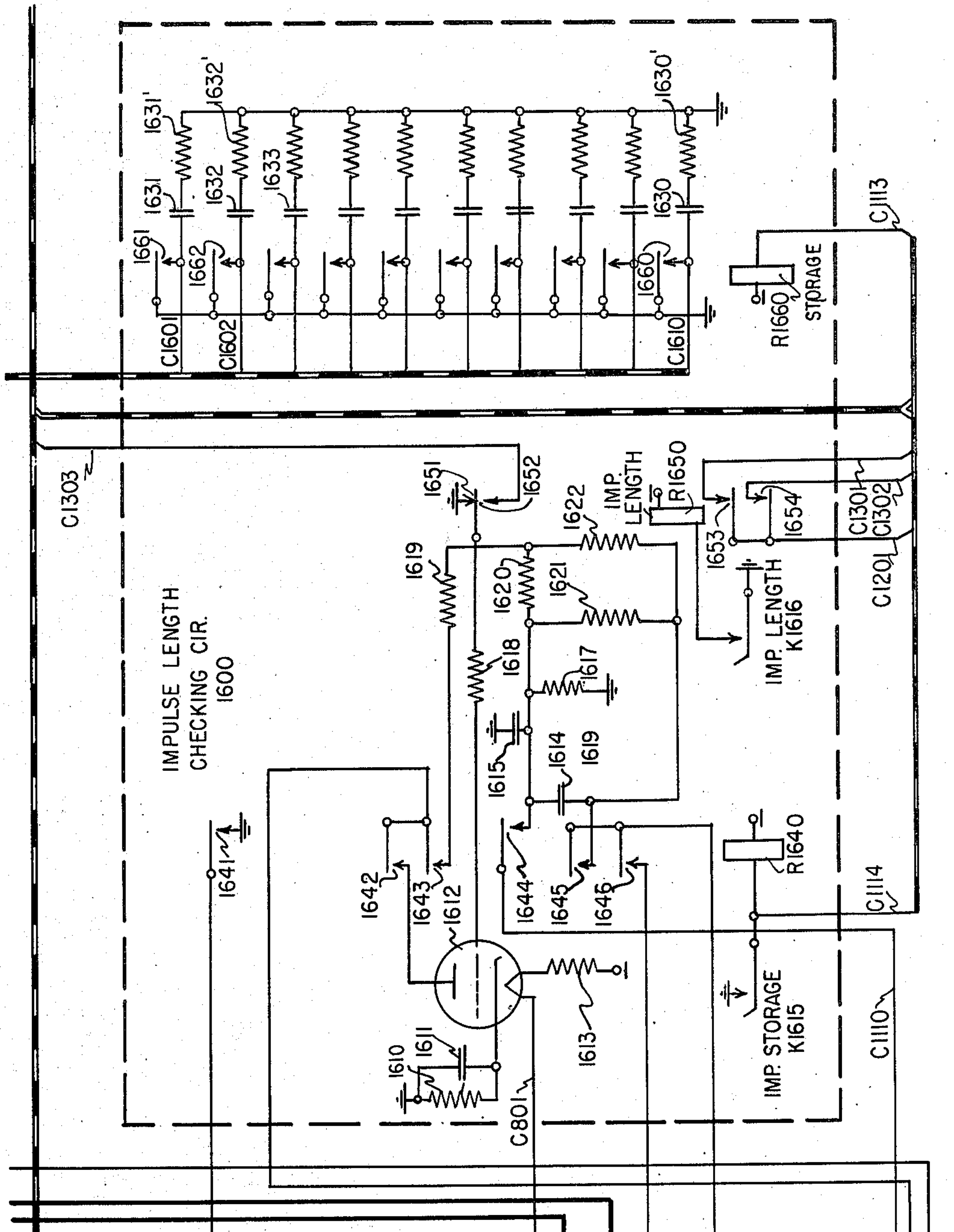
Figure 17:
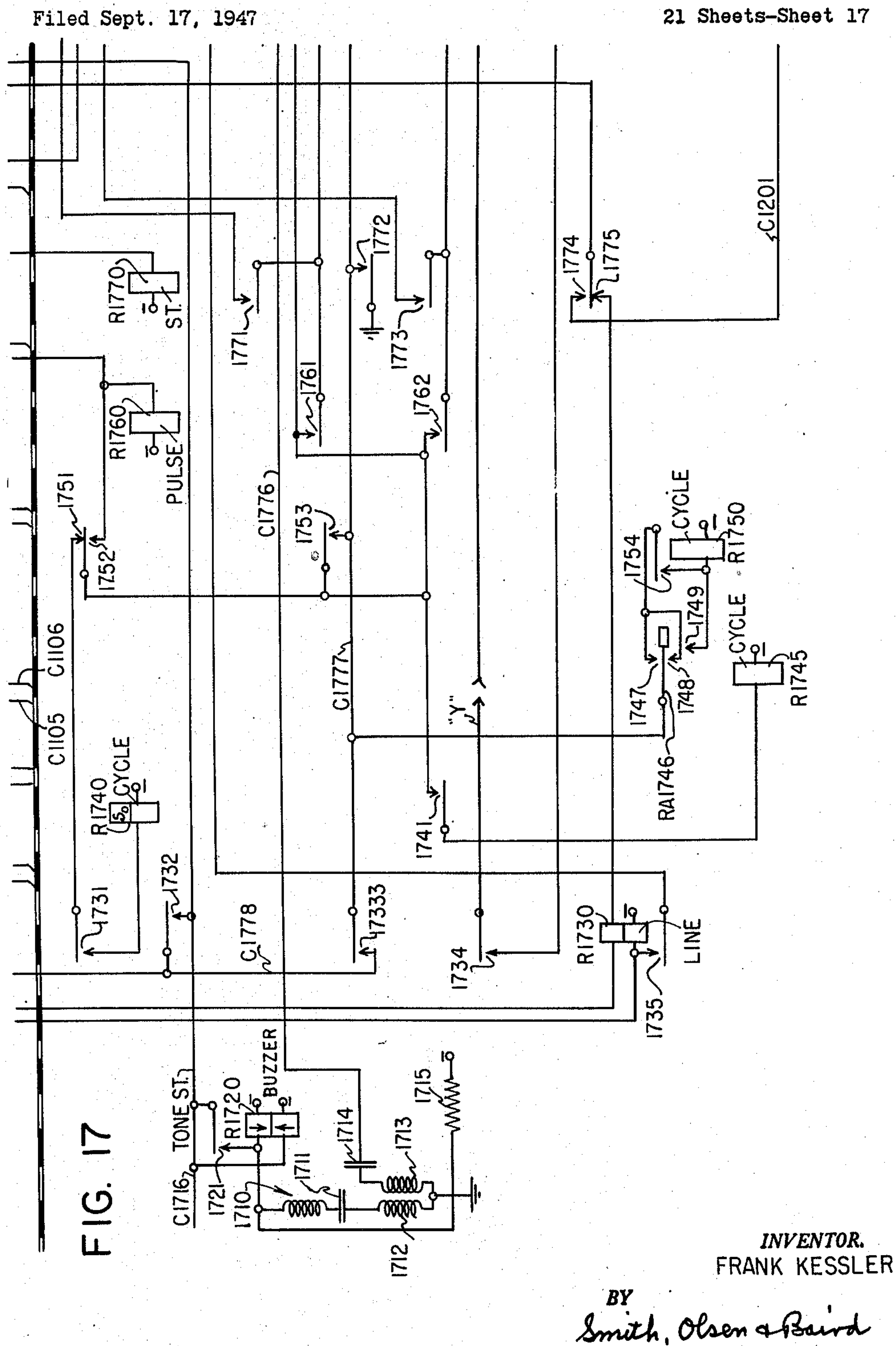
Figure 18:
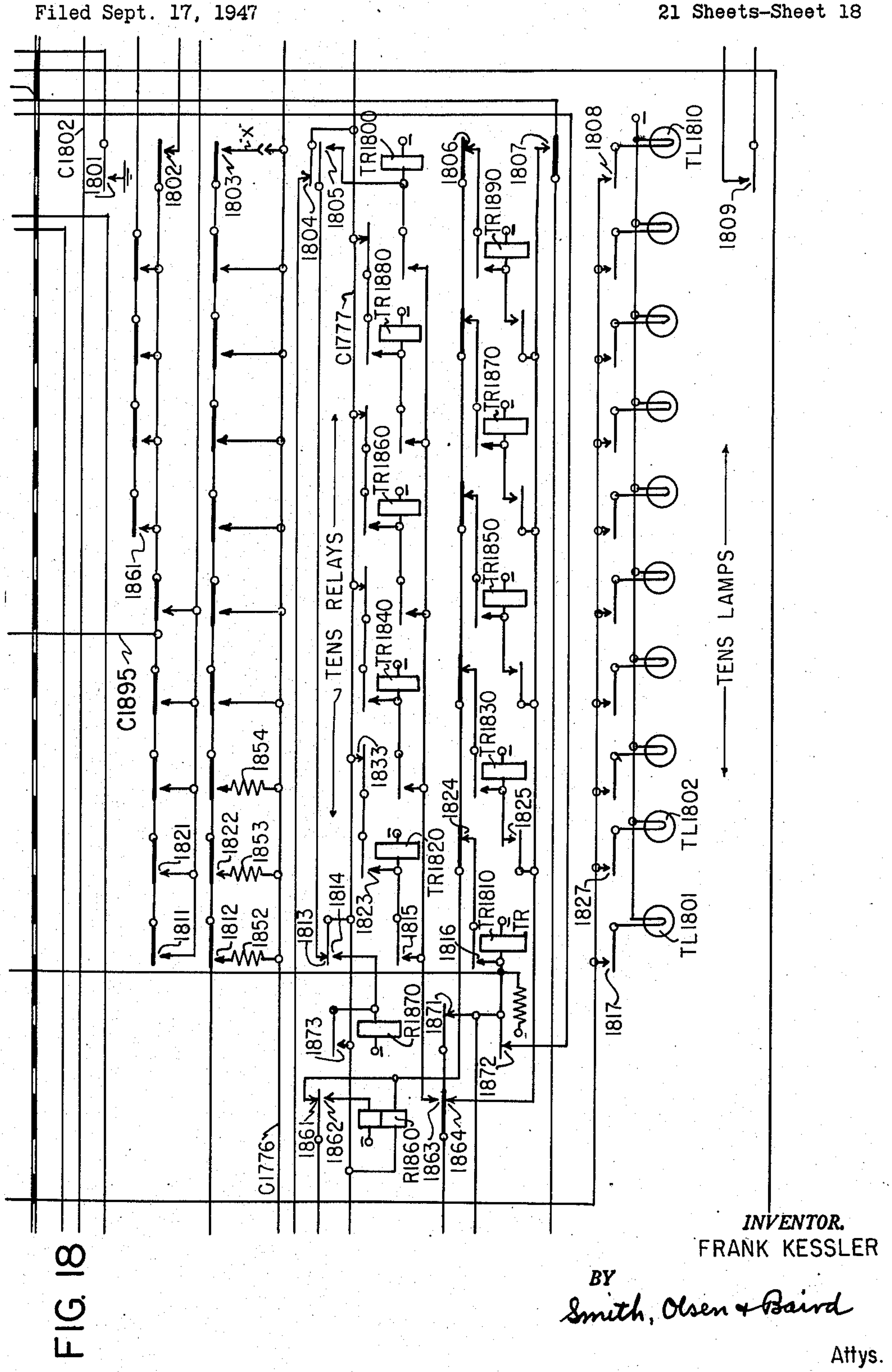
Figure 19:
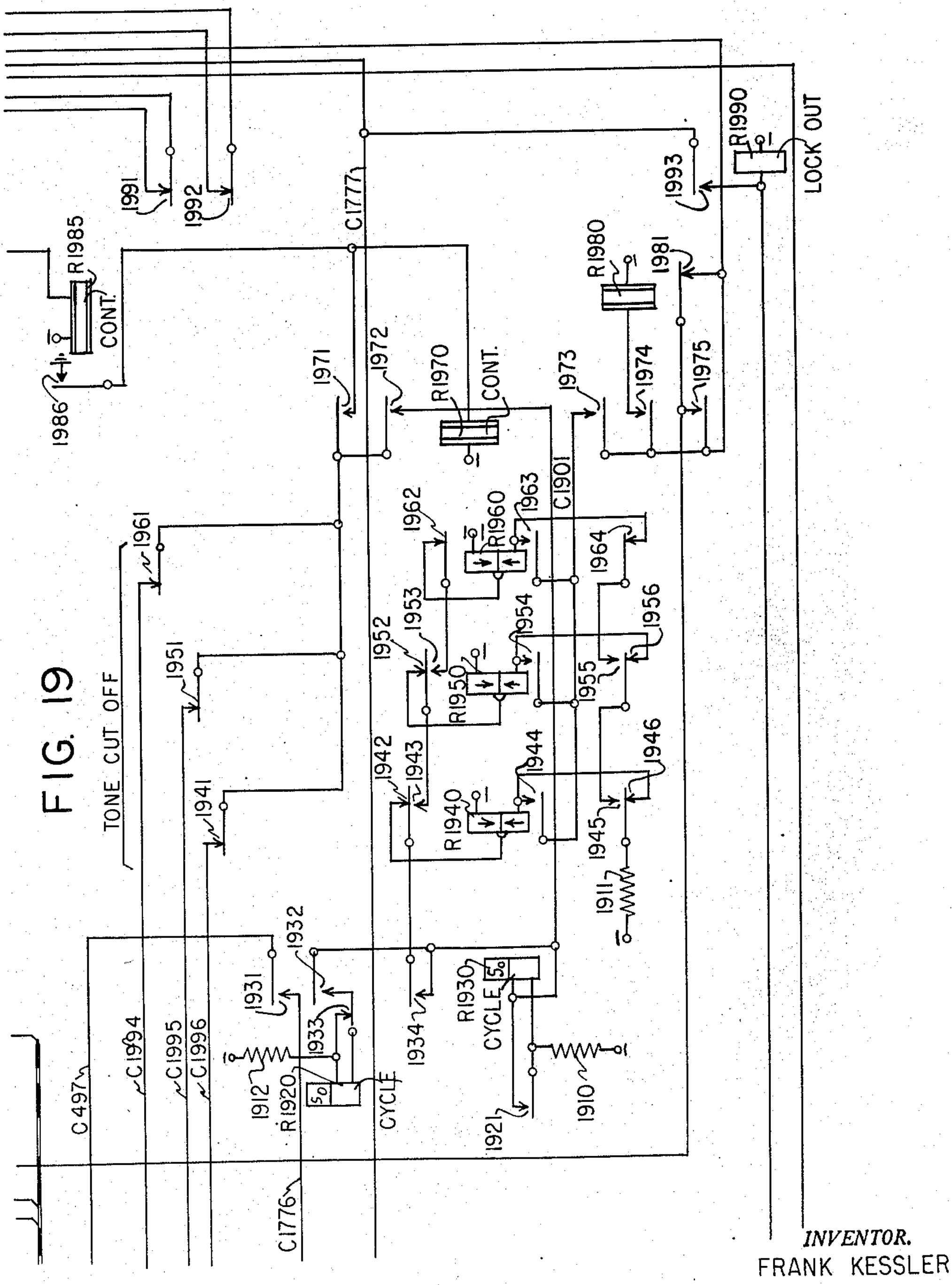

Also an external dial or other impulsing device that requires testing may be physically connected to the terminal posts 1114 disposed below and intermediate the impulse check key K1110F and the howler key K1115 in Fig. 11; whereby certain tests may be performed on the external device mentioned utilizing the test circuit associated with the test board 200.

*Sect. 13.—Monitoring, position grouping, test tie and supplying talking battery*

In order to monitor an established connection, the operator at the test board 200 operates the monitor key K830, thereby to complete, at the first contacts thereof, a circuit for operating the monitor relay R850; and to complete, at the second contacts thereof, a path for short-circuiting the retard coils 818 and 819 in order to prevent the supply of direct battery potential to the transmitter 812. Upon operating the monitor relay R850 interrupts, at the contacts 851 and 853, the normal connection between the receiver 811 and the winding 823 of the talk repeater 821; and completes, at the contacts 852 and 854, a substantially identical alternative connection between the receiver 811 and the second winding 829 of the monitor repeater 827. Also the monitor relay R850 interrupts, at the contacts 855 and 858, the previously traced normal connection between the test conductors C271 and C272 and the windings 824 and 822 of the talk repeater 821; and completes, at the contacts 856 and 857, a substantially identical connection between the test conductors C271 and C272 and the primary winding 828 of the monitor repeater 827. This arrangement positively prevents any noise at the test board 200 from being transmitted through the transmitter 812 into a circuit connected to the test conductors C271 and C272; while permitting the operator at the test board 200 to monitor the circuit. In the event the operator at the test board 200 wishes to talk upon the circuit connected to the test conductors C271 and C272, the monitor key K830 is restored in order to interrupt, at the second contacts thereof, the path for short-circuiting the retard coils 818 and 819; and to interrupt, at the first contacts thereof, the circuit for maintaining operated the monitor relay R850. Upon restoring the monitor relay R850 disconnects the monitor repeater 827 from and reconnects the talk repeater 821 to the test conductors C271 and C272, reestablishing the normal circuit conditions at the test board 200.

At the test board 200, in the event it is desirable to test at the adjacent position, not shown, certain circuits appearing before the first position illustrated, the circuits mentioned may be transferred from the position illustrated to the adjacent position, not shown, via the trunk 240 by operating the position group key K231F in an obvious manner; and in the event it is desirable to test at the adjacent position, not shown, certain other circuits appearing before the first position illustrated, the other circuits mentioned may be transferred from the position illustrated to the adjacent position, not shown, via the trunk 240 by operating the position group key K231F in conjunction with the test tie key K232F in an obvious manner. Similarly, circuits may be transferred from the position, not shown, to the position illustrated via the trunk 245 by operation of the position group key or by operation of the position group key in conjunction with the test tie key at the adjacent position, not shown; whereupon the operator at the position illustrated connects the circuit transferred thereto to the test circuit thereat by operating the first test key K231R in an obvious manner.

Also, any one of the first group of circuits connectible to the test circuit at the position illustrated by operation of the first test key K231R may be connected directly to any one of the second group of circuits connectible to the test circuit at the position illustrated by operation of the second test key K232R, merely by operating the test tie key K232F.

In conjunction with the setting up of certain connections direct battery must be supplied to the circuit selected. For example, after a connection is extended from the test board 200 via the line test circuit 300 to the called subscriber substation T, as explained in Sect. 9, direct battery must be supplied to the called subscriber substation. In order to accomplish this end, the direct battery key K1411 is operated to interrupt, at the first contacts thereof, the normal connection between the dial 1428 and the left-hand winding of the retard coil 1434; and to interrupt, at the third contacts thereof the normal connection between the test conductor C272 and the winding 822 of the talk repeater 821. Also, at the second and fifth contacts of the talk battery key K1411, ground and battery potentials are respectively connected through the left-hand and right-hand windings of the retard coil 1433 to the test conductors C271 and C272 and thence to the circuit undergoing test.

*Sect. 14.—Meter adjustment*

When the test board 200 is occupied, the operator inserts the plugs P813 and P815 into the associated jacks J814 and J816 in order to effect operation of the power relay R1595 and the consequent connection of the A. C. source of supply to the transformer 1522 supplying the power rectifier 1524; whereby the power check relay R1590 is operated in order to disconnect the negative power conductor C1585 from the negative terminal of the test battery 1525 and to connect it to the negative terminal of the power rectifier 1524; all in the manner explained in Sect. 4. Also, at this time, the operator prepares the test board 200 for testing purposes by adjustment of the zero reading of the meter 1412. In order to accomplish this end, the zero adjustment key K839 is first operated; whereby there is completed, at the first contacts thereof, a circuit, including the conductor C1108, the contacts 1495, 1568, 1553, 1535, 1496, 1485 and 1475 and the resistor 1420 for operating the low relay R1490. Upon operating the low relay R1490 completes, at the contacts 1494, a holding circuit, including the grounded conductor C1108, the contacts 1485 and 1475 and the resistor 1420 for energizing the winding thereof; and interrupts, at the contacts 1496, points in the operating circuits of the foreign battery relay R1470, the high relay R1480, the capacity relay R1530, the direct current relay R1550 and the A. C. current relay R1560, thereby positively to lock out each of the relays mentioned. At the second contacts of the zero adjust key K839, there is completed a circuit, including the conductor C1107 and the contacts 1461 and 1441, for energizing the upper winding of the start relay R1450 in order to cause the latter relay to operate; and a substantially identical multiple circuit for illuminating the low scale lamp L1415 in order to indicate to the operator at the test board 200 that the low scale on the meter 1412 should be read. Also, at the fourth contacts of the zero adjust key K839, the conductor C1111 is disconnected from the conductor C1489; and at the third contacts of the zero adjust key K839, the conductor C1489 is connected by way of the resistor 834 to ground potential. Also upon operating the low relay R1490 connects the grounded conductor C1489, at the contacts 1492, to the conductor C1109, which, in turn, is connected by way of the contacts 1437 to the positive terminal of the meter 1412. Also the negative terminal of the meter 1412 is connected by way of the contacts 1439 to the conductor C1110; and the conductor C1110 is connected by the low relay R1490, at the contacts 1493, through the resistors 1426, 1427, 1511 and 1513, to the negative power conductor C1585; which conductor C1585 is connected at this time by way of the contacts 1593, the resistors 1518 and 1519 to the negative terminal of the power rectifier 1524. Finally, the low relay R1490 completes, at the contacts 1498, a path, including the contacts 1591′, for applying direct ground potential to the positive terminal of the power rectifier 1524.

The above traced series circuit, including the meter 1412 and the power rectifier 1524 includes the adjustable resistor 1519; which at this time is adjusted in order to cause the meter 1412 to read zero ohms on the low scale. At this point, it is noted that in the event the alternate current source of supply fails, the power check relay R1590 will restore disconnecting the negative power conductor C1585, at the contacts 1593, through the resistors 1518 and 1519 from the negative terminal of the power rectifier 1524; and connecting the negative power conductor C1585, at the contacts 1592, through the resistor 1517 to the negative terminal of the test battery 1525. Thus in the event the test battery 1525 instead of the power rectifier 1524, is in use, the resistor 1517 may be adjusted in order to cause the meter 1412 to read zero ohms on the low scale.

Upon operating the start relay R1450 disconnects, at the contacts 1452 and 1454, the test conductors C271 and C272 from the talk repeater 821; and connects the test conductors C271 and C272, at the contacts 1451 and 1453, to certain of the keys, including the loop key K838F, the loop low key K838R, etc.

After the meter 1412 has been adjusted as explained above the zero adjust key K839 is restored; whereby there is interrupted, at the first contacts thereof, the holding circuit for maintaining operated the low relay R1490; and there is interrupted, at the second contacts thereof, the multiple circuit for energizing the upper winding of the start relay R1450 and for illuminating the low scale lamp L1415 in order to effect restoration of the start relay R1450. Upon restoring the low relay R1490 reprepares, at the contacts 1496, the operating circuits for the foreign battery relay R1470, the high relay R1480, etc.; whereby the relays mentioned are again removed from locked out condition. Upon restoring the start relay R1450 recompletes, at the contacts 1452 and 1454, the previously traced connection between the test conductors C271 and C272 and the talk repeater 821. Finally, when the zero adjust key K839 is restored, there is interrupted, at the third contacts thereof, the previously traced path for connecting the conductor C1489 to resistance ground potential; and there is completed, at the fourth contacts thereof, the normal connection between the conductor C1489 and the conductor C1111.

After the zero adjustment of the meter 1412 has been made, the meter 1412 may be adjusted for 100% calibration. In order to accomplish this end, the impulse check key K1110F is operated in conjunction with the first test key K231R; and then the dial 1428 is operated in accordance with the digit 2. Ground and battery potentials are respectively connected through the upper and lower windings of the line relay R1100 to the line conductors C496 and C497; which conductors are respectively connected at the first and second contacts of the impulse check key K1110F to the line conductors C254 and C255; which line conductors C254 and C255 are respectively connected by way of the fourth and fifth contacts of the first test key K231R to the test conductors C272 and C271; whereby the previously traced circuit for operating the loop hold relay R1440 is completed, causing operation of the loop test relay R1445; all in the manner previously explained. At this time, the winding of the loop hold relay R1440 is bridged across the test conductors C271 and C272 via the first contacts of the dial 1428 and consequently across the line conductors C496 and C497 and the upper and lower windings of the line relay R1100; whereby the line relay R1100 also operates. Upon operating the line relay R1100 completes, at the contacts 1102, a circuit for operating the pulse relay R1280. Upon operating the pulse relay R1280 completes, at the contacts 1283, a circuit for operating the hold relay R1230. Ground potential at the first contacts of the transmission test key K916 is normally connected to the hold conductor C1115; and upon operating the hold relay R1230 completes, at the contacts 1234, a path, including the contacts 1251, for connecting the grounded hold conductor C1115 to the hold conductor C1201. Also upon operating the hold relay R1230 completes, at the contacts 1232, the previously mentioned path for applying ground potential to the control conductor C498; and interrupts, at the contacts 1233, the previously mentioned path for applying battery potential to the control conductor C498; whereby the trunk 495 is marked busy to the special second selectors 416, etc., having access thereto. Also, the hold relay R1230 completes, at the contacts 1235, the previously mentioned circuit for illuminating the busy lamp L1210 in order to indicate to the operator at the test board 200 that the associated test circuit is busy at this time.

When the operator at the test board 200 then dials the digit 2, as noted above, the line relay R1100 follows, repeating, at the contacts 1102, to the pulse relay R1280; whereby the pulse relay R1280 effects sequential operation of the first and second units relays UR1310 and UR1320, explained in detail in Sect. 24. Upon operating the second units relay UR1320 completes, at the contacts 1326, a circuit, including the contacts 1277 and the grounded hold conductor C1201, for operating the pulse count relay R1180. Upon operating the pulse count relay R1180 completes, at the contacts 1181, a path for applying ground potential by way of the contacts 1371, the resistors 1310 and 1118, the contacts 1187, the conductor C1111, the fourth contacts of the zero adjust key K839 to the conductor C1489. Further, the pulse count relay R1180 completes, at the contacts 1185, a circuit, including the conductor C1108 for operating the low relay R1490; which latter relay locks out the foreign battery relay R1470, the high relay R1480, etc., in the manner previously explained. Also the low relay R1490 completes, at the contacts 1492, a connection between the grounded conductor C1489 included in the path comprising the resistor 1310 and the conductor C1109, that, in turn, is connected by way of the contacts 1437 to the positive terminal of the meter 1412. At this time the negative terminal of the meter 1412 is connected by way of the contacts 1439, the conductor C1110, the contacts 1493, the resistors 1426, 1427, 1511 and 1513, the negative power conductor C1585, the contacts 1593, the resistors 1518 and 1519 to the negative terminal of the power rectifier 1524. Finally, the positive terminal of the power rectifier 1524 is connected by way of the contacts 1591′ and 1498 to ground potential. At this time the resistor 1310 is set to zero ohms; and the meter 1412 should read 100% on the low scale. The resistor 1118 included in the series circuit with the meter 1412 may be adjusted in order to cause the meter 1412 to read 100% on the low scale at this time. Also it is noted that upon operating the low relay R1490 completes, at the contacts 1491, a path, including the resistor 1423 across the conductors C1109 and C1110 extending to the positive and negative terminals of the meter 1412; thereby to cause the meter 1412 to read on the low scale. Further the low relay R1490 completes, at the contacts 1499, a path, including the contacts 1498, for connecting the series related resistors 1427, 1511 and 1513 across the positive terminal of the power rectifier 1524 and the negative power conductor C1585; that, in turn, is connected by way of the contacts 1593 and the resistors 1518 and 1519 to the negative terminal of the power rectifier 1524; whereby the resistors 1427, 1511 and 1513 comprise a voltage divider between the positive terminal of the power rectifier 1524 and the negative power conductor C1585; this voltage divider at the resistor 1427 being connected by way of the resistor 1426 and the contacts 1493 to the conductor C1110 extending by way of the contacts 1439 to the negative terminal of the meter 1412. At this time the resistor 1310 is adjusted to include resistance in the associated series circuit; whereby the meter 1412 is set to the normally expected "percentage make" contacts from equipment to be tested.

After the meter 1412 has thus been adjusted, the impulse check key K1110F and the first test key K231R are restored, thereby to bring about the restoration of the line relay R1100, the pulse relay R1280, the hold relay R1230, and the pulse count relay R1180; whereby the testing circuit associated with the test board 200 is completely released and now adjusted for use.

*Sect. 15.—Insulation tests*

In order to test the insulation of a loop connected to the test conductors C271 and C272 of the test circuit, the loop key K838F is operated and the meter 1412 will indicate the loop insulation resistance in ohms on the high scale. When the loop key K838F is thus operated, there is completed, at the first contacts thereof, a circuit including the contacts 1484, 1568, 1553, 1535, 1496, 1485 and 1475 and the resistor 1420 for operating the high relay R1480. Upon operating the high relay R1480 completes, at the contacts 1483, a holding circuit therefor, including the contacts 1475 and the resistor 1420; and interrupts, at the contacts 1485, points in the operating circuits of the foreign battery relay R1470, the low relay R1490, etc.; whereby the relays previously mentioned are locked out at this time. Also, at the second contacts of the loop key K838F, there is completed, a circuit, including the contacts 1462 and 1442, for energizing the lower winding of the start relay R1450 in order to cause the latter relay to operate. Upon operating the start relay R1450 completes, at the contacts 1454′, a path for applying ground potential to the conductor C274.

The conductor C274 is connected by way of the contacts 225 to the guard conductor C215 of the inspector trunk 210 in the event the cut-off relay R220 occupies its restored position. On the other hand, in the event the first test key K231R is operated, the cut-off relay R220 occupies its operated position and the grounded guard conductor C274 is connected by way of the second contacts of the first test key K231R to the guard conductor C252 extending to certain of the circuits. Similarly, in the event the second test key K232R is operated, the cut-off relay R220 occupies its operated position and the grounded guard conductor C274 is connected by way of the second contacts of the second test key K232R to the guard conductor C262 extending to certain other of the circuits. Also the start relay R1450 interrupts, at the contacts 1452 and 1454, the normal connections between the test conductors C272 and C271 and the talk repeater 821; and completes, at the contacts 1451 and 1453, connections between the test conductors C272 and C271 and the loop key K838F.

More particularly, ground potential is connected by way of the fourth contacts of the loop key K838F, the contacts 1451, the third contacts of the test reverse key K1510, the contacts 1578 and 1584 and the second contacts of the connector release key K1010R to the test conductor C272; and the test conductor C271 is connected by way of the contacts 1582 and 1576, the second contacts of the test reverse key K1510, the contacts 1453, the third contacts of the loop key K838F, the conductor C1112, the contacts 1180, the conductor C1111, the fourth contacts of the zero adjust key K839, the conductor C1489, the contacts 1481 of the operated high relay R1480, the conductor C1109 and the contacts 1437 to the positive terminal of the meter 1412. Finally, the negative terminal of the meter 1412 is connected by way of the contacts 1439, the conductor C1110, the contacts 1482 of the operated high relay R1480, the resistors 1424 and 1425 to the negative power conductor C1585. Finally, the negative power conductor C1585 may be connected by way of the contacts 1592 and the resistor 1517 to the negative terminal of the test battery 1525, the positive terminal of which is grounded; or the negative power conductor C1585 may be connected by way of the contacts 1593 and the resistors 1518 and 1519 to the negative terminal of the power rectifier 1524, the positive terminal of the power rectifier 1524 being connected by way of the contacts 1591' and the contacts 1487 of the operated high relay R1480 to ground potential. Accordingly, the meter 1412 reads on the high scale the insulation resistance in ohms of the loop connected to the test conductors C271 and C272. After completing the loop test, the operator restores the loop key K838F in order to bring about the restoration of the high relay R1480 and the start relay R1450 and the consequent release of the test circuit at the test board 200.

When a loop connected to the test conductors C271 and C272 is tested on the high scale of the meter 1412 as having very low resistance, a more accurate reading may be obtained on the low scale of the meter 1412; which may be obtained by restoring the loop key K838F and by operating the loop low key K838R. When the loop low key K838R is thus operated, there is completed, at the first contacts thereof, a circuit, including the conductor C1108, the contacts 1495, 1568, 1553, 1535, 1496, 1485 and 1475 and the resistor 1420 for operating the low relay R1490. Upon operating the low relay R1490 completes, at the contacts 1494, a holding circuit therefor, including the contacts 1485 and 1475 and the resistor 1420; and interrupts, at the contacts 1496, the operating circuits for the foreign battery relay R1470, the high relay R1480, etc. Also, at the second contacts of the loop low key K838R, there is completed a circuit, including the conductor C1107, the contacts 1461 and 1441, for energizing the upper winding of the start relay R1450 and a multiple circuit for illuminating the low scale lamp L1415; whereby the start relay R1450 operates. The illumination of the low scale lamp L1415 indicates to the operator at the test board 200 that the low scale of the meter 1412 should be read. At the fourth contacts of the loop low key K838R, the test conductor C272 is again grounded; and at the third contacts of the loop low key K838R, the test conductor C271 is again connected through to the conductor C1489; which latter conductor is connected by way of the contacts 1492 to the conductor C1109 and thence to the positive terminal of the meter 1412. The negative terminal of the meter 1412 is connected by way of the contacts 1439, the conductor C1110, the contacts 1493 and the resistors 1426, 1427, 1511, and 1513 to the negative power conductor C1585. Also, at this time, the operated low relay R1490 completes, at the contacts 1498, a path substantially identical to that previously traced for grounding the positive terminal of the power rectifier 1524; and completes, at the contacts 1491, a path for bridging the resistor 1423 across the conductors C1109 and C1110 and consequently across the positive and negative terminals of the meter 1412; whereby the meter 1412 reads on the low scale the insulation resistance in ohms of the loop connected to the test conductors C271 and C272. After completing the loop test, the operator restores the loop low key K838R in order to bring about the restoration of the low relay R1490 and the start relay R1450, as well as to extinguish the low scale lamp L1415 and the consequent release of the test circuit at the test board 200.

In order to test the insulation resistance of a circuit connected to the ring or negative test conductor C271, the ring ground key K910F is operated; whereby there is completed, at the first contacts thereof, a circuit substantially identical to that previously traced for operating the high relay R1480; and there is completed, at the second contacts thereof, a circuit substantially identical to that previously traced for energizing the lower winding of the start relay R1450 in order to cause the latter relay to operate. Upon operating the start relay R1450 connects, at the contacts 1453, the ring or negative test conductor C271 through the resistor 835, the conductor C1112, the contacts 1180, the conductor C1111, the fourth contacts of the zero adjust key K839, the conductor C1489, the contacts 1481, the conductor C1109 and the contacts 1437 to the positive terminal of the meter 1412. The negative terminal of the meter 1412 is again connected through the contacts 1482 of the operated high relay R1480 and the resistors 1424 and 1425 to the negative power conductor C1485. Accordingly, at this time, the meter 1412 reads on the high scale the insulation resistance in ohms of the circuit connected to the ring or negative test conductor C271. After completing a ring insulation test, the operator restores the ring ground key K910F in order to bring about the restoration of the high relay R1480 and the start relay R1450 and the consequent release of the test circuit at the test board 200.

When a circuit connected to the ring or negative test conductor C271 is tested on the high scale of the meter 1412 as having a very low resistance, a more accurate reading may be obtained on the low scale of the meter 1412; which may be obtained by restoring the ring ground key K910F and by operating the ring ground low key K910R. When the ring ground low key K910R is thus operated, there is completed, at the first contacts thereof, a circuit substantially identical to that previously traced for operating the low relay R1490; and there is completed, at the second contacts thereof, a circuit substantially identical to that previously traced for energizing the upper winding of the start relay R1450 and for illuminating the low scale lamp L1415 in order to cause operation of the start relay R1450. The ring or negative test conductor C271 is again connected through the resistor 835 to the positive terminal of the meter 1412; whereby the meter 1412 reads on the low scale the insulation resistance in ohms of the circuit connected to the ring or negative test conductor C271 as a consequence of the resistor 1423 being connected to the contacts 1491 across the conductors C1109 and C1110 and consequently the positive and negative terminals of the meter 1412, as previously explained. After completing the ring insulation test, the operator restores the ring ground low key K910R in order to bring about the restoration of the low relay R1490 and the start relay R1450, as well as to extinguish the low scale lamp L1415 and the consequent release of the test circuit at the test board 200.

In order to test the insulation resistance of a circuit connected to the tip or positive conductor C272, the tip ground key K911F is operated; whereby there is completed, at the first contacts thereof, a circuit substantially identical to that previously traced for operating the high relay R1480; and there is completed, at the third contacts thereof, a circuit substantially identical to that previously traced for energizing the lower winding of the start relay R1450 in order to cause the latter relay to operate. Also, at the second contacts of the tip ground key K911F, there is completed, a circuit for operating the reverse relay R1580. Upon operating, the reverse relay R1580 reverses ,at the contacts 1581, 1582, 1583 and 1584, the connections of the test conductors C271 and C272 with respect to the test circuit. Accordingly, at this time, the tip or positive test conductor C272 is connected by way of the second contacts of the connector release key K1010R, the contacts 1581 and 1576, the second contacts of the test reverse key K1510, the contacts 1453, the resistor 835, the conductor C1112, the contacts 1180, the conductor C1111, the fourth contacts of the zero adjust key K839, the conductor C1489, the contacts 1481 of the operated high relay R1480, the conductor C1109 and the contacts 1437 to the positive terminal of the meter 1412. Also the negative terminal of the meter 1412 is connected by way of the contacts 1482 of the operated high relay R1480 and the resistors 1424 and 1425 to the negative power conductor C1585. Accordingly, at this time the meter 1412 reads on the high scale the insulation resistance in ohms of the circuit connected to the tip or positive test conductor C272. After completing a tip insulation test, the operator resores the tip ground key K911F in order to bring about the restoration of the reverse relay R1580, the high relay R1480 and the start relay R1450 and the consequent release of the test circuit at the test board 200.

When a circuit connected to the tip or positive test conductor C272 is tested on the high scale of the meter 1412 as having a very low resistance, a more accurate reading may be obtained on the low scale of the meter 1412; which may be obtained by restoring the tip ground key K911F and by operating the tip ground low key K911R. When the tip ground low key K911R is thus operated, there is completed, at the first contacts thereof, a circuit substantially identical to that previously traced for operating the low relay R1490; there is completed, at the second contacts thereof, a circuit substantially identical to that previously traced for energizing the upper winding of the start relay R1450 and for illuminating the low scale lamp L1415 in order to cause the start relay R1450 to operate; and there is completed, at the third contacts thereof, a circuit substantially identical to that previously traced for operating the reverse relay R1580. When the reverse relay R1580 is operated in conjunction with the low relay R1490 and the start relay R1450, the tip or positive test conductor C272 is connected through the resistor 835 to the positive terminal of the meter 1412; and the operated low relay R1490 completes, at the contacts 1491, the path for bridging the resistor 1423 across the conductors C1109 and C1110 and consequently across the positive and negative terminals of the meter 1412. Accordingly, the meter 1412 reads, at this time, on the low scale the insulation resistance in ohms of the circuit connected to the tip or positive test conductor C272. After completing the tip insulation test, the operator restores the tip ground low key K911R in order to bring about the restoration of the reverse relay R1580, the low relay R1490 and the start relay R1450, as well as to extinguish the low scale lamp L1415 and the consequent release of the test circuit at the test board 200.

*Sect. 16.—Capacity tests*

In order to test the capacity of a loop connected to the test conductors C271 and C272 of the test circuit, the loop capacity key K913R is operated and the meter 1412 will indicate the loop capacity in microfarads on the linear scale. When the loop capacity key K913R is thus operated, there is completed, at the first contacts thereof, a circuit, including the contacts 1534, etc., for operating the capacity relay R1530; whereby the latter relay upon operating completes, at the contacts 1533, a holding circuit therefor, including the contacts 1496, etc. Also the capacity relay R1530 interrupts, at the contacts 1535, a point in the operating circuits of the foreign battery relay R1470, the high relay R1480, etc., thereby to lock out the relays mentioned. Further, the capacity relay R1530 completes, at the contacts 1532, a circuit for operating the capacity relay R1540; and completes, at the contacts 1531, a path for connecting the resistor 1512 across the conductors C1109 and C1110, and consequently across the positive and negative terminals of the meter 1412. Also, at the third contacts of the loop capacity key K913R, there is completed a circuit, substantially identical to that previously traced for energizing the lower winding of the start relay R1450 in order to cause the latter relay to operate. Finally, at the second contacts of the loop capacity key K913R, ground potential is connected through to the tip or positive test conductor C272.

Also upon operating the capacity relay R1530 completes, at the contacts 1537, a connection, including the contacts 1591', the conductor C1109, and the contacts 1437 between the positive terminal of the power rectifier 1524 and the positive terminal of the meter 1412; and completes, at the contacts 1537 and 1538, a path, including the contacts 1591' for connecting the voltage divider between the positive terminal of the power rectifier 1524 and the negative power conductor C1585, the voltage dividers comprising the resistors 1427, 1511 and 1513. Also, the negative terminal of the meter 1412 is connected by way of the contacts 1439 to the conductor C1110. Upon operating the capacity relay R1540 completes, at the contacts 1545 and 1546, a connection, including the second contacts of the test reverse key K1510 and the contacts 1576 and 1582 between the ring or negative test conductor C271 and the conductors C1106 and C1104; and completes, at the contacts 1544, a path, including the resistors 1511 and 1513 for connecting the negative power conductor C1585 to the conductor C1102. Finally, the capacity relay R1540 completes, at the contacts 1541, 1542, and 1543, multiple paths for applying ground potential to the conductors C1103 and C1105 and C1101. The application of ground potential to the conductor C1105 completes a circuit, including the contacts 1132 for operating the pulse relay R1135. Also the application of ground potential to the conductor C1105 completes a multiple circuit, including the contacts 1131, for energizing the lower winding of the pulse relay R1130; and a further multiple circuit including the resistor 1116 and the condenser 1117, for energizing the upper winding of the pulse relay R1130. The pulse relay R1130 is of the differential type; and while charging current flows through the upper winding thereof into the condenser 1117 the latter relay does not operate. However, when the condenser 1117 becomes fully charged, the pulse relay R1130 operates to interrupt, at the contacts 1131, the above traced circuits for energizing the upper and lower windings thereof; and interrupts, at the contacts 1132, the circuit for maintaining operated the pulse relay R1135. The condenser 1117 then discharges through the resistor 1116 and the two windings of the pulse relay R1130 in series causing the latter relay to be retained in its operated position for a time interval. Subsequently, when the pulse relay R1130 restores, it recompletes, at the contacts 1132, the circuit for operating the pulse relay R1135; and recompletes, at the contacts 1131, the above traced circuits for energizing in multiple, the upper and lower windings thereof. It will be understood that the above described arrangement renders the pulse relay R1130 of the combination slow-to-operate and slow-to-release type; which characteristic may be adjusted by varying the resistor 1116 in order to set the total time for the above described cycle. Specifically, the resistor 1116 is adjusted so that the pulse relay R1130 controlling the pulse relay R1135 causes the pulse relay R1135 to operate and restore ten times per second. Also, it is noted that the resistor 1133 is arranged in multiple with the winding of the pulse relay R1135 and may be adjusted to control the holding time of the pulse relay R1135 rendering it slightly slow-to-release; whereby the characteristic of the pulse relay R1135 is adjusted to maintain substantially 50% make and 50% break with respect to the contacts 1136, etc., controlled thereby.

When the loop capacity test is first started the positive terminal of the power rectifier 1524 is connected by way of the previously traced path to the positive terminal of the meter 1412; the negative terminal of the meter 1412 is connected by way of the previously traced path to the conductor C1110; the conductor C1110 is connected by way of the contacts 1173 and 1136 to the conductor C1104; the conductor C1104 is connected by way of the previously traced path to the ring or negative test conductor C271; and the tip or positive test conductor C272 is grounded; whereby any capacitance between the test conductors C272 and C271 (a condenser thereacross) is charged positively with respect to ground potential; and the charging current flowing through the meter 1412 causes the meter 1412 to produce a reading on the linear scale thereof in microfarads of the capacitance connected between the test conductors C271 and C272.

Each time the pulse relay R1135 operates, it interrupts, at the contacts 1136, the connection between the conductors C1110 and C1104; and completes, at the contacts 1137, a path, including the contacts 1173 between the conductors C1110 and C1103. When the conductor C1110 is connected to the grounded conductor C1103, the charge upon the condenser connected between the test conductors C271 and C272 is dissipated. Accordingly, when the pulse relay R1135 again restores, it disconnects, at the contacts 1137, the conductor C1110 from the grounded conductor C1103; and recompletes, at the contacts 1136, the connection between the conductor C1110 and the conductor C1104; whereby the condenser connected across the test conductors C271 and C272 is again charged positively with respect to ground potential, the charging current flowing through the meter 1412. Since the pulse relay R1130 is pulsing at a constant rate effecting pulsing at a constant rate of the pulse relay R1135, the meter 1412 will produce a constant reading proportioned to the capacitance of the condenser connected between the test conductors C271 and C272, thereby producing a reading on the linear scale thereof in microfarads of the capacitance of the condenser connected across the test conductors C271 and C272. In passing, it is noted that the pulse relay R1135 operates and restores ten times per second and is adjusted to provide a 50% make at the contacts 1136.

After testing the loop capacity of the circuit connected between the test conductors C271 and C272, the operator at the test board 200 may test the capacity of the circuit to ground potential between the ring or negative test conductor C271 by restoring the loop capacity key K913R and by operating the ring capacity key K912F. When the loop capacity key K913R is thus restored, the first contacts thereof are opened effecting restoration of the capacity relay R1530 and the consequent restoration of the capacity relay R1540; and the third contacts thereof are opened effecting restoration of the start relay R1450. Also the second contacts of the loop capacity key K913R are opened interrupting the application of ground potential to the tip or positive test conductor C272. When the ring capacity key K912F is operated, there is completed, at the first contacts thereof, a circuit substantially identical to that previously traced for operating the capacity relay R1530; whereby the capacity relay R1540 is reoperated. Also, at the second contacts of the ring capacity key K912F, there is completed a circuit substantially identical to that previously traced for energizing the lower winding of the start relay R1450 in order to effect operation thereof. At this time, since the positive or tip testing conductor C272 is not grounded in the test circuit, the capacitance of the ring or negative test conductor C271 must be with respect to outside ground potential in the circuit connected to the test conductor C271. Accordingly, at this time the reading of the meter 1412 in microfarads is a measurement of the capacity of the condenser connected between the ring or negative test conductor C271 and outside ground potential.

After the operator at the test board 200 has performed the ring capacity test, she may perform a tip capacity test by restoring the ring capacity key K912F and by operating the tip capacity key K912R. When the ring capacity key K912F is thus restored, the start relay R1450 and the capacity relays R1530 and R1540 are restored. When the tip capacity key K912R is operated, there is completed, at the first contacts thereof, a circuit substantially identical to that previously traced for operating the reverse relay R1580; there is completed, at the second contacts thereof, a circuit substantially identical to that previously traced for operating the capacity relay R1530 in order to effect operation of the capacity relay R1540; and there is completed, at the third contacts thereof, a circuit substantially identical to that previously traced for energizing the lower winding of the start relay R1450 in order to effect operation thereof. Upon operating the reverse relay R1580 disconnects, at the contacts 1582, the ring or negative test conductor C271 from the conductor C1104; and completes, at the contacts 1581, a path including the second contacts of the connector release key K1010R, the contacts 1576, the second contacts of the test reverse key K1510 and the contacts 1546 between the tip or positive test conductor C272 and the conductor C1104. Accordingly, the condenser in the circuit connected to the tip or positive test conductor C272 is tested with respect to outside ground potential, the meter 1412 producing a reading on the linear scale in microfarads of the capacitance with respect to outside ground potential of the condenser connected to the tip or positive test conductor C272.

After performing the tip capacitance test, the operator at the test board 200 restores the tip capacity key K912R in order to effect restoration of the start relay R1450, the capacity relays R1530 and R1540 and the reverse relay R1580. Upon restoring the capacity relay R1540 interrupts, at the contacts 1542, the path for applying ground potential to the conductor C1105, thereby to arrest operation of the pulse relays R1130 and R1135; whereby the test circuit at the test board 200 is released.

*Sect. 17.—Ringing tests*

In order to ring out on a circuit connected to the ring or negative test conductor C271, the ring-on-ring key K1015F is operated; whereby there is completed, at the second contacts thereof, a path for applying ground potential to the ringing mechine start conductor C1018; and there is completed, at the first contacts thereof, a circuit for operating the ring relay R1570. Upon operating the ring relay R1570 interrupts, at the contacts 1576 and 1578 the connections between the test conductors C271 and C272 and the talk repeater 821; and completes, at the contacts 1575 and 1577, a circuit for projecting ringing current over the ring or negative test conductor C271 from the direct generator 1030. More particularly, ground potential connected to one terminal of the direct generator 1030 is extended by way of the third contacts of the ring-on-ring key K1015F, the contacts 1577, 1584, the second contacts of the connector release key K1010R to the tip or positive test conductor C272; and the other terminal of the direct generator 1030 is connected by way of the associated ballast lamp, the fifth contacts of the ring-on-ring key K1015F, the second contacts of the out-ring pad key K1011, the resistor 928, the contacts 1575 and 1582 to the ring or negative test conductor C271. Thereafter, when the operator restores the ring-on-ring key K1015F, the ring relay R1570 restores and the test conductors C271 and C272 are again connected to the talk repeater 821 at the test board 200.

In order to ring out on a circuit connected to the ring or negative test conductor C271, utilizing harmonic ringing, the corresponding generator ring key is operated, such, for example as generator No. 5 ring key K1012F. When generator No. 5 ring key K1012F is thus operated, there is completed, at the first contacts thereof, a circuit substantially identical to that previously traced for operating the ring relay R1570; and there is completed, at the second contacts thereof, a path for applying ground potential to the ringing machine start conductor C1018. At this time ground potential connected to one terminal of generator No. 5, 1025, is extended by way of the third contacts of the generator No. 5 ring key K1012F, the fifth contacts of the ring-on-tip key K1015R, the fourth contacts of the ring-on-ring key K1015F, the contacts 1577 and 1584 and the second contacts of the connector release key K1010R to the tip or positive test conductor C272; and the other terminal of the generator No. 5, 1025, is connected by way of the associated ballast lamp, the fifth contacts of the generator No. 5 ring key K1012F, the seventh contacts of the ring-on-tip key K1015R, the sixth contacts of the ring-on-ring key K1015F, the second contacts of the out-ring pad key K1011, the resistor 928, the contacts 1575 and 1582 to the ring or negative test conductor C271. Thereafter when the operator restores the generator No. 5 ring key K1012F, the ring relay R1570 restores and the test conductors C271 and C272 are again connected to the talk repeater 821 at the test board 200.

In order to ring out on a circuit connected to the tip or positive test conductor C272, the ring-on-tip key K1015R is operated; whereby there is completed, at the first contacts thereof, a path for applying ground potential to the ringing machine start conductor C1018; and there is completed, at the second contacts thereof, a circuit for operating the ring relay R1570. Upon operating the ring relay R1570 interrupts, at the contacts 1576 and 1578, the connections between the test conductors C271 and C272 and the talk repeater 821; and completes, at the contacts 1575 and 1577, a circuit for projecting ringing current over the tip or positive test conductor C272 from the direct generator 1030. Also at the third contacts of the ring-on-tip key K1015R, there is completed a circuit for operating the reverse relay R1580; whereby the connections to the test conductors C271 and C272 are reversed at the contacts 1581, 1582, 1583 and 1584. More particularly, ground potential connected to one terminal of the direct generator 1030 is extended by way of the fourth contacts of the ring-on-tip key K1015R, the fourth contacts of the ring-on-ring key K1015F, the contacts 1577 and 1583 to the ring or negative conductor C271; and the other terminal of the direct generator 1030 is connected by way of the associated ballast lamp, the sixth contacts of the ring-on-tip key K1015R, the sixth contacts of the ring-on-ring key K1015F, the second contacts of the out-ring pad key K1011, the resistor 928, the contacts 1575 and 1581 and the second contacts of the connector release key K1010R to the tip or positive test conductor C272. Thereafter, when the operator restores the ring-on-tip key K1015R, the ring relay R1570 and the reverse relay R1580 restore and the test conductors C271 and C272 are again connected to the talk repeater 821 at the test board 200.

In order to ring out on a circuit connected to the tip or positive test conductor C272, utilizing harmonic ringing, the corresponding generator tip key is operated, such, for example, as generator No. 5 tip key K1012R. When generator No. 5 tip key K1012R is thus operated, there is completed, at the third contacts thereof, a circuit substantially identical to that previously traced for operating the reverse relay R1580; and there is completed, at the second contacts thereof, a circuit substantially identical to that previously traced for operating the ring relay R1570; and there is completed, at the first contacts thereof, a path for applying ground potential to the ringing machine start conductor C1018. At this time ground potential connected to one terminal of generator No. 5, 1025, is extended by way of the fourth contacts of the generator No. 5 tip key K1012R, the fourth contacts of generator No. 5 ring key K1012F, the fifth contacts of the ring-on-tip key K1015R, the fourth contacts of the ring-on-ring key K1015F, the contacts 1577 and 1583 to the ring or negative test conductor C271; and the other terminal of the generator No. 5, 1025, is connected by way of the associated ballast lamp, the sixth contacts of the generator No. 5 tip key K1012R, the sixth contacts of the generator No. 5 ring key K1012F, the seventh contacts of the ring-on-tip key K1015R, the sixth contacts of the ring-on-ring key K1015F, the second contacts of the out-ring pad key K1011, the resistor 928, the contacts 1575 and 1581 and the second contacts of the connector release key K1010R to the tip or positive test conductor C272. Thereafter, when the operator restores the generator No. 5 tip key K1012R, the ring relay R1570 and the reverse relay R1580 restore and the test conductors C271 and C272 are again connected to the talk repeater 821 at the test board 200.

When the operator at the test board 200 operates the ring-on-ring key K1015F or the ring-on-tip key K1015R, in order to cause direct ringing current from the direct generator 1030 to be projected respectively over the ring test conductor C271 or the tip test conductor C272, or operates the generator No. 5 ring key K1012F or the generator No. 5 tip key K1012R in order to cause harmonic ringing current from generator No. 5, 1025, to be projected respectively over the ring test conductor C271 or the tip test conductor C272; she may utilize the out-ring pad 915 by operating the out-ring pad key K1011. When the out-ring pad K1011 is operated, there is interrupted, at the second contacts thereof, the normally completed path for short-circuiting in series the resistors 929 and 930; and there is completed, at the first contacts thereof, a path for connecting the resistors 930 and 931 directly across the conductors extending to the blades of the ring-on-ring key K1015F forming a part of the third and fourth contacts and the fifth and sixth contacts; whereby a portion of the ringing current from the direct generator 1030 or generator No. 5, 1025, is by-passed through the resistors 930 and 931 disposed in series circuit relation. Also the resistor 929 is placed in series with the resistor 928 when the second contacts of the out-ring pad key K1011R is operated. Accordingly, the out-ring pad 915 is inserted in the ringing circuit when the out-ring pad key K1011 is operated.

At this point it is noted that the resistor 928 is by-passed by the resistors 926, 925 and 927 arranged in series circuit relation; whereby a portion of the ringing current projected over the ring test conductor C271 or the tip test conductor C272 by-passes the resistor 928 producing a voltage drop in the resistor 925. A portion of the voltage drop produced in the resistor 925 is connected by way of the contacts 1571, 1572 and the contacts 1561, 1563 to the in-put terminals of the test rectifier 1515. The out-put terminals of the test rectifier 1515 are connected by way of the contacts 1573 and 1574 to the conductors C1109 and C1110 and thence by way of the contacts 1437 and 1439 to the positive and negative terminals of the meter 1412; whereby the meter 1412 reads on the linear scale the condition of the circuit being rung. In order to calibrate the meter 1412 with respect to ringing current, the resistor 930 may be adjusted to produce a full scale reading on the linear scale of the meter 1412 when a direct short is connected between the test conductors C271 and C272 and the ring-on-ring key K1015F or the ring-on-tip key K1015R is operated connecting the direct generator 1030 in circuit. In order to remove the out-ring test pad 915 from the ringing circuit, the operator restores the out-ring pad key K1011. Of course, it will be understood that the meter 1412 produces a reading on the linear scale of the condition of the ringing circuit being tested regardless of whether the out-ring pad key K1011 is operated to insert into the ringing circuit the out-ring pad 915 or the out-ring pad key K1011 is restored to cut out of the ringing circuit the out-ring pad 915.

*Sect. 18.—Foreign battery tests*

In order to test a circuit connected to the ring or negative test conductor C271 for foreign battery potentials, the operator at the test board 200 operates the ring battery key K836, thereby to complete, at the first contacts thereof, a circuit including the contacts 1474, etc., and the resistor 1420 for operating the foreign battery relay R1470. Upon operating the foreign battery relay R1470 completes, at the contacts 1471, a path, including the conductor C1109 and the contacts 1437, for applying ground potential to the positive terminal of the meter 1412. Also, at the second contacts of the ring battery key K836, a circuit substantially identical to that previously traced is completed for energizing the lower winding of the start relay R1450 in order to cause the latter relay to operate. At this time the ring or negative test conductor C271 is connected by way of the contacts 1582 and 1576, the second contacts of the test reverse key K1510, the contacts 1453, the resistors 835, 1429 and 1422, the contacts 1472, the conductor C1110 and the contacts 1439 to the negative terminal of the meter 1412. At this time the meter 1412 reads on the linear scale the voltage of the foreign battery connected to the ring or negative test conductor C271. After performing the test, when the operator restores the ring battery key K836, the foreign battery relay R1470 and the start relay R1450 restore; whereby the test conductors C271 and C272 are again connected to the talk repeater 821; whereby the test circuit at the test board 200 is released.

In order to test a circuit connected to the tip or positive test conductor C272 for foreign battery potentials, the operator at the test board 200 operates the tip battery key K837, thereby to complete, at the second contacts thereof, a circuit substantially identical to that previously traced for operating the foreign battery relay R1470. Upon operating the foreign battery relay R1470 completes, at the contacts 1471, a path, including the conductor C1109 and the contacts 1437, for applying ground potential to the positive terminal of the meter 1412. Also, at the first contacts of the tip battery key K837, a circuit substantially identical to that previously traced is completed for energizing the lower winding of the start relay R1450 in order to cause the latter relay to operate. Finally, at the third contacts of the tip battery key K837, there is completed a circuit substantially identical to that previously traced for operating the reverse relay R1580. At this time the tip or positive test conductor C272 is connected by way of the second contacts of the connector release key K1010R, the contacts 1581 and 1576, the second contacts of the test reverse key K1510, the contacts 1453, the resistors 835, 1429 and 1422, the contacts 1472, the conductor C1110, and the contacts 1439 to the negative terminal of the meter 1412. At this time the meter 1412 reads on the linear scale the voltage of the foreign battery connected to the tip or positive test conductor C272. After performing the test when the operator restores the tip battery key K837, the foreign battery relay R1470, the start relay R1450 and the reverse relay R1580 restore; whereby the test conductors C271 and C272 are again connected to the talk repeater 821; whereby the test circuit at the test board 200 is released.

*Sect. 19.—Incoming D. C. current tests*

In order to test a circuit connected to the test conductors C271 and C272 for battery potentials, the operator at the test board 200 operates the current-in key K913F, thereby to complete, at the second contacts thereof, a circuit, including the conductor C803, for operating the ammeter relay R1430. Upon operating the ammeter relay R1430 completes, at the contacts 1432, a path for bridging the resistor 1413 across the positive and negative terminals of the meter 1412; and completes, at the contacts 1431, a path for applying ground potential to the conductor C802 in order to complete a circuit including the first contacts of the current-in key K913F, the contacts 1552, 1568, etc., and the resistor 1420 for operating the direct current relay R1550. Upon operating the direct current relay R1550 completes, at the contacts 1551, a substantially identical holding circuit for energizing the winding thereof; and interrupts, at the contacts 1553, points in the operating circuits of the foreign battery relay R1470, the high relay R1480, etc. Also, at the fourth contacts of the current-in key R913F, there is completed a circuit substantially identical to that previously traced for energizing the lower winding of the start relay R1450 in order to cause the latter relay to operate. At this time, the ring or negative test conductor C271 is connected by way of the contacts 1582 and 1576, the second contacts of the test reverse key K1510, the contacts 1453, the resistor 835, the third contacts of the current-in key K913F, the contacts 1556 of the operated direct current relay R1550, the conductor C1110 and the contacts 1439 to the negative terminal of the meter 1412; while the tip or positive test conductor C272 is connected by way of the second contacts of the connector release key K1010R, the contacts 1584, and 1578, the third contacts of the test reverse key K1510, the contacts 1451, the fifth contacts of the current-in key K913F, the conductor C1109 and the contacts 1437 to the positive terminal of the meter 1412; whereby the meter 1412 operates as a milliammeter to indicate on the linear scale the current derived from the battery that is connected to the circuit being tested.

At this time, in the event the current into the meter 1412 is of improper polarity the meter reverse key K1414 may be operated in order to effect operation of the meter reverse relay R1435; whereby the positive and negative terminals of the meter 1412 are reversed at the contacts 1436, 1437, 1438 and 1439 with respect to the conductors C1109 and C1110 in order to cause the meter to read on scale. The initial calibration of the meter 1412 may be established by adjusting the resistor 1413 connected across the positive and negative terminals of the meter 1412 when a battery of predetermined potential is connected directly across the test conductors C271 and C272. After the operator has tested the circuit connected to the test conductors C271 and C272, the current-in key K913F is restored; and the meter reverse key K1414 is restored in the event it is operated causing the meter reverse relay R1435 to restore. Upon restoring the current-in key K913 effects restoration of the start relay R1450 and the direct current relay R1550; whereby the test conductors C271 and C272 are again connected to the talk repeater 821; whereby the test circuit at the test board 200 is released.

*Sect. 20.—Incoming A. C. voltage tests*

In order to test a circuit connected to the A. C. test terminal posts and consequently to the A. C. test conductors C921 and C922, the operator at the test board 200 operates the in-A. C. key K915R, thereby to complete, at the first contacts thereof, a circuit, including the contacts 1569, 1568, 1553, etc., and the resistor 1420 for operating the A. C. current relay R1560. Upon operating the A. C. current relay R1560 completes, at the contacts 1567, a holding circuit substantially identical to that traced above for energizing the winding thereof; and interrupts, at the contacts 1568, points in the operating circuits of the foreign battery relay R1470, the high relay R1480, etc. Also, at the second contacts of the in-A. C. key K915R, there is completed a circuit substantially identical to that previously traced for energizing the lower winding of the start relay R1450 in order to cause the latter relay to operate. At this time the A. C. test conductor C922 is connected by way of the contacts 1562 of the operated A. C. current relay R1560 to one in-put terminal of the test rectifier 1515; and the A. C. test conductor C921 is connected by way of the resistors 913 and 917, the third contacts of the in-A. C. key K915R, the first contacts of the in-A. C. low key K915F and the contacts 1564 of the operated A. C. current relay R1560 to the other in-put terminal of the test rectifier 1515. Further, the out-put terminals of the test rectifier 1515 are connected by way of the contacts 1565, 1566, the conductors C1109, C1110, and the contacts 1437, 1439 respectively to the positive and negative terminals of the meter 1412. Accordingly, the meter 1412 reads on the high scale the rectified D. C. current produced from the A. C. voltage connected to the in-put terminals of the test rectifier 1515; whereby the A. C. voltage of the circuit connected to the A. C. test terminal posts is metered.

When an A. C. voltage connected to the A. C. test terminal posts is tested as having a very low value on the high scale of the meter 1412, a more accurate reading may be obtained on the low scale of the meter 1412; which may be obtained by restoring the in-A. C. key K915R and by operating the in-A. C. low key K915F. When the in-A. C. key K915R is thus restored, the A. C. current relay R1560 and the start relay R1450 are restored; and when the A. C. low key K915F is operated, there is completed, at the fourth contacts thereof, a circuit substantially identical to that previously traced for energizing the upper winding of the start relay R1450 and for illuminating the low scale lamp L1415 in order to cause operation of the start relay R1450. Also, at the third contacts of the in-A. C. low key K915F, there is completed a circuit substantially identical to that previously traced for operating the A. C. current relay R1560. At this time the A. C. test conductor C922 is connected by way of the contacts 1562 to one terminal of the test rectifier 1515; and the A. C. test conductor C921 is connected by way of the resistor 919, the second contacts of the in-A. C. low key K915 and the contacts 1564 to the other in-put terminal of the test rectifier 1515; and the out-put terminals of the test rectifier 1515 are again connected by way of the previously traced circuit to the positive and negative terminals of the meter 1412. Accordingly, the meter 1412 reads on the low scale the rectified D. C. current produced from the A. C. voltage connected to the in-put terminals of the test rectifier 1515; whereby the A. C. voltage of the circuit connected to the A. C. test terminal posts is metered. The illumination of the low scale lamp L1415 indicates to the operator at the test board 200 that the reading is on the low scale of the meter 1412 and the result is brought about by the substitution of the relatively low resistance of the resistor 919 for the relatively high resistance of the resistors 918 and 917 in the in-put circuit of the test rectifier 1515.

After the operator has tested the A. C. voltage of the circuit connected to the A. C. test terminals posts terminating the A. C. conductors C921 and C922, she restores the in-A. C. low key K915F to bring about the restoration of the start relay R1450 and the A. C. current relay R1560; whereby the test conductors C271 and C272 are again connected to the talk repeater 821 incident to restoration of the start relay R1450 and the test circuit is released.

*Sect. 21.—Battery-out tests*

In order to test a circuit connected to the test conductors C271 and C272 that requires negative battery current, the operator at the test board 200 operates the negative battery-out key K914R; whereby there is completed, at the second contacts thereof, a circuit substantially identical to that previously traced for operating the ammeter relay R1430; whereupon the latter relay operates to complete, at the contacts 1432, the previously mentioned path for connecting the resistor 1413 across the positive and negative terminals of the meter 1412 to convert the meter 1412 to a milliammeter. Also the ammeter relay R1430 completes, at the contacts 1431 a circuit including the conductor C802, the first contacts of the negative battery-out key K914R, the contacts 1552, etc., and the resistor 1420 for operating the direct current relay R1550. Upon operating the direct current relay R1550 completes, at the contacts 1551, a substantially identical holding circuit for energizing the winding thereof; and interrupts, at the contacts 1553, points in the operating circuits of the foreign battery relay R1470, the high relay R1480, etc. Also at the fifth contacts of the negative battery-out key K914R, a circuit substantially identical to that previously traced is completed for energizing the lower winding of the start relay R1450 in order to cause operation of the latter relay. At this time the tip or positive test conductor C272 is connected by way of the second contacts of the connector release key K1010R, the contacts 1584 and 1578, the third contacts of the test reverse key K1510, the contacts 1451, the third contacts of the negative battery-out key K914R, the conductor C1109 and the contacts 1437 to the positive terminal of the meter 1412; the negative terminal of the meter 1412 is connected by way of the contacts 1439, the conductor C1110, the contacts 1556, the fourth contacts of the negative battery-out key K914R and the resistor 1520 to the negative terminal of the power rectifier 1524; and the positive terminal of the power rectifier 1524 is connected by way of the resistor 1523 and the sixth contacts of the negative battery-out key K914R to ground potential. Accordingly, the meter 1412 reads on the linear scale in milliamperes the current supplied by the power rectifier 1524 over the tip or positive test conductor C272 to the circuit connected thereto that is undergoing test.

In order to test a circuit connected to the test conductors C271 and C272 that requires positive battery current, the operator at the test board 200 operates the positive battery-out key K914F; whereby there is completed, at the second contacts thereof, a circuit substantially identical to that previously traced for operating the ammeter relay R1430; whereupon the latter relay operates to complete, at the contacts 1432, the previously mentioned path for connecting the resistor 1413 across the positive and negative terminals of the meter 1412 to convert the meter 1412 to a milliammeter. Also, the ammeter relay R1430 completes, at the contacts 1431, a circuit including the conductor C802, the first contacts of the positive battery-out key K914F, the contacts 1552, etc., and the resistor 1420 for operating the direct current relay R1550. Upon operating, the direct current relay R1550 completes, at the contacts 1551 a substantially identical holding circuit for energizing the winding thereof; and interrupts, at the contacts 1553, points in the operating circuits of the foreign battery relay R1470, the high relay R1480, etc. Also, at the fifth contacts of the positive battery-out key K914F, a circuit substantially identical to that previously traced is completed for energizing the lower winding of the start relay R1450 in order to cause operation of the latter relay. At this time the tip or positive test conductor C272 is connected by way of the second contacts of the connector release key K1010R, the contacts 1584 and 1578, the third contacts of the test reverse key K1510, the contacts 1451, the third contacts of the positive battery-out key K914F, the contacts 1556, the conductor C1110 and the contacts 1439 to the negative terminal of the meter 1412; the positive terminal of the meter 1412 is connected by way of the contacts 1437, the conductor C1109, the sixth contacts of the positive battery-out key K914F and the resistor 1523 to the positive terminal of the power rectifier 1524; and the negative terminal of the power rectifier 1524 is connected by way of the resistor 1520 and the fourth contacts of the positive battery-out key K914F to ground potential. Accordingly, the meter 1412 reads on the linear scale in milliamperes the current supplied by the power rectifier 1524 over the tip or positive test conductor C272 to the circuit connected thereto that is undergoing test.

*Sect. 22.—Transmission tests*

Again assuming that a test man at the subscriber substation T in the central office desires to have tested the transmission level of the talking battery supplied thereto, he initiates a call at the subscriber substation T and may bring about operation of the finder 412, the first selector 413, and the special second selector 416; whereby the trunk 495 is seized in order to effect seizure of the test circuit associated with the test board 200 as described in Sect. 6. More particularly, the line relay R1100 operates to effect operation of the pulse relay R1280 and the hold relay R1230. The test man at the calling subscriber substation T then dials the digit 2 in order to effect operation of the second units relay RU1320 and the control relay R1370 as previously noted. At the conclusion of the digit 2, the control relays R1245, R1240 and R1270 restore as explained in Sect. 24. Upon restoring the control relay R1270 completes, at the contacts 1277, a circuit, including the grounded hold conductor C1201 and the contacts 1326 of the operated second units relay UR1320 for operating the pulse count relay R1180. Upon operating the pulse count relay R1180 completes, at the contacts 1187, a holding circuit including the fourth contacts of the impulse check talk key K1110R and the grounded hold conductor C1115 for maintaining operated the dial relay R1220 and consequently the dial relay R1250. The operated dial relay R1220 retains completed, at the contacts 1223, the connection between the ground hold conductor C1115 and the hold conductor C1201 in order to retain operated the control relay R1370 and the second units relay UR1320. Also the pulse count relay R1180 completes, at the contacts 1188, a circuit, including the grounded hold conductor C1115 and the fifth contacts of the impulse check talk key K1110R for illuminating the answer lamp L1111, thereby to indicate to the operator at the test board 200 that service is required by the test man seizing the associated test circuit.

In order to answer the call, the operator at the test board 200 operates the impulse check talk key K1110R interrupting, at the fifth contacts thereof, the circuit for illuminating the answer lamp L1111; and interrupting, at the fourth contacts thereof, the circuit for maintaining operated the dial relay R1220; whereby the latter relay restores shortly thereafter, it being of the slow-to-release type, effecting the restoration of the dial relay R1250 shortly thereafter and the consequent restoration of the control relay R1370 and the second units relay UR1320. Upon restoring, the dial relay R1220 completes, at the contacts 1221 and 1222, an operative connection between the line conductors C496 and C497 of the trunk 495 and the talk repeater 821; the line conductors C496 and C497 being connected by way of the first and second contacts of the impulse check talk key K1110R, the contacts 1191, 1192, and 1221 and 1222 to the line conductors C275 and C276 that are connected by way of the condensers 832 and 833 and the contacts 858, 855 to the extremities of the windings 822 and 824 of the talk repeater 821. Accordingly, at this time, the operator at the test board 200 converses with the test man at the calling subscriber substation T and is advised that a transmission test is required. Also, at the third contacts of the impulse check talk key K1110R there is completed a holding circuit including the grounded hold conductor C1115 and the contacts 1193 for retaining operated the pulse count relay R1180 subsequent to the restoration of the second units relay UR1320.

When the transmission test key K916 is then operated, there is interrupted, at the first contacts thereof, the path for applying ground potential to the hold conductor C1115, thereby to interrupt the circuit for maintaining operated the pulse count relay R1180; also there is completed, at the second contacts thereof, a circuit substantially identical to that previously traced for energizing the lower winding of the start relay R1450 in order to cause the latter relay to operate. Further, at the third contacts of the transmission test key K916, there is completed a circuit substantially identical to that previously traced for operating the A. C. current relay R1560. Finally, at the fourth and fifth contacts of the transmission test key K916, the line conductors C496 and C497 of the trunk 495 are connected to the test rectifier 1515. More particularly, the line conductor C496 is connected by way of the resistor 924, the fifth contacts of the transmission test key K916, the fourth contacts of the in-A. C. key K915R, the first contacts of the A. C. low key K915F, and the contacts 1564 to one in-put terminal of the test rectifier 1515; and the line conductor C497 is connected by way of the condenser 923, the fourth contacts of the transmission test key K916, and the contacts 1562 to the other in-put terminal of the test rectifier 1515. Finally, the out-put terminals of the test rectifier 1515 are connected by way of the contacts 1565, 1566, the conductors C1109, C1110 and the contacts 1437, 1439 to the positive and negative terminals of the meter 1412.

The operator at the test board 200 then advises the test man at the calling subscriber substation T to begin talking; whereby undulating currents traversing the line conductors C496 and C497 of the trunk 495 to the line relay R1100 are by-passed through the previously traced circuit, including the condenser 923, to the test rectifier 1515; whereby a portion of the undulating currents are rectified by the test rectifier 1515 and extended to the meter 1412 in order to cause the meter 1412 to indicate in milliamperes the value of the undulating current and consequently the transmission level from the calling subscriber substation T. In order to insure that the intensity of the undulating currents are not attenuated the impulse check talk key K1110R may be restored during the test to interrupt, at the first and second contacts thereof, the connection between the line conductors C496 and C497 of the trunk 495 and the talk repeater 821.

After performing the transmission test, the operator at the test board 200 may again operate the impulse check talk key K1110R in order to reestablish the previously traced connection from the calling subscriber substation T to the talk repeater 821. Then the transmission test key K916 is restored to bring about the restoration of the A. C. current relay R1560 and the consequent return, at the first contacts, of the transmission test key K916 of ground potential upon the hold conductor C1115. The operator at the test board 200 may then converse with the test man at the calling subscriber substation T advising him with reference to the transmission tests. After this test has been completed, the operator at the test board 200 restores the impulse check talk key K1110R; and the test man at the calling subscriber substation T may release the connection as described in Sect. 6 or cause other tests to be performed.

*Sect. 23.—Howler tests*

Again assume that the operator at the manual switchboard 570 has inserted the plug P576 terminating the test line 575 into a circuit requiring testing and that the operator at the test board 200 has operated the test trunk key K580 and the second test key K232R, all in the manner previously described in Sect. 7; and that a howler test is to be performed. The operator at the test board 200 then restores the second test key K232R and operates the howler key K1115; whereby the line conductors C264 and C265 connected at this time via the first and second contacts of the test trunk key K580 to the line conductor of the test trunk 575 are connected via the third and second contacts of the howler key K1115 directly to the upper and lower windings of the line relay R1730; the upper winding of the line relay R1730 being connected through the contacts 1775 and 1237 to ground potential; and the lower winding of the line relay R1730 being connected directly to battery potential; whereby a circuit is completed for operating the line relay R1730 over the line conductors of the test trunk 575. Also, at the ninth contacts of the second test key K232R, ground potential is applied to the conductor C269 and extended via the ninth contacts of the test tie key K232F to the guard conductor C279 and thence through the first contacts of the howler key K1115 to the guard conductor C1778. The line relay R1730 operates to complete, at the contacts 1732, a path between the grounded guard conductor C1778 and the tone start conductor C1716; whereby operation of the buzzer relay R1720 is initiated as explained in Sect. 24. Also the line relay R1730 completes, at the contacts 1733, a connection between the grounded guard conductor C1778 and the hold conductor C1777; whereby there is completed, a circuit including the contacts 1804, 1751 and 1731 for energizing the winding of the cycle relay R1740 in order to cause the latter relay to operate shortly thereafter, it being of the slow-to-operate type. Upon operating the cycle relay R1740 completes, at the contacts 1741, a circuit, including the contacts 1804 and the grounded hold conductor C1777, for operating the cycle relay R1745. Upon operating the cycle relay R1745 completes, at the contacts 1748 and 1749 associated with the armature RA1746 thereof, a circuit including the grounded hold conductor C1777 for energizing the winding of the cycle relay R1750 in order to cause the latter relay to operate shortly thereafter, it being of the slow-to-operate type. Upon operating the cycle relay R1750 completes, at the contacts 1754, a holding circuit, including the contacts 1748 and the grounded hold conductor C1777, for energizing the winding thereof; and interrupts, at the contacts 1751, the circuit for maintaining operated the cycle relay R1740. Upon restoring the cycle relay R1740 interrupts, at the contacts 1741, the circuit for maintaining operated the cycle relay R1745; whereby the latter relay sets into vibration its armature RA1746. After a predetermined time interval, the vibrating armature RA1746 settles down, interrupting, at the contacts 1747 and 1748, the holding circuit for maintaining operated the cycle relay R1750; whereby the latter relay upon restoring recompletes, at the contacts 1751, the circuit for operating the cycle relay R1740; whereby the above described cycle is repeated.

Also each time the cycle relay R1750 operates and then restores, it completes and then interrupts, at the contacts 1753 and 1752, a circuit for operating the pulse relay R1760; whereby the latter relay follows, effecting operations of the control relay R1870 and sequential operation of the tens relays TR1810 to TR1800, inclusive, in the manner explained in Sect. 24. After ten cycles of operation of the cycle relays mentioned, the tenth tens relay TR1800 operates to prepare, at the contacts 1807, a circuit for reoperating the first tens relay TR1810; which circuit is completed, in the event the Y wiring is employed. In the event the Y wiring is employed, the circuit mentioned extends from the grounded hold conductor C1777 by way of the contacts 1753, 1762, 1864, 1807 and 1734, the Y wiring indicated and the winding of the first tens relay TR1810 to battery potential. Upon operating the first tens relay TR1810 interrupts, at the contacts 1813, a normally completed holding circuit, including the contacts 1805 and the grounded hold conductor C1777, for maintaining operated the tenth tens relay TR1800; whereupon the latter relay restores repreparing, at the contacts 1804, the previously traced circuit for reoperating the cycle relay R1740. On the other hand, in the event the Y wiring indicated is not employed, the tenth tens relay TR1800 is retained in its operated position, interrupting, at the contacts 1804, a point in the operating circuit for the cycle relay R1740 in order to prevent further recycling thereof.

When the first tens relay TR1810 operates and then restores, it connects and then disconnects, at the contacts 1812, the tone conductor C1776 through the resistor 1852 and the contacts 1735 to the lower winding of the line relay R1730 and consequently to the line conductor C265 and the corresponding line conductor of the test trunk 575; whereby a splash of tone current is returned thereover. In a similar manner, the second and third tens relays TR1820 and TR1830 connect and then disconnect the tone conductor C1776 through the respective resistors 1853 and 1854; whereby two additional splashes of tone current are returned over the line conductor of the test trunk 575. Finally, the fourth through the ninth tens relays TR1840 to TR1890, inclusive, connect the tone conductor C1776 repeatedly directly to the line conductor of the test trunk 575; whereby six additional splashes of tone current are returned thereover. Finally, when the tenth tens relay TR1800 is operated, it prepares, at the contacts 1803, an additional connection between the tone conductor C1776 and the line conductor of the test trunk 575; which connection is completed in the event the X wiring indicated is utilized. The resistors 1852, 1853, and 1854 are of graduated decreasing resistance; whereby the first, second and third splashes of tone current returned over the line conductor of the test trunk 575 are of increasing loudness. Finally, the fourth through the ninth splashes of tone current, as well as the tenth splash of tone current if utilized are of the same and maximum loudness. The increasing loudness of the splashes of tone current returned over the test trunk 575 gives the test man listening in on the circuit being tested an opportunity to remove the receiver of the telephone instrument from his ear before the howler tone produced thereby becomes sufficiently loud to damage hearing.

In view of the foregoing, it will be appreciated that in the event neither the Y wiring nor the X wiring is employed, nine splashes of howler tone are returned over the test trunk 575. In the event only the X wiring is utilized, nine splashes of howler tone are returned over the test trunk 575 and then howler tone is continuously applied thereto as a result of the operated position of the tenth tens relay TR1800 connecting the tone conductor C1776 directly through to the line conductor of the test trunk 575. In the event only the Y wiring is utilized, nine splashes of howler tone are returned over the test trunk 575 in a cycle; and then the cycle is repeated. Finally, in the event both the X and Y wirings are utilized, ten splashes of howler tone are returned over the test trunk 575 in a cycle; and then the cycle is repeated.

After the operator performs the howler test, she restores the howler key K1115 and then operates the second test key K232R in order again to connect the test trunk 575 to the talk repeater 821 so that conversation may be resumed. When the howler key K1115 is restored, there is interrupted, at the first contacts thereof, the path for applying ground potential to the hold conductor C1777; and there is interrupted, at the second and third contacts thereof, the loop circuit for maintaining operated the line relay R1730. Upon restoring the line relay R1730 prevents further operation of the cycle relays R1740, R1745 and R1750 and the pulse relay R1760; whereupon the relays mentioned restore. Also when ground potential is removed from the hold conductor C1777, the control relay R1870 and any operated one of the tens relays TR1810 to TR1800, inclusive, restore. At this time the operator at the test board 200 may effect the complete release of the test circuit by restoring the second test key K232R as explained in Sect. 6.

*Sect. 24.—Impulse speed tests*

After a connection has been set up to or from the test board 200, the operator may cause a dial speed test to be made upon the connected circuit by operating the impulse check key K1110F; whereby the line conductors C496 and C497 extending to the upper and lower windings of the line relay R1100 are connected, at the first and second contacts of the impulse check key K1110F, to the line conductors C254 and C255 to which the circuit mentioned may be connected at this time. In this case, the operator at the test board 200 advises the person controlling the connected circuit to dial the digit 3 followed by the digit 0. On the other hand, the line conductors C496 and C497 may be seized directly by the special second selectors 416, etc., and a test performed by dialing the digit 3 followed by the digit 0; all without the assistance of the operator at the test board 200 as described in Sect. 6.

In any case, when a loop circuit is completed between the line conductors C496 and C497, the upper and lower windings of the line relay R1100 are energized; whereby the latter relay operates to complete, at the contacts 1102, the circuit for operating the pulse relay R1280. Upon operating the pulse relay R1280 completes, at the contacts 1283, the circuit for operating the hold relay R1230; and upon operating the hold relay R1230 completes, at the contacts 1232, the path for applying ground potential to the control conductor C498 of the trunk 495, thereby to mark the trunk 495 as busy to the special second selectors 416, etc., or to hold operated the special second selectors 416, etc., depending upon the route of the connection to the line relay R1100. Also, the hold conductor C1115 grounded at the first contacts of the transmission test key K916 is connected, at the contacts 1234, to the hold conductor C1201 via the contacts 1251. Also the hold relay R1230 completes, at the contacts 1235, a circuit for illuminating the busy lamp L1210 in order to indicate to the operator at the test board 200 that the associated testing circuit is busy, in the event the connection is extended directly from a subscriber substation in the central office to the testing circuit without the assistance of the operator as described in Sect. 6.

When the first digit 3 is received, the line relay R1100 follows, repeating, at the contacts 1102, to the pulse relay R1280; whereby the latter relay follows. Each time the pulse relay R1280 restores and then reoperates, it interrupts and then recompletes at the contacts 1283, the circuit for maintaining operated the hold relay R1230; whereby the latter relay is retained in its operated position during impulsing as it is of the slow-to-release type. The first time the pulse relay R1280 restores, it completes, at the contacts 1282, a circuit, including the contacts 1231 and 1241, for operating the control relay R1245. Upon operating the control relay R1245 completes, at the contacts 1247, a holding circuit, including the contacts 1241 and the grounded hold conductor C1201, for energizing the winding thereof. Also the control relay R1245 completes, at the contacts 1248, a circuit, including the grounded hold conductor C1201, for operating the control relay R1270. Upon operating the control relay R1270 completes, at the contacts 1272, a circuit, including the grounded hold conductor C1201 and the contacts 1374, for operating the first units relay UR1310; and completes, at the contacts 1275, a circuit, including the grounded hold conductor C1201, for operating the dial relay R1220. Upon operating the dial relay R1220 completes, at the contacts 1223, a multiple path, including the contacts 1234, between the grounded hold conductor C1115 and the hold conductor C1201; and completes, at the contacts 1224, a circuit for operating the dial relay R1250. Upon operating the dial relay R1250 interrupts, at the contacts 1251, the previously traced original path for connecting the grounded hold conductor C1115 to the hold conductor C1201. Upon operating the first units relay UR1310 completes, at the contacts 1313, a circuit, including the grounded hold conductor C1201, for operating the control relay R1370. Also the first units relay UR1310 completes, at the contacts 1315, a holding circuit for energizing the winding thereof in series with the winding of the control relay R1360; which circuit includes the grounded hold conductor C1201 and the contacts 1324, in order to cause the control relay R1360 to operate. Upon operating the control relay R1370 completes, at the contacts 1375, a holding circuit, including the grounded hold conductor C1201, for energizing the winding thereof; and interrupts, at the contacts 1374, the original circuit for operating the first units relay UR1310.

Upon the first reoperation of the pulse relay R1280, it completes, at the contacts 1283, the circuit for maintaining operated the hold relay R1230 and a multiple circuit, including the contacts 1246, for operating the control relay R1240. Also the pulse relay R1280 completes, at the contacts 1284, a circuit, including the grounded hold conductor C1201, the contacts 1272, the conductor C1302 and the contacts 1363 and 1314, for operating the second units relay UR1320; and completes, at the contacts 1286, a holding circuit, including the grounded hold conductor C1201, the contacts 1273, the conductor C1301 and the contacts 1362, for energizing the upper winding of the control relay R1360. Upon operating the control relay R1240 completes, at the contracts 1243, a holding circuit, including the grounded hold conductor C1201 and the contacts 1246, for energizing the winding thereof; and completes, at the contacts 1242, a multiple alternative circuit, including the grounded hold conductor C1201, for maintaining operated the control relay R1270. Also upon operating, the control relay R1240 interrupts, at the contacts 1241, the circuit for maintaining operated the control relay R1245. Upon restoring the control relay R1245 interrupts, at the contacts 1243, the circuit for maintaining operated the control relay R1240; and interrupts, at the contacts 1248, the first mentioned circuit for maintaining operated the control relay R1270. Upon restoring the control relay R1240 interrupts, at the contacts 1242, the alternative circuit for maintaining operated the control relay R1270; and reprepares, at the contacts 1241, the previously traced circuit for operating the control relay R1245 when the pulse relay R1280 again restores. The control relay R1270 is rendered slightly slow-to-release by virtue of the multiple connected associated resistor; whereby the alternate operations of the control relays R1245 and R1240 maintain the control relay R1270 in its operated position during impulsing.

Upon operating the second units relay UR1320 completes, at the contacts 1322, a holding circuit, including the grounded hold conductor C1201 and the contacts 1332, for energizing the winding thereof; and interrupts, at the contacts 1324, the holding circuit for maintaining operated the first units relay UR1310 and for energizing the lower winding of the control relay R1360; however, the control relay R1360 is retained in its operated position at this time by virtue of the completed holding circuit for energizing the upper winding thereof.

Upon the second restoration of the pulse relay R1280, there is interrupted, at the contacts 1286 thereof, the holding circuit for energizing the upper winding of the control relay R1360; whereby the latter relay restores. Also the previously traced circuit for operating the control relay R1245 is completed; whereby the latter relay operates to retain operated the control relay R1270.

Upon the second reoperation of the pulse relay R1280, there is completed, at the contacts 1284, a circuit, including the grounded hold conductor C1201, the contacts 1272, the conductor C1302, the contacts 1364 and 1325, for operating the third units relay UR1330. Also upon the second reoperation of the pulse relay R1280, there is completed, at the contacts 1286, a path, including the contacts 1273 and 1361, and the grounded hold conductor C1201, for short-circuiting the lower winding of the control relay R1360. Upon operating the third units relay UR1330 completes, at the contacts 1334, a holding circuit, including the contacts 1343, 1361, 1286 and 1273 and the grounded hold conductor C1201, for energizing the winding thereof. Subsequently, upon the next restoration of the pulse relay R1280, there is interrupted, at the contacts 1286, the above traced path for short-circuiting the lower winding of the control relay R1360; whereby a holding circuit is completed for energizing the winding of the third units relay UR1330 in series with the lower winding of the control relay R1360 in order to cause the latter relay to operate.

In view of the foregoing, it will be understood that the units relays UR1310, UR1320, UR1330, etc., may be operated sequentially in response to restoration and reoperation of the pulse relay R1280 repeatedly. Also after operation of one of the odd units relays UR1310, UR1330, etc., it locks in series with the lower winding of the control relay R1360 effecting operation of the latter relay.

In the present example, at the conclusion of the digit 3, the line relay R1100 is retained operated to retain operated the pulse relay R1280, the third units relay UR1330, the control relays R1360 and R1370 and the hold relay R1230. At this time the control relay R1245 restores, effecting the restoration of the control relay R1240; whereby the control relay R1270 restores shortly thereafter. Upon restoring the control relay R1270 completes, at the contacts 1277, a circuit, including the grounded hold conductor C1201 and the contacts 1335 of the operated third units relay UR1330, for energizing the lower winding of the speed relay R1260 in order to cause the latter relay to operate. Also the control relay R1270 interrupts, at the contacts 1275, the circuit for maintaining operated the dial relay R1220 in order cause the latter relay to restore shortly thereafter, it being of the slow-to-release type. The dial relay R1220 interrupts, at the contacts 1224, the circuit for maintaining operated the dial relay R1250 in order to cause the latter relay to restore shortly thereafter, it being of the slow-to-release type. Also upon restoring the dial relay R1220 interrupts, at the contacts 1223, the alternative path between the grounded hold conductor C1115 and the hold conductor C1201; whereby ground potential is removed from the hold conductor C1201 until the dial relay R1250 restores to recomplete, at the contacts 1251, the initial path for connecting the grounded hold conductor C1115 to the hold conductor C1201. Accordingly, ground potential is removed from the hold conductor C1201 for a short-time interval following the restoration of the dial relay R1220 and prior to restoration of the dial relay R1250, thereby to interrupt the holding circuits for maintaining operated the third units relay UR1330 and the control relays R1360 and R1370; whereby the relays UR1310, etc. are restored at this time.

Also upon operating the speed relay R1260 completes, at the contacts 1265, a holding circuit, including the contacts 1981 and 1234 and the grounded hold conductor C1115, for energizing the upper winding thereof; and completes, at the contacts 1267, a circuit for operating the start relay R1770. Further, the speed relay R1260 completes, at the contacts 1262, a circuit, including the contacts 1182 and the tone start conductor C1716, for energizing the lower winding of the buzzer relay R1720 in order to cause the latter relay to operate. Upon operating the buzzer relay R1720 completes, at the contacts 1721, a circuit for energizing the upper winding thereof in multiple with the lower winding thereof; whereby the buzzer relay R1720 restores, it being of the differential type. Upon restoring the buzzer relay R1720 interrupts, at the contacts 1721, the circuit for energizing the upper winding thereof; whereby the latter relay reoperates. Accordingly, the buzzer relay R1720 operates buzzer-fashion. Also each time the buzzer relay R1720 operates, it completes, at the contacts 1721, a path, including the contacts 1262 and 1182, for applying ground potential through the winding 1710 to the upper terminal of the condenser 1711, the lower terminal of the condenser 1711 being connected through the winding 1712 to ground potential; whereby the condenser 1711 is alternately charged and discharged as a consequence of the buzzing operation of the buzzer relay R1720. The charging current of the condenser 1711 traversing the winding 1712, induces a corresponding tone in the inductively coupled winding 1713, the lower terminal of which is connected to ground potential and the upper terminal of which is connected via the condenser 1714 to the tone conductor C1776. Accordingly, a unique tone is generated by the buzzer relay R1720 in conjunction with the windings 1712 and 1713 inductively coupled and applied to the tone conductor C1776.

When the digit 0 is then dialed, the line relay R1100 follows, repeating to the pulse relay R1280; and the pulse relay R1280 effects sequential operation of the ten units relays UR1310 to UR1300, inclusive. Upon the first restoration of the pulse relay R1280, the control relay R1245 is operated to effect operation of the control relay R1270 in the manner previously explained. At this time, upon operating the control relay R1270 completes, at the contacts 1278, a circuit, including the grounded hold conductor C1201, the contacts 1266, and 1131, for energizing the lower winding of the pulse relay R1130 and a substantially identical circuit also including the resistor 1116 and the condenser 1117 for energizing the upper winding thereof; whereby the pulse relay R1130 operates and restores intermittently ten times per second, the previously adjusted standard rate. Further, the control relay R1270 completes, at the contacts 1278, an initial circuit, including the grounded hold conductor C1201, the contacts 1266 and 1132, for operating the pulse relay R1135. Each time the pulse relay R1130 operates, it effects restoration of the pulse relay R1135; and conversely; whereby the pulse relay R1135 operates and restores ten times per second, the standard pulsing rate. Finally, the control relay R1270 completes, at the contacts 1276, a connection including the contacts 1264 between the winding of the pulse relay R1760 and the contacts 1135′ of the pulse relay R1135; whereby each time the pulse relay R1135 operates and then restores, it completes and then interrupts, at the contacts 1135′, the circuit for operating the pulse relay R1760; whereby the pulse relay R1760 follows the pulse relay R1135 at the standard rate of ten impulses per second.

Upon operating the start relay R1770 completes, at the contacts 1772, a path for applying ground potential to the hold conductor C1777. Also at the first operation of the pulse relay R1760, there is completed, at the contacts 1762, a path, including the grounded hold conductor C1777, the contacts 1804 and 1871, for operating the first tens relay TR1810. Upon operating the first tens relay TR1810 completes, at the contacts 1816, a holding circuit, including the contacts 1824, 1861, 1761 and 1804 and the grounded hold conductor C1777, for energizing the winding thereof; and completes, at the contacts 1814, a circuit, including the grounded hold conductor C1777, for operating the control relay R1870; whereby the latter relay, upon operating, completes, at the contacts 1873, a holding circuit, including the grounded hold conductor C1777 for energizing the winding thereof. Also, the control relay R1870 interrupts, at the contacts 1871, the initial circuit for operating the first tens relay TR1810.

Upon the first restoration of the pulse relay R1760, there is interrupted, at the contacts 1761, the initial holding circuit for energizing the winding of the first tens relay TR1810 and a multiple path, including the grounded hold conductor C1777, for short-circuiting the lower winding of the control relay R1860; whereby there is completed a series circuit, including the grounded hold conductor C1777, and the contacts 1824 and 1816, for energizing the lower winding of the control relay R1860 in series with the winding of the first tens relay TR1810; thereby to retain operated the first tens relay TR1810 and to effect operation of the control relay R1860.

Upon the second operation of the pulse relay R1760, there is completed, at the contacts 1761, a holding circuit, including the contacts 1862, 1804 and the grounded hold conductor C1777, for energizing the upper winding of the control relay R1860. Also, there is completed, at the contacts 1762, a circuit, including the grounded hold conductor C1777, the contacts 1804, 1863 and 1815 for operating the second tens relay TR1820. Upon operating the second tens relay TR1820 completes, at the contacts 1823, a holding circuit, including the contacts 1833 and the grounded hold conductor C1777 for energizing the winding thereof; and interrupts, at the contacts 1824, the holding circuit for energizing in series the winding of the first tens relay TR1810 and the lower winding of the control relay R1860; whereupon the first tens relay TR1810 restores, but the control relay R1860 is retained in its operated position by virtue of the completed holding circuit for energizing the upper winding thereof. Upon the second restoration of the pulse relay R1760, there is interrupted, at the contacts 1761, the holding circuit for energizing the upper winding of the control relay R1860 in order to cause the latter to restore. Upon the third operation of the pulse relay R1760, there is completed, at the contacts 1762, a circuit, including the grounded hold conductor C1777, the contacts 1804, 1864 and 1825, for operating the third tens relay R1830. In view of the foregoing, it will be understood that the tens relays TR1810, TR1820, etc., are operated sequentially and that after one of the odd tens relays TR1810, TR1830, etc., is operated, it is locked in series with the lower winding of the control relay R1860 in order to effect operation of the latter relay.

In view of the foregoing, it will be appreciated that the units relays UR1310, UR1320, etc., are operated directly under the control of the dial or other impulse transmitting device being tested; whereby the rate of operation thereof is dependent upon the rate of impulsing of the dial being tested. On the other hand, the tens relays TR1810, TR1820, etc., are operated directly under the control of the pulse relays R1130 and R1135, through the intermediary of the pulse relay R1760; whereby the speed of operation thereof is set exactly at the standard ten impulse per second. Accordingly, the units relays UR1310, etc., are operated faster than, at the same rate of, or slower than the tens relays TR1810, etc., depending upon whether the characteristic of the impulsing device being tested is respectively fast, standard or slow, with respect to ten impulses per second. Hence, when the tenth units relay UR1300 is operated, a smaller number of the tens relays TR1810, etc., will be operated in the event the impulsing device being tested is fast, or the tenth tens relay TR1800 will be operated in the event the device being tested is standard, or a greater number of the tens relays TR1810, etc., will be operated in the event the impulsing device being tested is slow.

The tens relays TR1810 to TR1800 are arranged for recycling; whereby the first tens relay TR1810 is reoperated on the eleventh impulse received from the pulse relay R1760. More particularly, upon the eleventh operation of the pulse relay R1760, there is completed, at the contacts 1762, a circuit for energizing the winding of the first tens relay TR1810 in series with the lower winding of the control relay R1860; whereby the relays mentioned operate. This circuit extends from the grounded hold conductor C1777 by way of the lower winding of the control relay R1860, the contacts 1861, 1761, 1762, 1864, 1807, 1268, and the winding of the tens relay TR1810 to battery. Upon operating the first tens relay TR1810 completes, at the contacts 1816, an alternative holding circuit, including the contacts 1824 and the grounded hold conductor C1777, for energizing the winding thereof in series with the lower winding of the control relay R1860. The subsequent operation of the second tens relay TR1820, the third tens relay TR1830, etc., upon the respective twelfth, thirteenth, etc., pulses received from the pulse relay R1760 is the same as previously described, since upon operating the first tens relay TR1810 interrupts, at the contacts 1813, the holding circuit, including the grounded hold conductor C1777 and the contacts 1805, for maintaining operated the tenth tens relay TR1800.

At the conclusion of the reception of the digit 0 transmitted by the impulsing device being tested, the tenth units relay UR1300 is operated as previously noted; and the line relay R1100, the pulse relay R1280, and the hold relay R1230 are retained in their operated positions. The operated pulse relay R1280 effects the restoration of the control relay R1245 and the consequent restoration of the control relay R1240; whereby the control relay R1270 is restored in the manner previously explained. Upon restoring the control relay R1270 interrupts, at the contacts 1273, the circuit for effecting operation of the pulse relays R1130 and R1135; and interrupts, at the contacts 1276, the circuit for operating the pulse relay R1760, thereby to insure restoration of the latter relay; whereupon, further operation of the tens relays TR1810, etc., is arrested. Upon restoring, the control relay R1270 completes, at the contacts 1274, a circuit, including the grounded hold conductor C1201, the contacts 1252, 1269 and 1307, for operating the control relay R1985; whereby the latter relay completes, at the contacts 1986, a circuit for operating the control relay R1970. Also upon restoring the control relay R1270 interrupts, at the contacts 1275, the circuit for maintaining operated the dial relay R1220; whereby the latter relay restores shortly thereafter, it being of the slow-to-release type to interrupt, at the contacts 1224, the circuit for maintaining operated the dial relay R1250 in order to cause the latter relay to restore shortly thereafter, it being of the slow-to-release type. During the interim between the restoration of the dial relays R1220 and R1250 ground potential is removed from the hold conductor C1201 in order to effect the restoration of the control relay R1370 and the tenth units relay UR1300.

Upon restoring the tenth units relay UR1300 interrupts, at the contacts 1307, the circuit for maintaining operated the control relay R1985; whereby the latter relay restores shortly thereafter, it being of the slow-to-release type. Upon restoring, the control relay R1985 interrupts, at the contacts 1986, the original circuit for operating the control relay R1970; however, by this time, a holding circuit is completed for maintaining operated the control relay R1970 via one of the conductors C1994, C1995 or C1996, as explained more fully below. Specifically, during the short-time interval that ground potential is removed from the hold conductor C1201, incident to restoration of the dial relay R1220 and prior to restoration of the dial relay R1250, the control relay R1985, being of the slow-to-release type, prevents restoration of the control relay R1970 since the holding circuit for the control relay R1970 mentioned above and including one of the conductors C1994, C1995 or C1996 also includes the hold conductor C1201 as traced hereinafter. Upon operating, the control relay R1970 completes, at the contacts 1975, a path in multiple to the contacts 1981 of the control relay R1980, in order to complete an alternative holding circuit including the grounded hold conductor C1115, the contacts 1234 and 1265, for energizing the upper winding of the speed relay R1260. Further, the control relay R1970 completes, at the contacts 1973, a direct path including the contacts 1234 between the grounded hold conductor C1115 and the hold conductor C1901.

Also upon operating the control relay R1970 completes, at the contacts 1971 a holding circuit for energizing the winding thereof; which holding circuit extends to the contacts 1941, 1951, and 1961 in multiple; the contacts mentioned being connected to the respective conductors C1996, C1995 and C1994; one of which is grounded at this time. More particularly, the grounded hold conductor C1201 is connected by way of the contacts 1274 to the conductor C1895; which conductor C1895 is connected via the upper contacts of the particular operated one of the tens relays TR1810, etc., to the corresponding conductor C1996, C1995 or C1994. Specifically, the conductor C1895 may be connected by way of the contacts 1811, etc., of the first five tens relays TR1810 to TR1850, inclusive, to the conductor C1996; the conductor C1895 may be connected by way of the contacts 1861, etc., of the sixth, seventh, eighth and ninth tens relays TR1860 to TR1890, inclusive, to the conductor C1994; and the conductor C1895 may be connected by way of the contacts 1802 of the tenth tens relay TR1800 to the conductor C1995. Hence, it will be understood that the holding circuit for the control relay R1970 is completed, via the conductor C1994 in the event the impulsing device being tested is fast; the holding circuit for the control relay R1970 is completed via the conductor C1995 in the event the impulsing device being tested is standard; and the holding circuit for the control relay R1970 is completed via the conductor C1996 in the event the impulsing device being tested is slow.

Also upon operating the control relay R1970 completes, at the contacts 1974, a circuit, including the grounded hold conductor C1115 and the contacts 1234, for operating the control relay R1980. Also the control relay R1970 completes, at the contacts 1972, a circuit for energizing the winding of the cycle relay R1930; which circuit includes the resistor 1910 and the grounded one of the conductors C1994, C1995 or C1996 as previously explained. Shortly after the winding of the cycle relay R1930 is thus energized, it operates as it is of the slow-to-operate type. Upon operating the cycle relay R1930 completes, at the contacts 1932, a circuit, including the contacts 1972 and one of the grounded conductors C1994, etc., previously mentioned, and the resistor 1912 for energizing the winding of the cycle relay R1920. Shortly after the winding of the cycle relay R1920 is thus energized, it operates as it is of the slow-to-operate type, completing, at the contacts 1921, a path for short-circuiting the winding of the cycle relay R1930 rendering the latter relay slightly slow-to-release. Upon restoring the cycle relay R1930 interrupts, at the contacts 1932, the circuit for maintaining operated the cycle relay R1920; and completes, at the contacts 1933, a path for short-circuiting the winding of the cycle relay R1920 rendering the latter relay slightly slow-to-release. Upon restoring the cycle relay R1920 interrupts, at the contacts 1921, the path for short-circuiting the winding of the cycle relay R1930; whereby it may be again energized in order to effect reoperation thereof shortly thereafter; whereupon the cycle above described may be repeated. Each time the cycle relay R1930 operates and then restores, it completes and then interrupts, at the contacts 1931, a connection between the tone conductor C1776 and the line conductor C497; whereby a splash of tone is returned to the circuit connected to the line conductors C496 and C497 at this time in order to give the test man or other person an audible tone indicative of the speed of the impulse transmitting device being tested as explained more fully hereinafter. Also the first time the cycle relay R1930 operates, it completes, at the contacts 1934, a circuit, including the contacts 1972 and the grounded conductor C1994, etc., and the contacts 1942, for energizing the upper winding of the tone cut-off relay R1940; and a substantially identical circuit, also including the contacts 1946 and the resistor 1911, for energizing the lower winding of the tone cut-off relay R1940. When thus energized, the tone cut-off relay R1940 does not operate as it is of the differential type. Subsequently, when the cycle relay R1930 restores to interrupt, at the contacts 1934, the multiple circuits for energizing the upper and lower windings of the tone cut-off relay R1940, the fields therein collapse causing the latter relay to operate through its first step. When the tone cut-off relay R1940 operates through its first step, it completes, at the contacts 1944, a circuit, including the grounded hold conductor C1901 for energizing the upper and lower windings thereof in series; whereby the latter relay operates through its second step. When the tone-off relay R1940 operates through its second step, it interrupts, at the contacts 1941, the connection to the conductor C1996; whereby further operation of the cycle relays R1930 and R1920 is arrested in the event operation thereof was initiated by virtue of the application of ground potential to the conductor C1996; whereby one splash of tone is returned over the line conductor C497.

Further, in the event ground potential is connected to the conductor C1995, the cycle relays R1930 and R1920 are operated through a second cycle in order to return a second splash of tone over the line conductor C497 and to effect operation of the second tone cut-off relay R1950 in a substantially identical manner. Upon operating the second tone cut-off relay R1950 interrupts, at the contacts 1951, the connection between the conductor C1995 and the cycle relay R1930; whereby further operation of the cycle relays R1930 and R1920 is arrested in the event operation thereof was initiated by virtue of the application of ground potential to the conductor C1995; whereby two splashes of tone are returned over the line conductor C497. Finally, in the event ground potential is connected to the conductor C1994, the cycle relays R1930 and R1920 are operated through a third cycle in order to return a third splash of tone over the line conductor C497 and to effect operation of the third tone cut-off relay R1960 in a substantially identical manner. Upon operating the third tone cut-off relay R1960 interrupts, at the contacts 1961, the connection between the conductor C1994 and the cycle relay C1930; whereby further operation of the cycle relays R1930 and R1920 is arrested; whereby three splashes of tone are returned over the line conductor C497.

Thus it will be understood that in the event the impulse transmitting device being tested is respectively slow, standard or fast, one, two or three splashes of tone current are returned over the connection, including the line conductor C497, thereby to indicate the corresponding one of the three conditions mentioned to the test man or other person testing the impulsing speed of the impulse transmitting device mentioned.

Also, when ground potential on one of the conductors C1996, C1995 or C1994 is interrupted, at the corresponding contacts 1941, 1951 or 1961 by the operation of the corresponding tone cut-off relays R1940, R1950 or R1960, the multiple holding circuit for maintaining operated the control relay R1970 is interrupted causing the latter relay to restore shortly thereafter, it being of the slow-to-release type. Upon restoring the control relay R1970 interrupts, at the contacts 1974, the circuit for maintaining operated the control relay R1980; thereby to cause the latter relay to restore shortly thereafter, it being of the slow-to-release type. Also the control relay R1970 interrupts, at the contacts 1975, the previously traced holding circuit for energizing the upper winding of the speed relay R1260 in order to cause the latter relay to restore; and interrupts, at the contacts 1973, the previously traced path for applying ground potential from the hold conductor C1115 to the hold conductor C1901. When ground potential is thus removed from the hold conductor C1901, there is interrupted the holding circuit for maintaining operated the particular ones of the tone cut-off relays R1940, R1950 and R1960 that is operated at this time. Upon restoring the speed relay R1260 interrupts, at the contacts 1267, the circuit for maintaining operated the start relay R1770. Upon restoring the start relay R1770 interrupts, at the contacts 1772, the path for applying ground potential to the hold conductor C1777, thereby to bring about restoration of the particular operated one of the tens relays TR1810 to TR1800, inclusive, the control relay R1870, as well as the control relay R1860 in the event it is operated.

At this time the test circuit associated with the test board 200 occupies its seized condition wherein only the line relay R1100, the pulse relay R1280 and the hold relay R1230 occupy their operated positions, all of the relays operated incident to performing the impulsing speed of the connected impulse transmitting device as a consequence of the dialing of the digits 3 and 0 being restored at this time. Accordingly, the test man may again test the impulsing speed of the connected impulse transmitting mechanism by again dialing the digits 3 and 0. Of course, other tests may be performed on the connected impulse transmitting device as explained more fully hereinafter. Subsequently, when the test man disconnects from the line conductors C496 and C497, in the event the line relay R1100 is seized directly by a test man from a calling subscriber substation as explained in Sect. 6, or when the operator at the test board 200 disconnects the circuit being tested from the line conductors C496 and C497 by restoring the appropriate operated key, the line relay R1100 restores effecting the restoration of the pulse relay R1280 and the consequent restoration of the hold relay R1230 shortly thereafter, the latter relay being of the slow-to-release type. At this time the test circuit associated with the test board 200 is completely released and available for further use.

*Sect. 25.—Impulse speed calibration*

In order to insure the accuracy of impulse speed tests as described in Sect. 24, utilizing the pulse generating relays R1130 and R1135, the operator at the test board 200 operates the speed calibration key K1146 when the associated test circuit is idle, thereby to complete a circuit for operating the speed relay R1140. With a stop watch the operator at the test board 200 checks the time required for the transmission of 100 impulses by the pulse relay R1135 as indicated on the tens lamps TL1801 to TL1810, inclusive, and the units lamps UL1301 to UL1310, inclusive. The resistor 1116 may then be adjusted in order to increase or to decrease the rate of pulsing of the pulse relay R1130; whereby the pulse relay R1135 is set to transmit ten pulses per second.

Specifically upon operating the speed relay R1140 completes, at the contacts 1141 and 1142, a bridge, including the contacts 1138 of the pulse relay R1135, across the line conductors C496 and C497 in order to effect operation of the line relay R1100. Also the speed relay R1140 completes, at the contacts 1145, a circuit for operating the start relay R1770; and completes, at the contacts 1144, a circuit for bringing about operation of the pulse relays R1130 and R1135 in the manner previously explained. Upon operating the line relay R1100 effects operation of the pulse relay R1280 and the consequent operation of the hold relay R1230; whereby the busy lamp L1210 is illuminated; all in the manner previously explained. Also upon operating the pulse relay R1280 completes, at the contacts 1281, a circuit, including the contacts 1141' and 1872, for operating the first tens relay TR1810; whereby the latter relay completes, at the contacts 1814, the previously traced circuit for operating the control relay R1870; and completes, at the contacts 1816, the previously traced holding circuit for energizing the winding thereof in series with the lower winding of the control relay R1860. Upon operating the control relay R1870 interrupts, at the contacts 1872, the original circuit for operating the first tens relay TR1810. Also the first tens relay TR1810 completes, at the contacts 1817, a circuit, including the contacts 1143 for illuminating the first tens lamp TL1801.

Upon operating the pulse relay R1135 interrupts, at the contacts 1138, the bridge path for maintaining operated the line relay R1100; whereby the line relay R1100 effects the restoration of the pulse relay R1280 in order to bring about operation of the control relay R1245 and the consequent operation of the control relay R1270, the dial relay R1220 and the dial relay R1250. Also the control relay R1270 effects operation of the first units relay UR1310 and the consequent operation of the control relays R1370 and R1360. Upon the first restoration of the pulse relay R1135, there is completed, at the contacts 1138, the bridge circuit for reoperating the line relay R1100; whereupon the pulse relay R1280 reoperates in order to retain operated the hold relay R1230, the latter relay being of the slow-to-release type. Also upon reoperating the pulse relay R1280 effects operation of the control relay R1240 and operation of the second units relay UR1320; whereby the first units relay UR1310 is restored; whereby the units relays UR1310 to UR1300 are sequentially operated in the manner explained in Sect. 24. When the tenth units relay UR1390 operates, it completes, at the contacts 1302, a holding circuit, including the contacts 1312, for energizing the winding thereof; prepares, at the contacts 1304, a circuit traced hereinafter for reoperating the first units relay UR1310; and interrupts, at the contacts 1303, the holding circuit for energizing the winding of the ninth units relay UR1390 in series with the lower winding of the control relay R1360; whereby the ninth units relay UR1390 restores. When the pulse relay R1280 then restores, it interrupts, at the contacts 1286, the holding circuit for energizing the upper winding of the control relay R1360; whereby the latter relay restores, preparing, at the contacts 1364, a further point in the circuit for operating the first units relay UR1310. When the pulse relay R1280 again reoperates, it completes, at the contacts 1284, the previously mentioned circuit, including the grounded hold conductor C1201, the contacts 1272, 1364, 1304 and 1991, for operating the first units relay UR1310; whereby a second cycle of operation of the units relays UR1310 to UR1300, inclusive, is initiated.

At the conclusion of the first cycle of operation of the unit relays UR1310 to UR1300, inclusive, when the tenth units relay UR1300 operates, there is completed, at the contacts 1305, a circuit, including the grounded hold conductor C1777, the contacts 1992, the contacts 1263 and 1295, for energizing the upper winding of the control relay R1290; a substantially identical multiple circuit, also including the contacts 1292 and the resistor 1214, for energizing the lower winding of the control relay R1290. When the upper and lower windings of the control relay R1290 are thus energized, the latter relay does not operate as it is of the differential type. Subsequently, when the first units relay UR1310 is operated and the tenth units relay UR1300 is restored, there is interrupted, at the contacts 1305, incident to the restoration of the tenth units relay UR1300, the circuit for energizing in multiple the upper and lower windings of the control relay R1290. During the interval that the field is collapsing in the upper winding of the control relay R1290, the latter relay is unbalanced; whereby it operates to close the contacts 1291 in order to complete a circuit, including the grounded hold conductor C1201 and the contacts 1332, for energizing the upper and lower windings thereof in series circuit relation. The control relay R1290 then operates fully to interrupt, at the contacts 1292, the previously traced path, including the resistor 1214; completes, at the contacts 1293, a holding circuit, including the contacts 1771 and 1862 for energizing the upper winding of the control relay R1860; and completes, at the contacts 1294, a circuit, including the contacts 1773, 1863 and 1815, for operating the second tens relay TR1820. Upon operating the second tens relay TR1820 interrupts, at the contacts 1824, the holding circuit for energizing the winding of the first tens relay TR1810 in series with the lower winding of the control relay R1860: whereby the first tens relay TR1810 restores. Upon restoring the first tens relay TR1810 interrupts, at the contacts 1817, the previously traced circuit for illuminating the first tens lamp TL1801: and upon operating the second tens relay TR1820 completes, at the contacts 1827, a substantially identical circuit for illuminating the second tens lamp TL1802. Subsequently, during the second cycle of operation of the units relays UR1310 to UR1300, inclusive, when the third units relay UR1330 operates, it interrupts, at the contacts 1332, the previously traced holding circuit for energizing in series the upper and lower windings of the control relay R1290 in order to cause the latter relay to restore. Upon restoring the control relay R1290 interrupts, at the contacts 1293, the holding circuit for energizing the upper winding of the control relay R1860 in order to cause the latter relay to restore; and interrupts, at the contacts 1294, the circuit for operating the second tens relay TR1820; however, the second tens relay TR1820 is retained in its operated position at this time by virtue of the completion of a holding circuit for energizing the winding thereof, including the grounded hold conductor C1777 and the contacts 1833 and 1823. In view of the foregoing, it will be appreciated that as the units relays UR1310 to UR1300, inclusive, are recycled, the tens relays TR1810 to TR1800, inclusive, are operated sequentially.

At the conclusion of the ninth cycle of the unit relays UR1310 to UR1300, inclusive, the tenth units relay UR1300 brings about operation of the control relay R1290; whereby the tenth tens relay TR1800 is operated. Upon operating the tenth tens relay TR1800 completes, at the contacts 1801, a path for applying ground potential to the conductor C1802; whereby during the tenth cycle of operation of the units relays UR1310 to UR1300, inclusive, the units lamps UL1301 to UL1300, inclusive, are flashed sequentially. For example, the circuit for illuminating the first units lamp UL1301 includes the contacts 1311 and the grounded conductor C1802; which circuit is completed incident to operation of the first units relay UR1310 during the tenth cycle of operation of the units relays UR1310 to UR1300, inclusive.

During the tenth cycle of operation of the units relays UR1310 to UR1300, inclusive, when the ninth units relay UR1390 operates, it completes, at the contacts 1395, a circuit, including the grounded hold conductor C1777 and the contacts 1809 of the operated tenth tens relay TR1800, for operating the lock-out relay R1990. Upon operating the lock-out relay R1990 completes, at the contacts 1993, a holding circuit, including the grounded hold conductor C1777, for energizing the winding thereof; and interrupts, at the contacts 1991, the previously traced circuit for energizing the winding of the first units relay UR1310 in order to prevent subsequent recycling of the units relays UR1310, etc., when the tenth units relay UR1300 next operates. At the conclusion of the tenth cycle of the units relays UR1310 to UR1300, inclusive, when the tenth units relay UR1300 operates, the tenth units lamp UL1310 is illuminated; the tenth tens lamp TL1810 already being illuminated. When the tenth units lamp UL1310 is thus operated ten seconds should have expired since operating the speed calibration key K1146 as indicated by the stop watch which is operated by the operator when the tenth units lamp UL1310 is operated. In the event the tenth units lamp UL1310 is illuminated prior to the expiration of ten seconds or subsequently to the expiration of ten seconds the pulsing relay R1130 is respectively fast or slow and should be adjusted by adjustment of the associated resistor 1116. The operator at the test board 200 then restores the speed calibration key K1146, thereby to effect the restoration of the speed relay R1140 and the consequent arresting of the operation of the pulse relays R1130 and R1135 and restoration of the line relay R1100. Upon restoring the line relay R1100 effects restoration of the pulse relay R1280 and the consequent restoration of the hold relay R1230 shortly thereafter. Also upon restoring the speed relay R1140 interrupts, at the contacts 1145, the circuit for maintaining operated the hold relay R1770; and interrupts, at the contacts 1143 the circuit for illuminating the tenth tens lamp TL1810. Upon restoring the start relay R1770 interrupts, at the contacts 1772, the path for applying ground potential to the hold conductor C1777 in order to effect the restoration of the tenth tens relay TR1800 and the lock-out relay R1990. Upon restoring the hold relay R1230 effects the restoration of the control relay R1245 and the consequent restoration of the control relay R1270 followed by the restoration of the dial relays R1220 and R1250; whereby ground potential is removed from the hold conductor C1201 to effect the restoration of the tenth units relay UR1300 and the control relay R1370. At this time the test circuit associated with the test board 200 is completely released and available for further use. After the speed of the pulse relay R1130 is adjusted, if required, by adjustment of the resistor 1116, the operator at the test board 200 may again test the new adjusted speed of operation of the pulse relay R1130 by again operating the speed calibration key K1146.

*Sect. 26.—Impulse percentage tests*

After a connection has been set up to or from the test board 200, the operator may cause an impulse percentage test to be made upon the connected circuit by operating the impulse check key K1110F; whereby the line conductors C496 and C497 extending to the upper and lower windings of the line relay R1100 are connected at the first and second contacts of the impulse check key K1110F, to the line conductors C254 and C255 to which the circuit mentioned may be connected at this time. In this case, the operator at the test board 200 advises the person controlling the connected circuit to dial the digit 2 followed by the digit 0. On the other hand, the line conductors C496 and C497 may be seized directly by the special second selectors 416, etc., and the digit 2 is then dialed in order to indicate to the operator at the test board 200 that a call is waiting to be answered; which call may be answered by operating the impulse check talk key K1110R in the manner explained in Sect. 22. The operator at the test board 200 then advises the test man controlling the connected circuit to dial the digit 0.

In any case, when a loop circuit is completed between the line conductors C496 and C497, the line relay R1100 operates effecting operation of the pulse relay R1280 and the consequent operation of the hold relay R1230. After the digit 2 is dialed, the second units relay UR1320 is operated to effect operation of the pulse count relay R1180 when the control relay R1270 restores shortly thereafter. The pulse count relay R1180 retains operated the dial relay R1220 and consequently the dial relay R1250 as explained in Sect. 22. Also upon operating the pulse count relay R1180 completes, at the contacts 1185, a circuit, including the conductor C1108, the contacts 1495, 1569, etc., and the resistor 1420, for operating the low relay R1490. Upon operating the low relay R1490 completes, at the contacts 1494, a substantially identical holding circuit for energizing the winding thereof; and interrupts, at the contacts 1496, a point in the operating circuits of the foreign battery relay R1470, etc. Also the pulse count relay R1180 completes, at the contacts 1184, a circuit, including the conductor C1107 and the contacts 1461 and 1441, for energizing the upper winding of the start relay R1450, and a multiple circuit for illuminating the low scale lamp L1415 in order to effect operation of the start relay R1450; the illumination of the low scale lamp L1415 indicating to the operator at the test board 200 that the low scale of the meter 1412 should be read in the present test. Further, the pulse count relay R1180 completes, at the contacts 1188, the previously traced circuit, including the grounded hold conductor C1115 and the fifth contacts of the impulse check talk key K1110R, for illuminating the answer lamp L1111 in order to indicate to the operator at the test board 200 that service is required. Further, the pulse count relay R1180 completes, at the contacts 1181', a circuit, including the conductor C1113 for operating the storage relay R1660; whereby the latter relay completes, at the contacts 1661 to 1660, inclusive, direct paths including the resistors 1631' to 1630', inclusive, for short-circuiting the storage condensers 1631 to 1630, inclusive.

To answer the call, the operator at the test board 200 operates the impulse check talk key K1110R in order to interrupt, at the fifth contacts thereof, the circuit for illuminating the answer lamp L1111; to complete, at the first and second contacts thereof, a connection between the line conductors C496 and C497 and the talk repeater 821; and to interrupt, at the fourth contacts thereof, the previously traced holding circuit for maintaining operated the dial relay R1220; whereby the latter relay restores shortly thereafter causing the dial relay R1250 to restore shortly thereafter; whereupon the control relay R1370 and the second units relay UR1320 are restored; all in the manner previously explained. Upon restoring the control relay R1370 completes, at the contacts 1371, a path, including the contacts 1181, the resistors 1310 and 1118, the contacts 1189, the conductor C1111, the fourth contacts of the zero adjust key K839, the conductor C1489, the contacts 1492, the conductor C1109 and the contacts 1437, for connecting ground potential to the positive terminal of the meter 1412. Also, at this time the negative terminal of the meter 1412 is connected by way of the contacts 1439, the conductor C1110, the contacts 1493, the resistors 1426, 1427, 1511, and 1513, to the negative power conductor C1585. At this time, the resistor 1310 may be adjusted to the expected "percentage make" of the dial or other transmitting device being tested.

When the digit 0 is then dialed, the line relay R1100 follows causing the pulse relay R1280 to follow; whereby the units relays UR1310 to UR1300, inclusive, are sequentially operated; all in the manner previously explained. Incident to operation of the first units relay UR1310, the control relay R1370 is operated as previously explained. Upon operating the control relay R1370 again interrupts, at the contacts 1371, the previously traced path for applying ground potential by way of the resistor 1310 to the resistor 1118 and consequently to the positive terminal of the meter 1412. Each time the line relay R1100 operates and then restores, it completes and then interrupts, at the contacts 1101, a direct path, including the contacts 1183 and 1172, for applying ground potential to the resistor 1118 and consequently to the positive terminal of the meter 1412; whereby the meter 1412 reads on the low scale the "percentage make" of the device or dial of the impulse transmitting device being tested. Also at this time, the operated pulse count relay R1180 completes, at the contacts 1186, a path, for bridging the condenser 1119 across the conductors C1109 and C1110 and consequently across the positive and negative terminals of the meter 1412, thereby to stabilize the indication thereof.

At the conclusion of the digit 0, the line relay R1100, the pulse relay R1280 and the hold relay R1230 are retained in their operated positions effecting restoration of the control relays R1245, R1240 and R1270; whereby the dial relay R1220 and then the dial relay R1250 restore in order to bring about the restoration of the control relay R1370 and the tenth units relay UR1300. Upon restoring the control relay R1370 completes, at the contacts 1371, the previously traced path for connecting ground potential at the contacts 1181 by way of the resistor 1310 to the resistor 1118 and consequently to the positive terminal of the meter 1412; whereby the meter 1412 again reads the expected "percentage make" of a device to be tested. Accordingly, the device undergoing test may be tested repeatedly merely by dialing repeatedly the digit 0; whereby the above described cycle is repeated.

*Sect. 27.—Impulse percentage calibration*

To insure the accuracy of impulse percentage tests utilizing the line relay R1100 as described in Sect. 26, the impulse percentage characteristic of the pulse generating relays R1100 and R1135. More particularly, the direct make key K1148 is operated, thereby to complete multiple circuits for operating the make relays R1160 and R1170. Upon operating the make relay R1160 completes, at the contacts 1164, a circuit substantially identical to that previously traced for operating the low relay R1490; and completes, at the contacts 1163, a circuit substantially identical to that previously traced for energizing the upper winding of the start relay R1450 and of illuminating the low scale lamp L1415 in order to cause the start relay R1450 to operate. Also the make relay R1160 completes, at the contacts 1165, the previously traced path for connecting the condenser 1119 across the conductors C1109 and C1110 and consequently across the positive and negative terminals of the meter 1412. Further, the make relay R1160 completes, at the contacts 1166 and 1167, a circuit, including the contacts 1138, for operating the line relay R1100; whereby the pulse relay R1280 and the hold relay R1230 are operated. Also the make relay R1160 completes, at the contacts 1169, circuits substantially identical to those previously traced for effecting cyclic operation of the pulse generating relays R1130 and R1135. Each time the pulse relay R1130 operates and then restores, it interrupts, and then recompletes, at the contacts 1138, the circuit for operating the line relay R1100; whereby the latter relay follows, repeating to the pulse relay R1280 in order to cause the units relays UR1310 to UR1300 to be operated sequentially and the control relay R1370 to be operated.

Prior to operation of the control relay R1370, a path is completed, at the contacts 1371 and including the contacts 1161, the resistors 1310 and 1118, the contacts 1168, the conductor C1111, the fourth contacts of the zero adjust key K839, the conductor C1489 and the contacts 1492 to the conductor C1109; while the conductor C1110 is connected by way of the contacts 1493, the resistors 1426, 1427, 1511 and 1513, to the negative power conductor C1585; the conductors C1109 and C1110 being connected across the positive and negative terminals of the meter 1412. Accordingly, the meter 1412 reads the expected "percentage make" as a consequence of the prior adjustment of the resistor 1310 in the manner previously explained. Subsequently, when the control relay R1370 operates, it interrupts, at the contacts 1371, the above traced path for applying steady ground potential at the contacts 1161 to the resistor 1118. Hereafter, each time the pulse relay R1135 restores and then reoperates, it completes and then interrupts, at the contacts 1136, a path, including the contacts 1162 and 1174 for applying ground potential to the resistor 1118; whereby the meter 1412 produces an average reading of the make of the contacts 1136 of the pulse relay R1135 as a consequence of the condenser 1119 being bridged across the conductors C1109 and C1110 extending to the positive and negative terminals of the meter 1412 as previously explained. At this time, in the event the meter 1412 does not indicate appropriate adjustment of the contacts 1136, for example, 50% make, the resistor 1133 may be adjusted in order to vary the holding time of the pulse relay R1135 wherein the previously established cycle time of the pulse relay R1130 as set by the resistor 1116.

After the percentage make test of the pulse relay R1135 has been tested and adjustments made, if required, the direct make key K1148 is restored; and the repeated make key K1147 is operated in order to effect operation of the repeated make relay R1150, the make relays R1160 and R1170 having restored incident to restoring the direct make key K1148. Operation of the repeated make relay R1150 effects operation of the low relay R1490, the start relay R1450 and the line relay R1100 over circuits substantially identical to those previously traced; whereby the pulse relay R1280 and the hold relay R1230 are operated and the units relays UR1310 to UR1300, inclusive, are operated sequentially, bringing about operation of the control relay R1370; all in the manner previously explained. Further, the repeated make relay R1150 completes, at the contacts 1155, a path substantially identical to that previously traced for bridging the condenser 1119 across the conductors C1109 and C1110. Now, each time the line relay R1100 operates and then restores under the control of the pulse relay R1135, it completes and then interrupts, at the contacts 1101, a path, including the contacts 1152 and 1172, for applying ground potential to the resistor 1118; whereby the meter 1412 reads the percentage make of the contacts 1101 of the line relay R1100. At this time the meter 1412 should read 50% make since it has been determined that the pulse relay R1135 has the correct holding time. In the event the meter 1412 indicates a slight departure from 50% make, the required minor adjustment should be made by mechanically manipulating the contacts 1101 on the line relay R1100. After completing this test, the operator restores the repeated make key K1147 in order to effect the restoration of the repeated make relay R1150; whereby the start relay R1450, the low relay R1490 and the line relay R1100 restore effecting the complete release of the test circuit associated with the test board 200.

*Sect. 28.—Impulse length tests*

In order to test the comparative lengths of a series of impulses following an impulse percentage test as explained in Sect. 26, the impulse storage key K1615 is operated; whereupon there is completed, a circuit for operating the impulse storage relay R1640 and a multiple circuit, also including the conductor C1114, for operating the control relay R1190. Upon operating the impulse storage relay R1640 completes, at the contacts 1641, a path for applying ground potential to the negative out-put terminal of the power rectifier 1524; and completes, at the contacts 1642, a connection including the conductor C1109 and the contacts 1437 between the plate of the tube 1612 and the positive terminal of the meter 1412. Also, the impulse storage relay R1640 completes, at the contacts 1645, a connection, including the contacts 1591′ and the resistors 1621 and 1617 between the positive out-put terminal of the power rectifier 1524 and ground potential; and completes, at the contacts 1644, a connection, including the conductor C1110 and the contacts 1439, between the negative terminal of the meter 1412 and the junction between the resistors 1617 and 1621. Further, the impulse storage relay R1640 completes, at the contacts 1643 and 1644, an impedance path, including the resistors 1619 and 1620 between the conductors C1109 and C1110 and consequently across the positive and negative terminals of the meter 1412. Also it is noted that a filter network is provided comprising a by-pass condenser 1614 shunting the resistor 1621 and a by-pass condenser 1615 shunting the resistor 1617. Further, a resistor 1622 is connected between the junction of the resistors 1620 and 1619 and the junction between the resistor 1621 and the contacts 1645; whereby initially the meter 1412 may be adjusted to a zero reading. Further, it is noted that a circuit is normally completed for the cathode heater of the tube 1612 that includes the resistor 1613, the conductor C801 and the contacts 817 of the jack J816; while the cathode of the tube 1612 is connected to ground potential by way of the cathode biasing resistor 1610, a by-pass condenser 1611 shunting the resistor 1610. Further, the control electrode of the tube 1612 is normally connected by way of the resistor 1618 and the contacts 1651 of the restored impulse length relay R1650 to ground potential; whereby a negative bias normally appears upon the control electrode of the tube 1612. At this time, the plate current of the tube 1612 supplied from the positive out-put terminal of the power rectifier 1524 traverses the meter 1412, a portion thereof passing through the resistor 1621 and another portion thereof passing through the resistors 1620 and 1622; whereby the meter 1412 may be adjusted to read zero before testing is begun.

Upon operating the control relay R1190 interrupts, at the contacts 1193, the holding circuit for maintaining operated the pulse control relay R1180; whereby the latter relay upon restoring interrupts, at the contacts 1181′, the circuit for maintaining operated the storage relay R1660. Upon restoring the storage relay R1660 interrupts, at the contacts 1661 to 1660, inclusive, the previously traced paths for short-circuiting the storage condensers 1631 to 1630, inclusive.

When the digit 0 is then dialed, the line relay R1100 follows, causing the pulse relay R1280 to follow; whereby the units relays UR1310 to UR1300, inclusive, are sequentially operated; all in the manner previously explained. The first time the line relay R1100 restores, it completes, at the contacts 1103, a path, including the resistor 1120, the contacts 1194, the contacts 1397, etc., 1337, 1328, 1317 and 1376, for applying battery potential to the first conductor C1601; whereby the first storage condenser 1631 is charged through the associated resistor 1631′ connected to ground potential. The first time the line relay R1100 reoperates, the pulse relay R1280 reoperates effecting operation of the first units relay UR1310; whereby the latter relay interrupts, at the contacts 1317, the previously traced circuit for charging the first storage condenser 1631; and prepares, at the contacts 1316, a circuit for charging the second storage condenser 1632. The second time the line relay R1100 restores, it completes, at the contacts 1103, a path, including the resistor 1120, the contacts 1194, 1397, etc., 1337, 1328 and 1316, for applying battery potential to the second conductor C1602; whereby the second storage condenser 1632 is charged through the associated resistor 1632′ connected to ground potential. The second time the line relay R1100 reoperates, the pulse relay R1280 reoperates effecting operation of the second units relay UR1320; whereby the latter relay interrupts, at the contacts 1328, the previously traced circuit for charging the second storage condenser 1632; and prepares, at the contacts 1327, a circuit for charging the third storage condenser 1633. Accordingly, upon the first through the tenth restorations of the line relay R1100, the first through the tenth storage condensers 1631 to 1630, inclusive, are charged; the charge on each of the storage condensers 1631, etc., depending upon the time interval of restoration of the line relay R1100 during the corresponding impulse. In passing, it is noted that the resistor 1120 may be adjusted in order to establish the charge that would be accumulated upon the storage condensers 1631 to 1630, inclusive, during restorations of the line relay R1100; which resistor 1120 is adjusted so that the meter 1412 will subsequently read on scale. At the conclusion of the dialing the digit 0, the line relay R1100, the pulse relay R1280 and the hold relay R1230 are retained operated in order to effect restoration of the control relays R1245, R1240 and R1270; whereby the dial relays R1220 and R1250 restore sequentially effecting the restoration of the tenth units relay UR1300; all in the manner previously explained.

The operator at the test board 200 momentarily operates the impulse length key K1616 in order to effect operation and subsequent restoration of the impulse length relay R1650. Upon operating the impulse length relay R1650 interrupts, at the contacts 1651, the path for applying ground potential to the control electrode of the tube 1612; and completes, at the contacts 1652, a connection including the resistor 1618 between the conductor C1303 and the control electrode of the tube 1612. Also upon operating the impulse length relay R1650 completes, at the contacts 1653 and 1654, connections between the grounded hold conductor C1201 and the conductors C1301 and C1302. The application of ground potential to the conductor C1302 completes a circuit, including the contacts 1284 and 1374, for operating the first units relay UR1310. Upon operating the first units relay UR1310 completes, at the contacts 1315, a holding circuit including the contacts 1324 and 1361 and the grounded conductor C1301 for energizing the winding thereof. Also the grounded conductor C1301 completes a path, including the contacts 1361 and the grounded hold conductor C1201, for short-circuiting the lower winding of the control relay R1360. Also upon operating the first units relay UR1310 completes, at the contacts 1318, a connection between the conductor C1303 and the conductor C1601; whereby the first storage condenser 1631 is connected to the control electrode of the tube 1612 decreasing the negative bias between the control electrode and the cathode thereof, causing an increased amount of current in the plate circuit of the tube 1612; whereby the meter 1412 included therein produces a reading proportional to the voltage on the first storage condenser 1631 and consequently the charge thereon; which, in turn, is proportional to the length of the first impulse as previously explained.

When the impulse length relay R1650 then restores, it interrupts, at the contacts 1652, the connection between the conductor C1303 and the control electrode of the tube 1612; and recompletes, at the contacts 1651, the previously traced path for applying ground potential to the control electrode of the tube 1612 in order to return the negative bias thereto and to decrease the plate current thereof, restoring the meter 1412 to zero. Also, upon restoring, the impulse length relay R1650 interrupts, at the contacts 1653 and 1654, the connection between the grounded hold conductor C1201 and the conductors C1301 and C1302. When ground potential is removed from the conductor C1301, a holding circuit is completed for energizing the winding of the first units relay UR1310 in series with the lower winding of the control relay R1360, thereby to retain operated the first units relay UR1310 and to effect operation of the control relay R1360.

The next time the impulse length key K1616 is momentarily operated, the second units relay UR1320 is operated and a holding circuit is completed for energizing the upper winding of the control relay R1360 in a manner substantially identical to that previously operated; and the control electrode of the tube 1612 is disconnected from ground potential and connected to the second storage condenser 1632; whereby the meter 1412 is operated in order to produce a reading proportional to the length of the second pulse as previously explained. When the impulse length relay R1650 again restores, the control relay R1360 is restored and the control electrode of the tube 1612 is disconnected from the second storage condenser 1632 and reconnected to ground potential in order again to return the meter 1412 to zero. In view of the foregoing, it will be understood that as the impulse length key K1616 is operated repeatedly, the pulse length relay R1650 follows in order to effect sequential operation of the units relays UR1310 to UR1300, inclusive, and the consequent sequential connections of the control electrode of the tube 1612 to the storage condensers 1631 to 1630, inclusive; whereby the meter 1412 produces sequential readings proportional to the voltage and consequently the charges upon the storage condensers 1631 to 1630, inclusive, which, in turn, are respectively proportional to the lengths of the pulse initially received incident to dialing 0 by the line relay R1100 from the dial or other impulse transmitting device undergoing test.

After the impulse length test has been completed, the operator at the test board 200 restores the impulse storage key K1616 in order to effect restoration of the impulse storage relay R1640 and the control relay R1190. At this time, further testing of the device included in the connecting circuit may take place or the operator may release her control of the circuit by restoring the impulse check talk key K1110R; all in the manner previously explained.

*Sect. 29.—Conclusions*

The arrangement incorporated in the test board for performing impulse speed tests, impulse length tests and impulse percentage make-break tests is disclosed and claimed in the copending divisional application of Frank Kessler, Serial No. 197,071, filed November 22, 1950; and the switching arrangement for connecting the various subscriber lines and the various trunks to the test board to be tested is disclosed and claimed in the copending divisional application of Frank Kessler, Serial No. 208,471, filed January 30, 1951.

In view of the foregoing, it is apparent that there has been provided a test board for telephone systems including improved testing facilities and a key-controlled arrangement for setting up and for performing the different tests in a direct and simple manner.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a telephone system including a line, a test board, and means for connecting said line to said test board; said test board comprising a transmitter-receiver circuit, a start relay having a restored position connecting said line to said transmitter-receiver circuit and an operated position disconnecting said line from said transmitter-receiver circuit, a test circuit having a plurality of test positions, a measuring instrument having high and low scales, a scale signal, said test circuit being operative into a first test position to connect said measuring instrument to said line and to render operative the high scale thereof, said test circuit being operative into a second test position to connect said measuring instrument to said line and to render operative the low scale thereof, means responsive to operation of said test circuit into either one of its first and second test positions for operating said start relay, means responsive to operation of said test circuit into a particular one of its first and second test positions for operating said scale signal, and key controlled means for selectively operating said test circuit into its different test positions.

2. In a telephone system including a line provided with ring and tip conductors, a test board, and means for connecting said line to said test board; said test board comprising a transmitter-receiver circuit, a start relay having a restored position connecting said line to said transmitter-receiver circuit and an operated position disconnecting said line from said transmitter-receiver circuit, a test circuit having a plurality of test positions, said test circuit being operative into a first test position to test the insulation resistance between the ring conductor and the tip conductor of said line, said test circuit being operative into a second test position to test the insulation resistance between the ring conductor of said line and ground, said test circuit being operative into a third test position to test the insulation resistance between the tip conductor of said line and ground, a plurality of test keys respectively corresponding to the different test positions of said test circuit, each of said test keys being normally operative to operate said test circuit into the corresponding one of its test positions, and means responsive to operation of any one of said test keys for operating said start relay and for rendering inoperative the other of said test keys.

3. In a telephone system including a line provided with ring and tip conductors, a test board, and means for connecting said line to said test board; said test board comprising a transmitter-receiver circuit, a start relay having a restored position connecting said line to said transmitter-receiver circuit and an operated position disconnecting said line from said transmitter-receiver circuit, a test circuit having a plurality of test positions, said test circuit being operative into a first test position to test the electric capacity between the ring conductor and the tip conductor of said line, said test circuit being operative into a second test position to test the electric capacity between the ring conductor of said line and ground, said test circuit being operative into a third test position to test the electric capacity between the ring conductor of said line and ground, a plurality of test keys respectively corresponding to the different test positions of said test circuit, each of said test keys being normally operative to operate said test circuit into the corresponding one of its test positions, and means responsive to operation of any one of said test keys for operating said start relay and for rendering inoperative the other of said test keys.

4. In a telephone system including a line provided with ring and tip conductors, a test board, and means for connecting said line to said test board; said test board comprising a transmitter-receiver circuit, a start relay having a restored position connecting said line to said transmitter-receiver circuit and an operated position disconnecting said line from said transmitter-receiver circuit, a test circuit having a plurality of test positions, a ringing generator, said test circuit being operative into a first test position to connect said ringing generator between the ring conductor of said line and ground and to measure the ringing current that is projected over the ring conductor of said line, said test circuit being operative into a second test position to connect said ringing generator between the tip conductor of said line and ground and to measure the ringing current that is projected over the tip conductor of said line, a plurality of test keys respectively corresponding to the different test positions of said test circuit, each of said test keys being normally operative to operate said test circuit into the corresponding one of its test positions, and means responsive to operation of any one of said test keys for operating said start relay and for rendering inoperative the other of said test keys.

5. In a telephone system including a line, a test board, and means for connecting said line to said test board; said test board comprising a transmitter-receiver circuit, a start relay having a restored position connecting said line to said transmitter-receiver circuit and an operated position disconnecting said line from said transmitter-receiver circuit, a test circuit having a plurality of test positions, a source of D. C. supply having positive and negative terminals, a measuring instrument, said test circuit being operative into a first test position to connect the positive terminal of said source through said measuring instrument to said line and to connect the negative terminal of said source to ground, said test circuit being operative into a second test position to connect the negative terminal of said source through said measuring instrument to said line and to connect the positive terminal of said source to ground, a plurality of test keys respectively corresponding to the different test positions of said test circuit, each of said test keys being normally operative to operate said test circuit into the corresponding one of its test positions, and means responsive to operation of any one of said test keys for operating said start relay and for rendering inoperative the other of said test keys.

6. In a telephone system including a line, a test board, and means for connecting said line to said test board; said test board comprising a transmitter-receiver circuit, a start relay having a restored position connecting said line to said transmitter-receiver circuit and an operated position disconnecting said line from said transmitter-receiver circuit, a test circuit having a plurality of test positions, a measuring instrument convertible between ammeter and voltmeter operations, said test circuit being operative into a first test position to connect said measuring instrument between said line and ground and to convert said measuring instrument to ammeter operation, said test circuit being operative into a second test position to connect said measuring instrument between said line and ground and to convert said measuring instrument to voltmeter operation, a plurality of test keys respectively corresponding to the different test positions of said test circuit, each of said test keys being normally operative to operate said test circuit into the corresponding one of its test positions, and means responsive to operation of any one of said test keys for operating said start relay and for rendering inoperative the other of said test keys.

7. In a telephone system including a line, a test board, and means for connecting said line to said test board; said test board comprising a transmitter-receiver circuit, a start relay having a restored position connecting said line to said transmitter-receiver circuit and an operated position disconnecting said line from said transmitter-receiver circuit, a test circuit having a plurality of test positions, a measuring instrument, a source of D. C. supply, said test circuit being operative into a first test position to connect said measuring instrument between said line and ground in order to test the stray supply of current to said line, said test circuit being operative into a second test position to connect said measuring instrument and said source in series relation between said line and ground in order to test the direct supply of current to said line, a plurality of test keys respectively corresponding to the different test positions of said test circuit, each of said test keys being normally operative to operate said test circuit into the corresponding one of its test positions, and means responsive to operation of any one of said test keys for operating said start relay and for rendering inoperative the other of said test keys.

8. In a telephone system including a line, a test board, and means for connecting said line to said test board; said test board comprising a transmitter-receiver circuit, a start relay having a restored position connecting said line to said transmitter-receiver circuit and an operated position disconnecting said line from said transmitter-receiver circuit, a test circuit having a plurality of test positions, a measuring instrument of D. C. type, a rectifier having input and output terminals, said test circuit being operative into a first test position to connect said measuring instrument between said line and ground to test the presence of a stray D. C. voltage upon said line, said test circuit being operative into a second test position to connect the input terminals of said rectifier between said line and ground and to connect the output terminals of said rectifier to said measuring instrument to test the presence of a stray alternating voltage upon said line, a plurality of test keys respectively corresponding to the different test positions of said test circuit, each of said test keys being normally operative to operate said test circuit into the corresponding one of its test positions, and means responsive to operation of any one of said test keys for operating said start relay and for rendering inoperative the other of said test keys.

9. A test board comprising a battery, a source of A. C. supply normally ready for use, a power rectifier having input and output terminals, a test circuit, a power check relay, a connect relay, a transmitter-receiver circuit, manually controllable means for connecting said transmitter-receiver circuit to said test circuit, means responsive to connection of said transmitter-receiver circuit to said test circuit for operating said connect relay, means responsive to operation of said connect relay for connecting said power check relay and the input terminals of said power rectifier to said source of supply so that said power check relay is operated only in the event said source of supply is ready for use, means normally connecting said battery to said test circuit, and means responsive to operation of said power check relay for disconnecting said battery from said test circuit and for connecting the output terminals of said power rectifier thereto.

10. A test board comprising a transmitter-receiver circuit, a test circuit having a plurality of test positions and arranged to perform a corresponding plurality of different tests in its different test positions, a pair of test conductors normally connected to said transmitter-receiver circuit and normally disconnected from said test circuit, a start relay, a plurality of test relays selectively operative to set said test circuit into its corresponding plurality of different test positions, a corresponding plurality of test keys normally selectively operative to operate said start relay and the corresponding ones of said test relays, means responsive to operation of any one of said test relays for preventing operation of the remainder of said test relays, and means responsive to operation of said start relay for disconnecting said pair of test conductors from said transmitter-receiver circuit and for connecting said pair of test conductors to said test circuit.

11. A test board comprising a transmitter-receiver circuit, a test circuit having a plurality of test positions and arranged to perform a corresponding plurality of different tests in its different test positions, a pair of test conductors normally connected to said transmitter-receiver circuit and normally disconnected from said test circuit, a start relay, a plurality of test relays selectively operative to set said test circuit into its corresponding plurality of different test positions, a corresponding plurality of test keys normally selectively operative to operate said start relay and the corresponding ones of said test relays, means responsive to operation of any one of said test relays for preventing operation of the remainder of said test relays, means responsive to operation of said start relay for disconnecting said pair of test conductors from said transmitter-receiver circuit and for connecting said pair of test conductors to said test circuit, a battery, a source of A. C. supply normally ready for use, a power rectifier having input terminals normally connected to said source of supply and also having output terminals, a power check relay normally connected to said source of supply so that said power check relay is operated only in the event said source of supply is ready for use, means responsive to operation of said power check relay for connecting the output terminals of said power rectifier to said test circuit and responsive to restoration of said power check relay for connecting said battery to said test circuit.

FRANK KESSLER.

REFERENCES CITED

The following references are of record in the file of this patent:

UNITED STATES PATENTS

| Number | Name | Date |
|---|---|---|
| 931,331 | McQuarrie | Aug. 17, 1909 |
| 1,329,001 | Lundius | Jan. 27, 1920 |
| 1,621,480 | Ewing | Mar. 15, 1927 |
| 1,624,422 | Miller | Apr. 12, 1927 |
| 1,624,484 | Evans | Apr. 12, 1927 |
| 1,653,082 | Bailey | Dec. 20, 1927 |
| 1,671,146 | Crocker | May 29, 1928 |
| 1,709,479 | Friendly | Apr. 16, 1929 |
| 1,753,231 | Best | Apr. 8, 1930 |
| 1,778,378 | Butz | Oct. 14, 1930 |
| 1,780,937 | O'Neill | Nov. 11, 1930 |
| 1,844,110 | Steinberg | Feb. 9, 1932 |
| 1,857,247 | Laurent | May 10, 1932 |
| 1,864,061 | Gooderham | June 21, 1932 |
| 1,933,274 | Ludwig | Oct. 31, 1933 |
| 2,015,316 | Miller | Sept. 24, 1935 |
| 2,030,857 | Dingley | Feb. 18, 1936 |
| 2,267,129 | Paulson | Dec. 23, 1941 |
| 2,315,434 | Liebe | Mar. 30, 1943 |
| 2,366,789 | Horham | July 9, 1945 |
| 2,393,236 | Corey | Jan. 22, 1946 |